US006317739B1

(12) United States Patent
Hirata et al.

(10) Patent No.: US 6,317,739 B1
(45) Date of Patent: Nov. 13, 2001

(54) METHOD AND APPARATUS FOR DATA RETRIEVAL AND MODIFICATION UTILIZING GRAPHICAL DRAG-AND-DROP ICONIC INTERFACE

(75) Inventors: Masafumi Hirata, Nara; Naoki Urano, Osaka; Mitsuru Minakuchi, Kyoto, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/195,549

(22) Filed: Nov. 19, 1998

(30) Foreign Application Priority Data

Nov. 20, 1997 (JP) .................................................. 9-319615
Oct. 13, 1998 (JP) ................................................. 10-291067

(51) Int. Cl.[7] .................................................. G06F 17/30
(52) U.S. Cl. ............................................. 707/4; 345/349
(58) Field of Search ............................... 707/3, 100, 102, 707/104; 345/346, 326, 339, 340

(56) References Cited

U.S. PATENT DOCUMENTS

| 5,021,976 | * | 6/1991 | Wexelblat et al. | .................... 345/356 |
| 5,420,968 | * | 5/1995 | Johri | ...................... 345/433 |

(List continued on next page.)

FOREIGN PATENT DOCUMENTS

| 05-101119 | * | 4/1993 | (JP) | ................................. G06F/15/40 |
| 5-101119 | | 4/1993 | (JP) | ................................. G06F/15/40 |
| 6-89309 | | 3/1994 | (JP) | ................................. G06F/15/40 |
| 09-006791 | * | 1/1997 | (JP) | ................................. G06F/17/30 |
| 9-6791 | | 1/1997 | (JP) | ................................. G06F/17/30 |

OTHER PUBLICATIONS

"Enhanced Dynamic Queries via Movable Filters,", Ken Fishkin et al., CHI '95, pp. 415–420.
"The Movable Filter as a User Interface Tool", Maureen C. Stone et al., CHI '94, pp. 306–312.

(List continued on next page.)

Primary Examiner—Jean R. Homere
Assistant Examiner—Luke S Wassum
(74) Attorney, Agent, or Firm—Nixon & Vanderhye, P.C.

(57) ABSTRACT

A data management method of obtaining accurately the number of data satisfying a retrieval condition and the number of data not satisfying a retrieval condition is employed in a data management apparatus including: a storage device storing a plurality of data, each data having an attribute and an attribute value associated with each attribute; a display device; a control circuit for displaying on the display device a region for each attribute value of a certain attribute and a plurality of icons representing the plurality of data, respectively, on each region; and a circuit to retrieve data by a filter to which an attribute and an attribute value are related. The data management method includes the steps of displaying the plurality of icons on a region provided for every attribute value as to a certain attribute; generating a filter overlapping the region; moving or modifying the configuration of the filter on the region arbitrarily; entering a retrieval condition as to an attribute and an attribute value related to the filter; detecting whether the region has an overlapping section with the filter; and detecting data that meets the retrieval condition when the region has an overlapping section with the filter.

31 Claims, 74 Drawing Sheets

U.S. PATENT DOCUMENTS

| | | | | |
|---|---|---|---|---|
| 5,479,603 | * | 12/1995 | Stone et al. | 345/326 |
| 5,515,488 | * | 5/1996 | Hoppe et al. | 345/440 |
| 5,537,528 | * | 7/1996 | Takahashi et al. | 707/512 |
| 5,652,851 | * | 7/1997 | Stone et al. | 345/346 |
| 5,778,382 | * | 7/1998 | Hatori | 707/104 |
| 5,835,898 | * | 11/1998 | Borg et al. | 705/8 |
| 5,841,437 | * | 11/1998 | Fishkin et al. | 345/346 |
| 5,886,698 | * | 3/1999 | Sciammarella et al. | 345/349 |
| 5,930,803 | * | 7/1999 | Becker et al. | 707/104 |
| 6,085,205 | * | 7/2000 | Peairs et al. | 707/530 |

OTHER PUBLICATIONS

Jones, S. "Graphical Query Specification and Dynamic Result Previews for a Digital Library", Proceedings of the 11th Annual ACM Symposium on User Interface Software & Technology, Nov. 1–4, 1998, pp.143–151.*

Derthick, M. et al. "An Interface Visual Query Environment for Exploring Data", Proceedings of the 10th Annual ACM Symposium on User Interface Software & Technology, Oct. 14–17, 1997, pp. 189–198.*

Yoshitaka, A. et al. "Ionic OPbject Definition System for Object Oriented Databases", Proceedings of the IEEE Symposium on Visual Languages, 1993, pp. 169–177.*

Cowart, R. "Mastering Windows 3.1, Special Edition" San Francisco:Sybex Inc., 1992. pp. 11–12, 81–82, 88–89, 103–106, 120 and 142.*

* cited by examiner

| CLASS 1 | CLASS 2 | CLASS 3 | CLASS 4 | CLASS 5 | CLASS 6 |
|---------|---------|---------|---------|---------|---------|
| □ □ | □ □ | □ □ | □ □ | □ □ | □ □ |
| □ □ | □ □ | □ □ | □ □ | □ □ | □ □ |
| □ □ | □ □ | □ □ | □ □ | □ □ | □ □ |
| □ □ | □ □ | □ □ | □ □ | □ □ | □ □ |
| □ □ | □ □ | □ □ | □ □ | □ □ | □ □ |
| □ □ | □ □ | □ □ | □ □ | □ □ | □ □ |
| □ □ | □ □ | □ □ | □ □ | □ □ | □ □ |
| □ □ | □ □ | □ □ | □ □ | □ □ | □ □ |
| □ □ | □ □ | □ □ | □ □ | □ □ | □ □ |
| □ □ | □ □ | □ □ | □ □ | □ □ | □ □ |

| DATA ID |
|---|
| 101 |
| 102 |
| 103 |
| 104 |
| 105 |
| 106 |
| 107 |
| 108 |
| 109 |
| 110 |
| 111 |
| 112 |

FIG.40

| DATA ID | ATTRIBUTE TEAM KEYWORD |
|---|---|
| 101 | |
| 102 | |
| 103 | |
| 104 | |
| 105 | |
| 106 | |
| 107 | |
| 108 | |
| 109 | |
| 110 | |
| 111 | |
| 112 | |

| DATA ID | ATTRIBUTE TEAM KEYWORD |
|---|---|
| 101 | HIROSHIMA C |
| 102 | HIROSHIMA C |
| 103 | HIROSHIMA C |
| 104 | HIROSHIMA C |
| 105 | HIROSHIMA C |
| 106 | HIROSHIMA C |
| 107 | HIROSHIMA C |
| 108 | HIROSHIMA C |
| 109 | HIROSHIMA C |
| 110 | HIROSHIMA C |
| 111 | HIROSHIMA C |
| 112 | HIROSHIMA C |

| DATA ID | ATTRIBUTE TEAM KEYWORD |
|---|---|
| 101 | HIROSHIMA C |
| 102 | HIROSHIMA C |
| 103 | AICHI D |
| 104 | KANAGAWA B |
| 105 | OSAKA T |
| 106 | TOKYO G |
| 107 | KANAGAWA B |
| 108 | TOKYO S |
| 109 | AICHI D |
| 110 | TOKYO S |
| 111 | TOKYO G |
| 112 | OSAKA T |

FIG.52

| DATA ID | ATTRIBUTE<br>TEAM KEYWORD |
|---|---|
| 101 | HIROSHIMA C |
| 102 | HIROSHIMA C |
| 103 | AICHI D |
| 104 | HIROSHIMA C |
| 105 | OSAKA T |
| 106 | TOKYO G |
| 107 | KANAGAWA B |
| 108 | TOKYO S |
| 109 | AICHI D |
| 110 | TOKYO S |
| 111 | TOKYO G |
| 112 | OSAKA T |

FIG.57

| DATA ID | ATTRIBUTE | |
|---|---|---|
| | TEAM KEYWORD | HOME RUN INTEGER DISCRETE VALUE |
| 101 | HIROSHIMA C | 31~40 |
| 102 | HIROSHIMA C | 21~30 |
| 103 | AICHI D | 11~20 |
| 104 | HIROSHIMA C | 0~10 |
| 105 | OSAKA T | 0~10 |
| 106 | TOKYO G | 31~40 |
| 107 | KANAGAWA B | 0~10 |
| 108 | TOKYO S | 21~30 |
| 109 | AICHI D | 0~10 |
| 110 | TOKYO S | 21~30 |
| 111 | TOKYO G | 21~30 |
| 112 | OSAKA T | 0~10 |

FIG.63

| DATA ID | ATTRIBUTE ||
|---|---|---|
| | TEAM KEYWORD | HOME RUN INTEGER DISCRETE VALUE |
| 101 | HIROSHIMA C | 31~40 |
| 102 | HIROSHIMA C | 21~30 |
| 103 | AICHI D | 11~20 |
| 104 | HIROSHIMA C | 8 |
| 105 | OSAKA T | 0~10 |
| 106 | TOKYO G | 31~40 |
| 107 | KANAGAWA B | 0~10 |
| 108 | TOKYO S | 21~30 |
| 109 | AICHI D | 0~10 |
| 110 | TOKYO S | 21~30 |
| 111 | TOKYO G | 21~30 |
| 112 | OSAKA T | 0~10 |

FIG.66

| DATA ID | ATTRIBUTE | |
| --- | --- | --- |
| | TEAM KEYWORD | HOME RUN INTEGER DISCRETE VALUE |
| 101 | HIROSHIMA C | 31~40 |
| 102 | HIROSHIMA C | 21~30 |
| 103 | AICHI D | 11~20 |
| 104 | HIROSHIMA C | 8 |
| 105 | OSAKA T | 0~10 |
| 106 | TOKYO G | 31~40 |
| 107 | KANAGAWA B | 0~10 |
| 108 | HIROSHIMA C | 8 |
| 109 | AICHI D | 0~10 |
| 110 | TOKYO S | 21~30 |
| 111 | TOKYO G | 21~30 |
| 112 | OSAKA T | 0~10 |

FIG.68

| DATA ID | ATTRIBUTE | | |
|---|---|---|---|
| | TEAM KEYWORD | HOME RUN INTEGER DISCRETE VALUE | STRIKE OUT INTEGER DISCRETE VALUE |
| 101 | HIROSHIMA C | 31~40 | 0~150 |
| 102 | HIROSHIMA C | 21~30 | 0~150 |
| 103 | AICHI D | 11~20 | 0~150 |
| 104 | HIROSHIMA C | 8 | 0~150 |
| 105 | OSAKA T | 0~10 | 0~150 |
| 106 | TOKYO G | 31~40 | 0~150 |
| 107 | KANAGAWA B | 0~10 | 0~150 |
| 108 | HIROSHIMA C | 8 | 0~150 |
| 109 | AICHI D | 0~10 | 0~150 |
| 110 | TOKYO S | 21~30 | 0~150 |
| 111 | TOKYO G | 21~30 | 0~150 |
| 112 | OSAKA T | 0~10 | 0~150 |

FIG.70

| DATA ID | ATTRIBUTE | | |
|---|---|---|---|
| | TEAM KEYWORD | HOME RUN INTEGER DISCRETE VALUE | STRIKE OUT INTEGER DISCRETE VALUE |
| 101 | HIROSHIMA C | 31~40 | 0~150 |
| 102 | TOKYO S | 15 | 100 |
| 103 | AICHI D | 11~20 | 0~150 |
| 104 | HIROSHIMA C | 8 | 0~150 |
| 105 | OSAKA T | 0~10 | 0~150 |
| 106 | TOKYO G | 31~40 | 0~150 |
| 107 | KANAGAWA B | 0~10 | 0~150 |
| 108 | HIROSHIMA C | 8 | 0~150 |
| 109 | AICHI D | 0~10 | 0~150 |
| 110 | TOKYO S | 21~30 | 0~150 |
| 111 | TOKYO G | 21~30 | 0~150 |
| 112 | OSAKA T | 0~10 | 0~150 |

FIG.73

| DATA ID | ATTRIBUTE | | |
|---|---|---|---|
| | TEAM KEYWORD | HOME RUN INTEGER DISCRETE VALUE | STRIKE OUT INTEGER DISCRETE VALUE |
| 101 | HIROSHIMA C | 31~40 | 0~150 |
| 102 | TOKYO S | 15 | 100 |
| 103 | AICHI D | 11~20 | 0~150 |
| 104 | HIROSHIMA C | 8 | 0~150 |
| 105 | OSAKA T | 0~10 | 0~150 |
| 106 | TOKYO G | 31~40 | 0~150 |
| 107 | KANAGAWA B | 0~10 | 0~150 |
| 108 | HIROSHIMA C | 8 | 0~150 |
| 109 | AICHI D | 0~10 | 0~150 |
| 110 | TOKYO S | 21~30 | 0~150 |
| 111 | TOKYO G | 21~30 | 0~150 |
| 112 | OSAKA T | 0~10 | 0~150 |
| 113 | HIROSHIMA C | | |
| 114 | HIROSHIMA C | | |

METHOD AND APPARATUS FOR DATA RETRIEVAL AND MODIFICATION UTILIZING GRAPHICAL DRAG-AND-DROP ICONIC INTERFACE

BACKGROUND OF THE INVENTION

1. Field of the Invention

The present invention relates to a data management method and apparatus, and involves a computer-readable recording medium which stores a data management program for executing a data management method. More particularly, the present invention relates to a data management method and apparatus for handling a large volume of data, and includes a computer-readable recording medium which is applicable to a wide range of computing devices including large general-type computers to individual equipment such as personal computers or portable information terminals.

2. Description of the Background Art

The desire to handle large volumes of data on a personal computer or the like has been increasing as the performance of computer systems has improved and as computer networks of greater complexity have been created. In order to retrieve desired data from such a large volume of data, a complicated method of retrieval had to be learned. Such a complicated method imposed a great burden on users.

A method of data retrieval involving manipulation by intuition adapting a graphical user interface was developed to reduce the burden on the user.

Background Art 1

One such data retrieval method was developed at Palo Alto Research Center by the Xerox Corporation (U.S.A.). This data retrieval method by "magic lens" is disclosed in "Enhanced Dynamic Queries via Movable Filters", CHI' 95, pp. 415–420 by Ken Fishkin et al.

The "magic lens" is a filter to which a retrieval condition is assigned. By overlapping this filter on the data of interest, the data satisfying the retrieval condition is directly displayed (by an open circle) on the magic lens. Data that do not meet the retrieval condition is indicated with an x mark.

An example of retrieval by the magic lens is shown in FIGS. 1 and 2. In FIG. 1, each o symbol 101 represents data corresponding to an individual. An example of retrieving data satisfying the condition of "male" using the magic lens will be described with reference to FIG. 2. The center rectangle 201 indicates the magic lens used to retrieve data that meets the condition of "male". The data satisfying the condition of "male" in the plurality of data within the magic lens is displayed per se by an o symbol 202. The data not satisfying the condition of "male", i.e., the data satisfying the condition of "female" is displayed with an x sign 203.

By shifting the magic lens all over the retrieval region, or by enlarging the magic lens to completely overlap the entire retrieval region, the data that meets the retrieval condition of "male" can be searched for from the universe of data of interest.

By using a plurality of magic lenses in an overlapping manner, an AND retrieval operation with a plurality of conditions can be performed.

An example of retrieving data satisfying the retrieval conditions of "a male who is at least 170 cm in height" using two magic lenses will be described hereinafter with reference to FIG. 3. The newly added rectangle 301 at the center of FIG. 3 corresponds to the magic lens used to retrieve data satisfying the condition of "a person who is at least 170 cm in height." The data satisfying the condition of "a male who is at least 170 cm in height" is among the data in the region where the two magic lenses overlap and is displayed with an o sign 302. The data not satisfying the above condition, i.e. data satisfying the condition of "a male who is shorter than 170 cm" or the condition of "a female" is displayed with an x sign 303.

By shifting the two magic lenses so that the overlapping region thereof is moved around up to all the corners in the region of retrieval, or by expanding the two magic lenses so as to overlap the entire region of retrieval, data satisfying the condition of "a male who is at least 170 cm in height" can be obtained from the universe of data of interest.

Background Art 2

Japanese Patent Laid-Open No. 6-89309 discloses a database retrieval processing method according to aggregation in graphical form. A set that is the result of database retrieval is rendered into a graphical form by a rectangle for display.

The area of displayed rectangle corresponds to the number of data satisfying the retrieval condition. A plurality of procedures of retrieval are carried out beforehand and stored. A set up to three in maximum is selected from the resultant stored sets to represent the relationship of inclusion between each set in an overlapping manner of rectangles. FIG. 4 displays three selected sets (A,B,C). Rectangle 401 corresponds to set A. Rectangle 402 corresponds to set B. Rectangle 403 corresponds to set C. The relationship of inclusion between each of the sets in indicated.

A plurality of arbitrary portions of the rectangle region in FIG. 4 can be selected to be stored as one set. This facilitates the construction of the complicated retrieval expression to carry out retrieval of the database.

It is to be noted that the retrieval result is represented by means of the area of the rectangle. In the case where there is data satisfying (A and B), (B and C), and (C and A) and not data satisfying (A and B and C) for the three sets of (A, B, and C), the inclusion relationship among (A, B, C) is representing graphically by rotating one rectangle. FIG. 5 shows the display in the event of no data satisfying (A and B and C). Rectangle 401 corresponding to set A is rotated in FIG. 5 to provide the display of the inclusion relationship.

In the method disclosed in Japanese Patent Laid-Open No. 6-89309 that provides a display with a correspondence between the retrieval result and the area, there the case where the relationship of inclusion between four or more sets cannot be represented by the display. Therefore, the number of sets that can be selected at one time is limited to three.

Background Art 3

Japanese Patent Laid-Open No. 9-6791 discloses a method and apparatus of data retrieval as the interface for retrieving data.

The resultant data of retrieval corresponding to one retrieval condition is displayed in a closed region. By overlapping a plurality of regions, data satisfying a plurality of retrieval conditions can be displayed in the area where the plurality of regions overlap.

As shown in FIG. 7A, the resultant data retrieval including the keyword of "vehicle" from a database is shown in region 3201. The resultant data retrieval including the keyword of "individual" is indicated by region 3202. By overlapping regions 3201 and 3202, as shown in FIG. 7B, data included in both regions 3201 and 3202 are displayed in the overlapping region 3203.

Background Art 4

Japanese Patent Laid-Open No. 5-101119 discloses a database system as an interface to supervise the attribute and the attribute value of data.

A rectangle is drawn to surround the data displayed on a screen. By setting an attribute value with respect to the rectangle, the set attribute value can be assigned to the plurality of data in the drawn rectangle. By moving one or more data displayed on the screen to alter the display position thereof, the moved data can be applied with the attribute value set to the rectangle in which the moved data is newly located.

As shown in FIG. 8A, the plurality of data "Boston", "New York", "Ise tour", and "Hiroshima" included in rectangle 3301 are assigned the attribute value of "scenery". As shown in FIG. 8B, rectangle 3302 is drawn so as to encircle the data of "Ise tour", "Hiroshima", "kimono", "lecture", and "test chart" and the attribute value of "individual" has been assigned. If data "kitchen" 3303, displayed in FIG. 8B, is shifted to be located at a display position within rectangle 3301, the display of FIG. 8C is obtained. By this operation, data "kitchen" 3303 is assigned the attribute value of "scenery" associated with rectangle 3301. When data is shifted to a position encircled by a plurality of rectangles, that data will be assigned all the attribute values associated with each of the plurality of rectangles in which the moved data is newly located.

By drawing a two dimensional graphical form, a new attribute is defined for each data. Then, an attribute value corresponding to the new attribute can be assigned to each data.

As shown in FIG. 9A, the attribute of "softness" is plotted along the vertical axis 3401 with a lower limit of "0" and an upper limit of "100". The component of the vertical axis at the data displayed position corresponds to the attribute value for the attribute of "softness".

As shown in FIG. 9B, a horizontal axis 3402 is drawn corresponding to the attribute of "brightness" with a lower limit of "0" and an upper limit of "100". Accordingly, the attribute of "brightness" is also applied to each data. The attribute value for the attribute of "brightness" possessed by the data is provided according to the component of the horizontal axis corresponding to the position where the data is displayed. By moving the data displayed in FIG. 9B, the attribute values with respect to "softness" and "brightness" are modified at the same time.

In the previous Background Art 1, the magic lens must be moved throughout the entire region of retrieval, or expanded so as to overlap the entire region of retrieval in order to include the entire universe of data in the retrieval region. Complicated manipulation is required to search for all the data. The result of whether the data meets a retrieval condition or not is represented by displaying the data with an o or an a x sign, respectively. There is the problem that the ratio of the data satisfying the condition to the data not satisfying the condition cannot be properly obtained.

Background Art 2 is characterized in that the retrieval result is displayed in correspondence with the area of a rectangle. In some cases, an unnatural state in which the rectangle is rotated will occur. Therefore, the amount of data that meets the retrieval condition cannot be accurately discerned. There is also the problem that more than three retrieval conditions cannot be applied at the same time. Furthermore, when the object of retrieval is grouped in advance and the same retrieval is to be carried out over all the groups, a retrieval operation has to be carried out for each of the plurality of groups. When retrieval is carried out and a certain group has no data satisfying the retrieval condition, there is the problem that a determination cannot be made whether there is no data or retrieval with respect to that group was not carried out. FIG. 6 shows an example in which the same retrieval is carried out for each of the subjects of retrieval that are divided into four groups using the technique of Background Art 2. Rectangles 601, 602 and 603 are displayed in the region of groups 1, 2 and 3, respectively. It can be seen in FIG. 6 that data satisfying the retrieval condition is present in groups 1–3. However, no rectangle is displayed in region 604 corresponding to group 4. It cannot be identified whether there is no data as a result of retrieval, or whether retrieval was not carried out for group 4, from just the display of FIG. 6.

The method and apparatus of retrieval disclosed in Background Art 3 is disadvantageous in that only the result of retrieval, not the entire universe of data subject to retrieval is shown. Also, the retrieval condition cannot be dynamically altered to reduce the data.

There is also the problem that an attribute cannot be added to the data or that the attribute value cannot be altered by the retrieval method and apparatus of Background Art 3.

The database system of Background Art 4 allows an attribute to be newly defined to each data. This is carried out using a two dimensional diagram. Therefore, only two attributes at most can be newly defined to each data.

Also, the database system of Background Art 4 is disadvantageous in that the attribute value of three or more attributes cannot be altered at the same time in the operation of modifying the attribute value of the data.

Furthermore, there is the problem that data retrieval cannot be carried out by the interface presented by the database system of Background Art 4.

SUMMARY OF THE INVENTION

In view of the foregoing, an object of the present invention is to provide a data management method and apparatus that can accurately obtain the amount of data satisfying a retrieval condition and the amount of data not satisfying the retrieval condition in searching for data that meets the retrieval condition specified by a user from retrieval data classified into one or more groups.

Another object of the present invention is to provide a data management method that allows retrieval using an unlimited number of retrieval conditions.

A further object of the present invention is to provide a data management method that provides a user interface that allows easy modification of the specification of a group to be retrieved.

Still another object of the present invention is to provide a data management method that can explicitly indicate that retrieval has been carried out even when there is no data that satisfies a retrieval condition.

A still further object of the present invention is to provide a data management method and apparatus that can modify an attribute and an attribute value related to data in a database with a simple operation.

Yet a further object of the present invention is to provide a data management method and apparatus that can retrieve data in a database and that can modify the attribute value of data with a simple operation.

Yet another object of the present invention is to provide a data management method that can modify an attribute value for an unlimited number of attributes at one time with a simple operation in altering the attribute value possessed by each data in a database.

Yet a still further object of the present invention is to provide a data management method that can easily and visually recognize data not assigned an attribute value with respect to a certain attribute out of data in a database.

A data management method according to an aspect of the present invention is used in a data management apparatus including a storage device for storing a plurality of data of interest and an attribute value assigned to each of the plurality of data in association with an arbitrary number of attributes, a display device, an operation designation input device for receiving operation designation from a user through an operation by the user with respect to an object displayed on the display device, and a data operation unit for the operation of the plurality of data according to the operation designation obtained by the operation designation input device. The data management method includes the steps of displaying a plurality of icons representing the plurality of data, respectively, in a certain region within the display screen of the display device, having a new attribute defined by the user using the operation designation input device, adding a new region differing from the certain region into the display screen of the display device to generate a plurality of regions, having an attribute value defined to each of the plurality of regions by the user using the operation designation input device, detecting movement of any of the plurality of icons between the plurality of regions by the operation designation input device, determining to which region the moved icon is shifted, and modifying the attribute value of the data corresponding to the moved icon to the attribute value defined to the region in which the moved icon is newly located.

By moving the icon between the regions, the attribute value of the data is modified. Therefore, modification of the attribute value associated with data can be realized by a simple operation.

A data management method according to another aspect of the present invention is used in a data management apparatus including a storage device for storing a plurality of data of interest and an attribute value assigned to the plurality of data, respectively, associated with an arbitrary number of attributes, a display device, an operation designation input device for receiving operation designation from a user through an operation by the user with respect to an object displayed on the display device, and a data operation unit to effect operation on the plurality of data according to the operation designation obtained by the operation designation input device. The data management method includes the steps of preparing in the storage device a plurality of data applied with respective attribute values associated with first and second attributes, prescribing a plurality of regions not overlapping each other that are prepared for each defined attribute value associated with the first attribute on the display screen of the display device, prescribing a display position of a plurality of icons representing data having an attribute value corresponding to each region with respect to the first attribute to display the plurality of icons within each region, displaying the plurality of regions and the plurality of icons at the display position prescribed in the display screen of the display device, defining a first filter related to a desired attribute value with respect to the second attribute on the display screen using the operation designation input device, and classifying the displayed icon located in the region partially overlapping with the first filter according to whether the attribute value assigned in association with the second attribute for the data represented by that icon has a predetermined relationship with the attribute value to which the first filter is related, and moving that icon inside and outside the first filter for display.

An attribute and an attribute value are connected to the filter overlapping the region. By this operation, an icon representing the data satisfying all the relationships of an attribute and an attribute value of the region and the filter is displayed in the overlapping area of the region and the filter to allow data retrieval. By using such a filter, data retrieval can be realized with a simple operation. Also, the amount of data satisfying a retrieval condition and the amount of data not satisfying a retrieval condition can be obtained accurately. When there are a plurality of regions, the filter can be shifted or the shape of the filter can be modified to produce an overlapping area of the filter for each region. Accordingly, specification of a group to be retrieved can easily be modified. Furthermore, even in the case which there is no data that meets the retrieval condition, execution of retrieval can be explicitly identified by displaying the filter of retrieval without the icon therein.

Preferably, the data management method further includes the step of detecting movement of one of the plurality of icons to a section in the first filter and overlapping with one of the plurality of regions, and modifying the attribute value of the second attribute and the attribute value of the first attribute of the data represented by the moved icon to the attribute value related to the first filter and to the attribute value related to the region where the moved icon is newly located.

By shifting an icon representing data into a filter to which an attribute and an attribute value are connected, the attribute value of the data can be modified. Therefore, retrieval of data and modification of an attribute value can be realized using the same interface.

Still more preferably, the data management method further includes the steps of assigning an attribute value associated with a third attribute to the plurality of data, defining a second filter related to a desired attribute value with respect to the third attribute on the display screen using the operation designation input device, and classifying the displayed icon according to whether the attribute values assigned in association with the second and third attributes have a predetermined relationship with the attribute values related to the first and second filters respectively for the data represented by that displayed icon, and moving that icon into a region inside both the first and second filters, into a region inside either the first or second filter, or into a region in neither the first nor second filter for display.

By displaying a plurality of filters in an overlapping manner, data can be reduced. An arbitrary number of filters can be used to allow retrieval according to an unlimited number of retrieval conditions.

Still more preferably, the data management method further includes the steps of having an attribute value related to the first filter input by a user using the operation designation input device, and modifying the attribute value of the data corresponding to an icon displayed in the first filter to the attribute value of the first filter when the user designates modification of the attribute value of the data corresponding to the icon displayed in the first filter to the attribute value of the first filter using the operation designation input device.

By modifying the attribute value related to the filter, the attribute value of the data corresponding to the icon displayed in the filter can be altered. Therefore, modification of the attribute value related to data can be realized with simple operation.

Still more preferably, the data management method further includes the step of generating a new region when there is data that does not have an attribute value corresponding to a certain attribute, and displaying in the new region an icon representing the data that does not have an attribute value corresponding to the certain attribute.

Accordingly, data that does not have an attribute value assigned thereto can easily be recognized visually with respect to a certain attribute.

A data management method according to a further aspect of the present invention is used in a data management apparatus including a storage device for storing a plurality of data of interest and an attribute value assigned to the plurality of data, respectively, associated with an arbitrary number of attributes, a display device, an operation designation input device receiving operation designation from a user through an operation by the user with respect to an object displayed on the display device, and a data operation unit to effect operation with respect to the plurality of data according to the operation designation obtained through the operation designation input device. The data management method includes the steps of preparing, in the storage device, a plurality of data to which an attribute value is assigned for the first and second attributes, prescribing a plurality of regions not overlapping each other, prepared for each attribute value defined in association with the first attribute on a display screen of the display device, prescribing a display position of a plurality of icons representing respective data having an attribute value corresponding to each of the regions with respect to the first attribute to display the plurality of icons in each region, displaying the plurality of regions and the plurality of icons at the prescribed display position in the display screen of the display device, defining a first filter related to a desired attribute value with respect to the second attribute on the display screen using the operation designation input device, and detecting movement of one of the plurality of icons to a section in the first filter and overlapping with one of the plurality of regions, and modifying the attribute value of the second attribute and the attribute value of the first attribute of the data represented by the moved icon to the attribute value related to the first filter and to the attribute value related to the region where the moved icon is newly located, respectively.

By moving an icon representing data into a filter to which an attribute and an attribute value are connected, the attribute value of data can be modified.

A data management apparatus according to still another aspect of the present invention includes a storage device for storing a plurality of data having a plurality of attributes and a plurality of attribute values connected to each of the plurality of attributes, a display device, a circuit to provide control of displaying on the display device a region provided for each attribute value of a certain attribute, not overlapping each other, and displaying a plurality of icons representing the plurality of data, respectively, on the region, and a circuit to provide control of detecting movement of the icon between regions, and modifying the attribute value of N—the data represented by the moved icon to the attribute value defined to the region to which the moved icon is newly located.

The attribute value of the data is modified by moving an icon between regions. Therefore, modification of an attribute value associated with data can be realized with easy operation.

Preferably, the data management apparatus further includes a circuit to define and display on the display device a filter related to a desired attribute and an attribute value, and a circuit to classify an icon displayed in the region that is partially overlapping with the filter according to whether the assigned attribute value related to the attribute in association with the filter for the data represented by the icon has a predetermined relationship with the attribute value related to the filter, and moving the icon inside and outside the filter for display.

An attribute and an attribute value are connected with the filter overlapping a region. By this operation, an icon representing the data that satisfies all the relationships of an attribute and an attribute value of the region and the filter is displayed in the overlapping area of the region and the filter to allow data retrieval. By using such a filter, data retrieval can be realized with a simple operation. Also, the amount of data that satisfies a retrieval condition and the amount of data that does not satisfy a retrieval condition can be accurately obtained.

More preferably, the data management system further includes a circuit to detect movement of one of the plurality of icons to a section in the filter and overlapping with one of the plurality of regions, and modifying the attribute value of the attribute related to the filter with respect to the data represented by the moved icon to the attribute value related to the filter.

By moving an icon representing data into the filter to which an attribute and an attribute value are connected, the attribute value of the data can be modified. Therefore, retrieval of data and modification of an attribute value can be realized using the same interface.

A computer-readable recording medium according to a still further aspect of the present invention has a data management program recorded therein for executing with a computer a data management method to display a plurality of icons corresponding to a plurality of data including a plurality of attributes and a plurality of attribute values connected to each of the plurality of attributes within a region provided for each attribute value of a certain attribute and not overlapping with each other. The data management method includes the steps of displaying the plurality of icons representing the plurality of data, respectively, within a certain region, having a new attribute defined by a user, adding a new region differing from the certain region to generate a plurality of regions, having an attribute value defined to each of the plurality of regions by a user, detecting movement of any of the plurality of icons between the plurality of regions, determining which region the moved icon is now located, and modifying the attribute value of the data corresponding to the moved icon to the attribute value defined to the region in which the moved icon is newly located.

By moving the icon between regions, the attribute value of the data can be modified. Therefore, modification of an attribute value of data can be realized with a simple operation.

A computer-readable recording medium according to yet a further aspect of the present invention has a data management program recorded therein for executing, with a computer, a data management method of displaying a plurality of icons corresponding to a plurality of data including a plurality of attributes and a plurality of attribute values assigned to each of the plurality of attributes in a region provided for each attribute value of a certain attribute, not overlapping each other. The data management method includes the steps of preparing the plurality of data to which an attribute value is assigned in association with first and second attributes, prescribing a plurality of regions not overlapping each other, prepared for each attribute value defined in association with the first attribute, prescribing a display position of a plurality of icons representing respective data having an attribute value corresponding to each region with respect to the first attribute to display the plurality of icons in each region, displaying the plurality of regions and the plurality of icons at respective prescribed display positions, defining a first filter related to a desired attribute value with respect to the second attribute on the plurality of regions, and classifying the displayed icon located in the region partially overlapped with the first filter according to whether the attribute value assigned in association with the second attribute for the data represented by that icon has a predetermined relationship with the attribute value associated with the first filter, and moving the icon inside and outside of the first filter for display.

An attribute and an attribute value are connected with the filter overlapping a region. By this operation, an icon representing the data satisfying all the relationships of an attribute and an attribute value of the region and the filter is displayed in the overlapping area of the region and the filter to allow data retrieval. By using such a filter, data retrieval can be realized with a simple operation. Also, the amount of data satisfying a retrieval condition and the amount of data not satisfying a retrieval condition can be precisely obtained. By moving the filter or modifying the shape of the filter when there are a plurality of regions to generate an overlapping area of a filter and each region, specification of a group to be retrieved can be modified easily. Furthermore, even in the case where there is no data satisfying a retrieval condition, execution of retrieval can be explicitly identified by displaying the filter of retrieval with no icon therein.

Preferably, the data management method further includes the step of detecting movement of one of the plurality of icons to a section in the first filter and overlapping with one of the plurality of regions, and modifying the attribute value of the second attribute and the attribute value of the first attribute of the data represented by the moved icon to the attribute value associated with the first filter, and to the attribute value associated with the region in which the moved icon is newly located, respectively. By moving the icon representing data into the filter to which an attribute and an attribute value are connected, the attribute value of the data can be modified. Therefore, data retrieval and modification of an attribute value can be realized using the same interface.

More preferably, the data management method further includes the steps of assigning an attribute value for a third attribute to the plurality of data, prescribing a second filter related to a desired attribute value with respect to the third attribute on the plurality of regions, classifying the displayed icon according to whether the assigned attribute values related to the second and third attributes has a predetermined relationship with the attribute values related to the first and second filters, respectively, for the data represented by that icon, and moving that icon to any of a region inside both the first and second filters, a region inside either the first or second filter, or a region in neither the first nor second filter for display.

By displaying a plurality of filters in an overlapping manner, data can be reduced. Also, an arbitrary number of filters can be used to allow retrieval according to an unlimited number of retrieval conditions.

Still more preferably, the data management method further includes the steps of having an attribute value related to the first filter input by a user, and modifying an attribute value of data corresponding to an icon displayed in the first filter to the attribute value of the first filter when the user designates modification of the attribute value of the data corresponding to the icon displayed in the first filter to the attribute value of the first filter.

By modifying the attribute value related to the filter, the attribute value of the data corresponding to the icon displayed in the filter can be altered. Therefore, modification of an attribute value related to data can be realized with a simple operation.

Still more preferably, the data management method further includes the steps of generating a new region when there is data that does not have an attribute value for a certain attribute, and displaying an icon representing the data that does not have an attribute value corresponding to the certain attribute within the new region.

Data that does not have an attribute value assigned with respect to a certain attribute can easily be recognized visually.

A computer-readable recording medium according to yet another aspect of the present invention has a data management program recorded therein to execute, with a computer, a data management method of displaying a plurality of icons corresponding to a plurality of data each including a plurality of attributes and a plurality of attribute values corresponding to the plurality of attributes in a region that is provided for each attribute value of a certain attribute, and that does not overlap each other. The data management method includes the steps of preparing the plurality of data to which attribute values are assigned in association with the first and second attributes, prescribing a plurality of regions that do not overlap each other, prepared for each attribute value defined in association with the first attribute, prescribing a display position of a plurality of icons representing data having an attribute value corresponding to each region with respect to the first attribute to display the plurality of icons in each region, displaying the plurality of regions and the plurality of icons at respective prescribed display positions, defining on the plurality of regions a first filter related to a desired attribute value with respect to the second attribute, and detecting movement of one of the plurality of icons to a section in the first filter and overlapping with one of the plurality of regions, and modifying the attribute value of the second attribute and the attribute value of the first attribute of the data represented by the moved icon to the attribute value related to the first filter, and to the attribute value related to the region in which the moved icon is newly located, respectively.

By moving the icon representing data into the filter to which an attribute and an attribute value are connected, the attribute value of data can be modified.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 shows a screen display for grouping the subjects of retrieval according to classes in the data retrieval method according to the first embodiment of the present invention.

FIG. 25 shows a screen display where the grouping region method of FIG. 13 is modified.

FIG. 40 shows a data management table in which the attribute of "team" is added to each data.

FIG. 52 shows a data management table in which the attribute value for the attribute of "team" of data 1D104 is modified.

FIG. 57 shows a data management table in which the attribute of "home run" is added to each data.

FIG. 63 shows a data management table for modifying an attribute value for the attribute of "home run" of data ID 104.

FIG. 66 shows a data management table when the attribute values for the attributes of "team" and "home run" of data ID 108 are modified at the same time.

FIG. 68 shows a data management table for adding the attribute of "strike out" for each data.

FIG. 70 shows a data management table when the attribute values for the attributes of "team", "home run" and "strike out" of data ID 102 are modified at one time.

FIG. 73 shows a data management table when data of data ID 113 and data ID 114 are newly added.

DESCRIPTION OF THE PREFERRED EMBODIMENTS

First Embodiment

Figure 1:
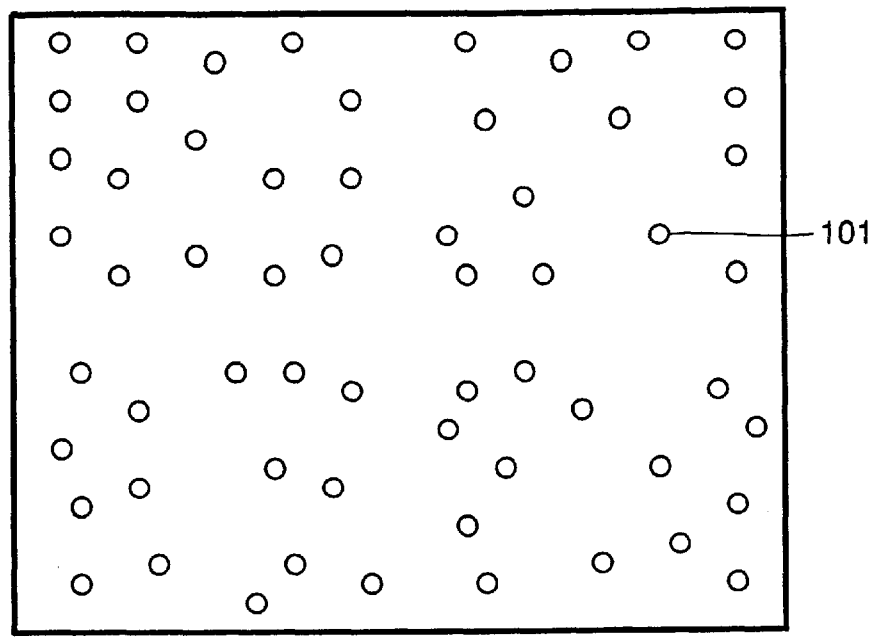
FIG. 1 shows a screen display of data to be retrieved in the data retrieval using Background Art 1.
Figure 2:
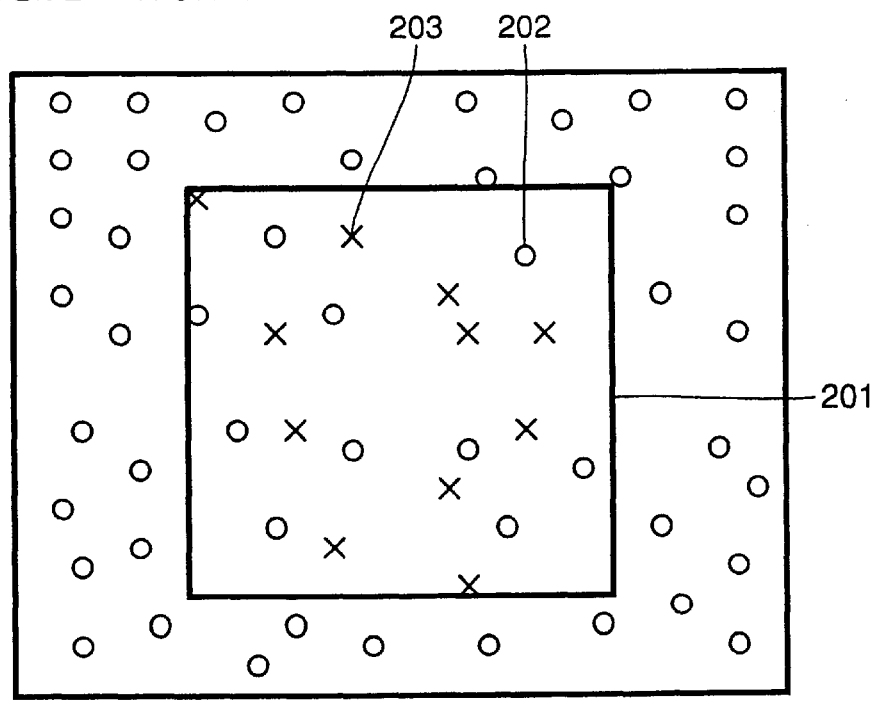
FIG. 2 shows a screen display in retrieving data corresponding to a male from the data corresponding to an individual using Background Art 1.
Figure 3:
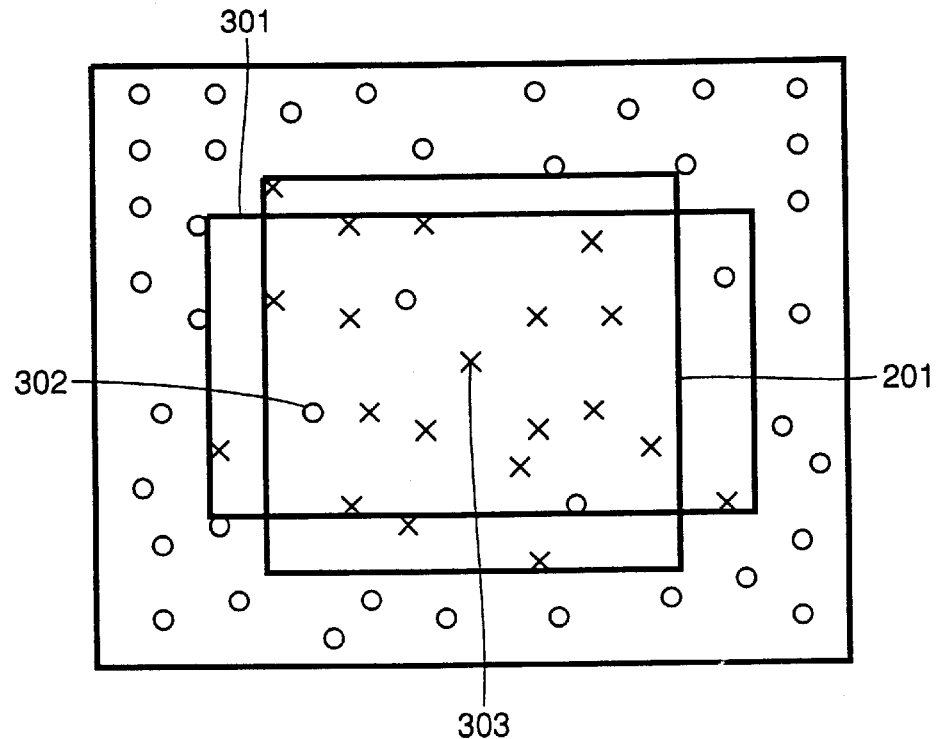
FIG. 3 shows a screen display of an AND operation of retrieval of data using two magic lenses according to Background Art 1.
Figure 4:
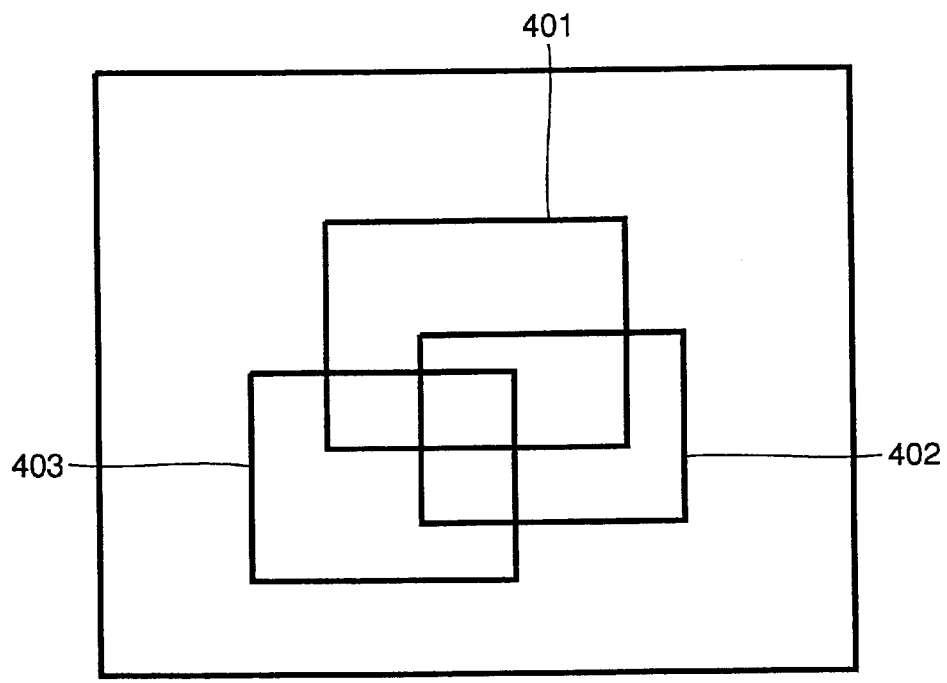
FIG. 4 shows the method of displaying a database retrieval result using background Art 2.
Figure 5:
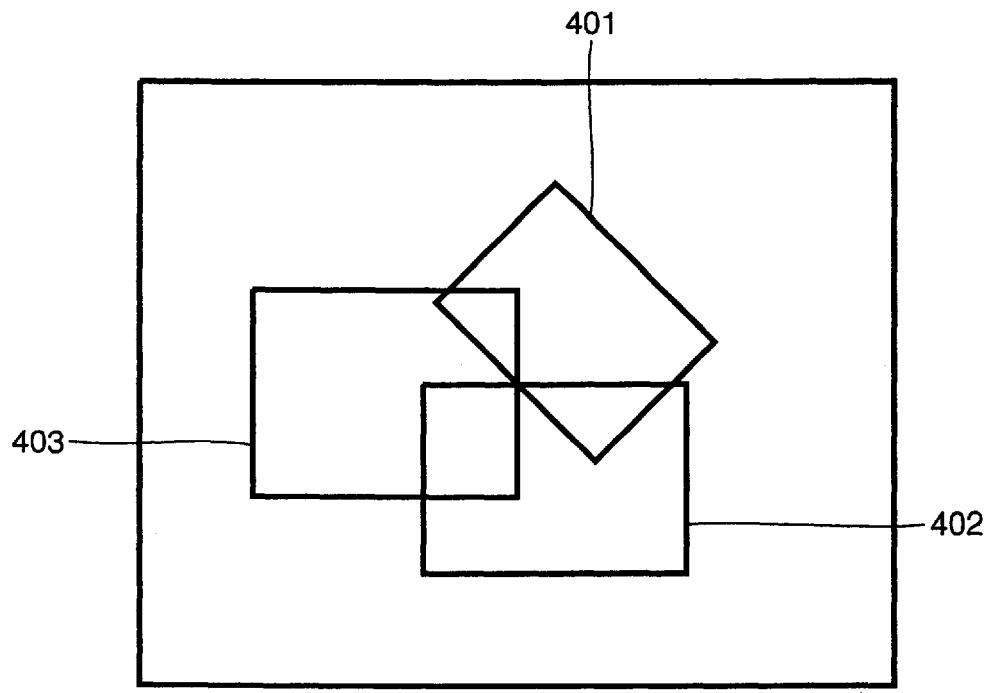
FIG. 5 shows the display method of a retrieval result when there is a set corresponding to (A and B), (B and C) and (C and A) and when there is no set corresponding to (A and B and C) for three retrieval sets (A, B, C) according to Background Art 2.
Figure 6:
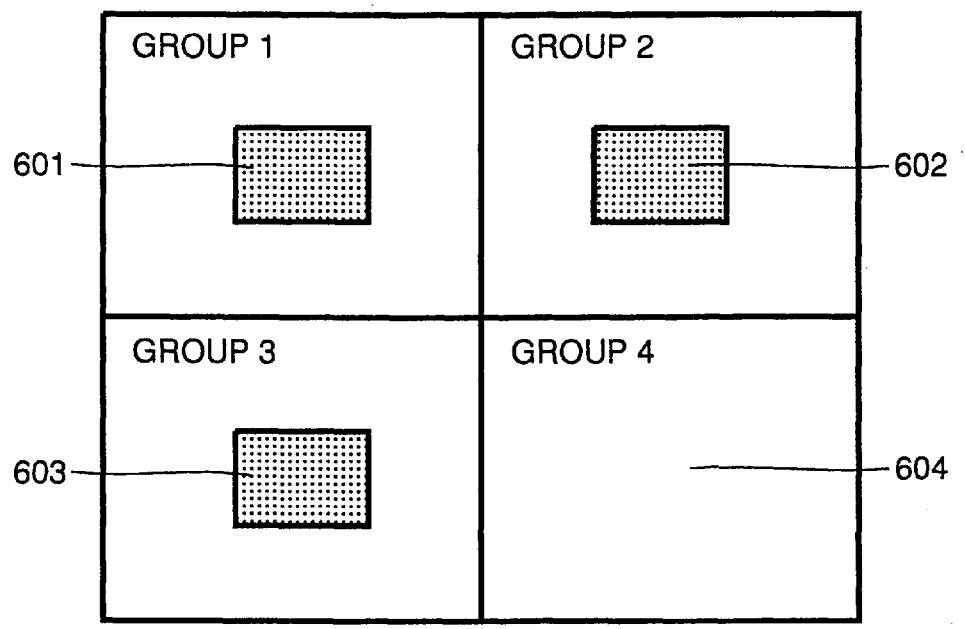
FIG. 6 shows a screen display in retrieving data that are grouped in advance according to Background Art 2.
Figure 7A:
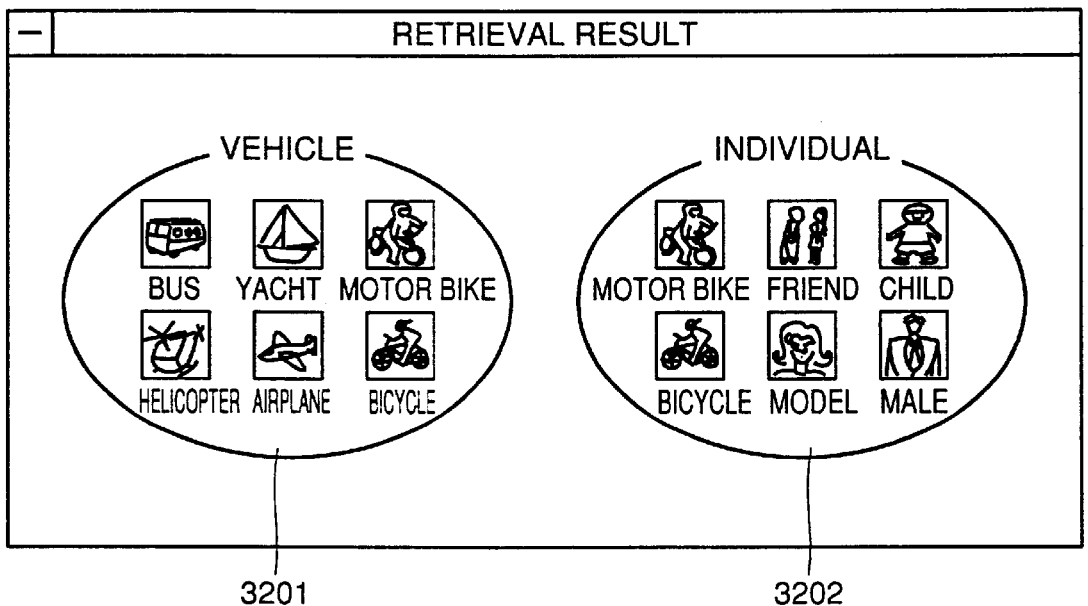
FIGS. 7A–7B show the display method of the result of data retrieval according to Background Art 3.
Figure 7B:
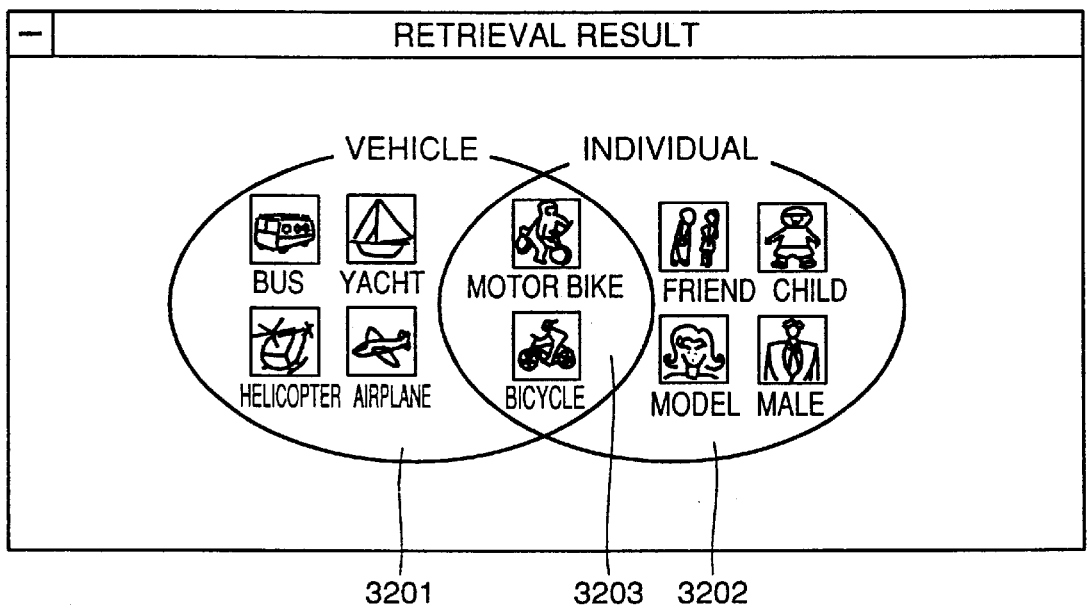
Figure 8A:
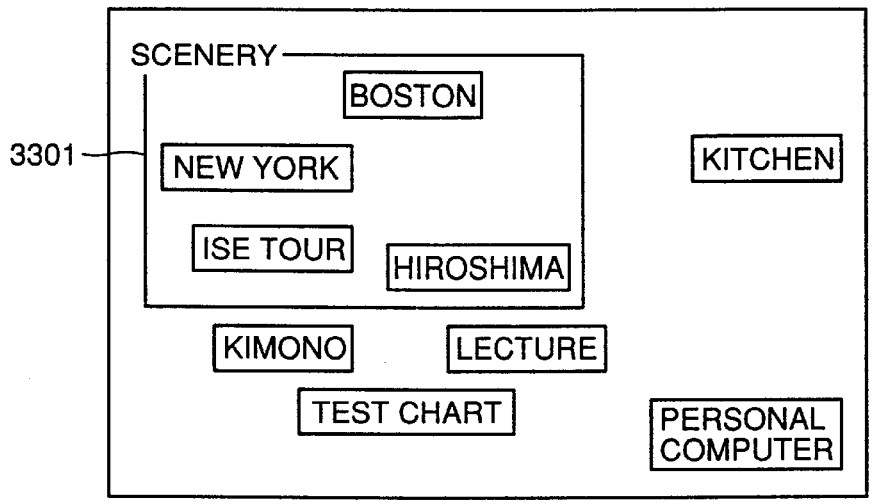
FIGS. 8A–8C show the method of assigning an attribute value to a plurality of data, and the method of modifying the attribute value by moving data according to Background Art 4.
Figure 8B:
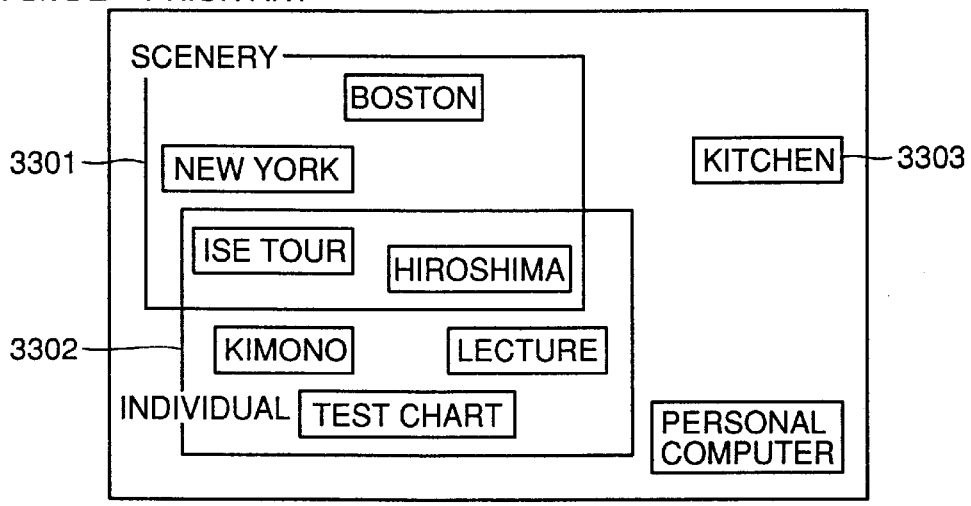
Figure 8C:
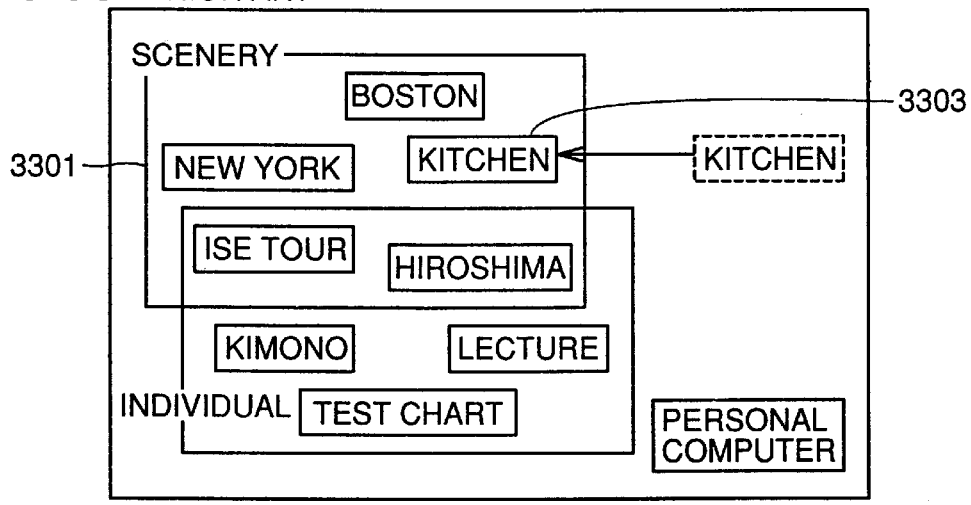
Figure 9A:
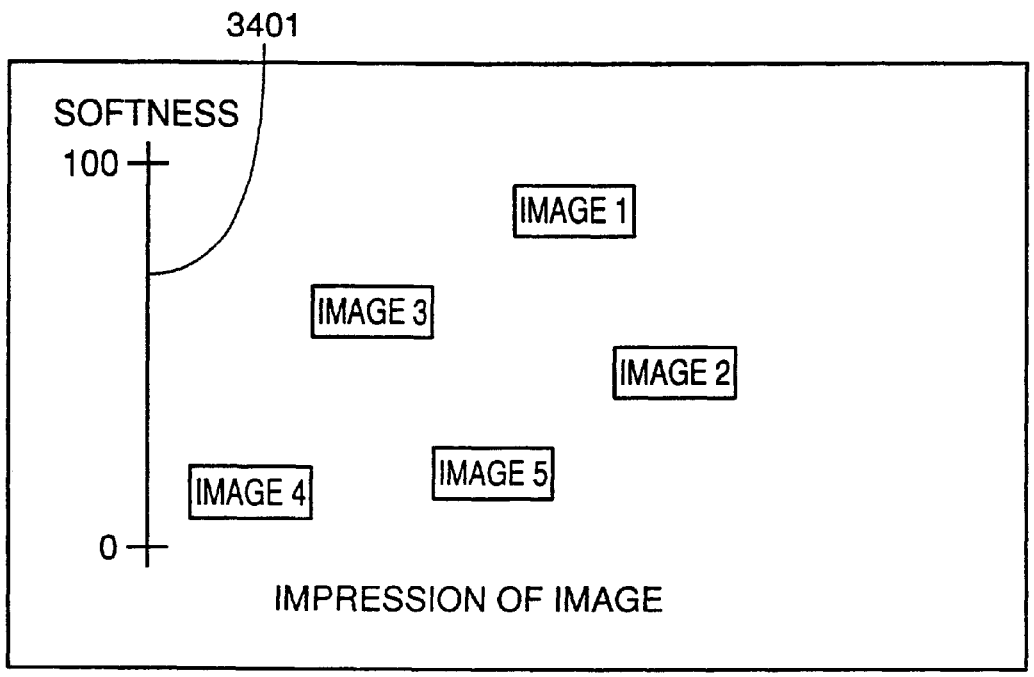
FIGS. 9A–9B show the method of assigning an attribute to data according to Background Art 4.
Figure 9B:
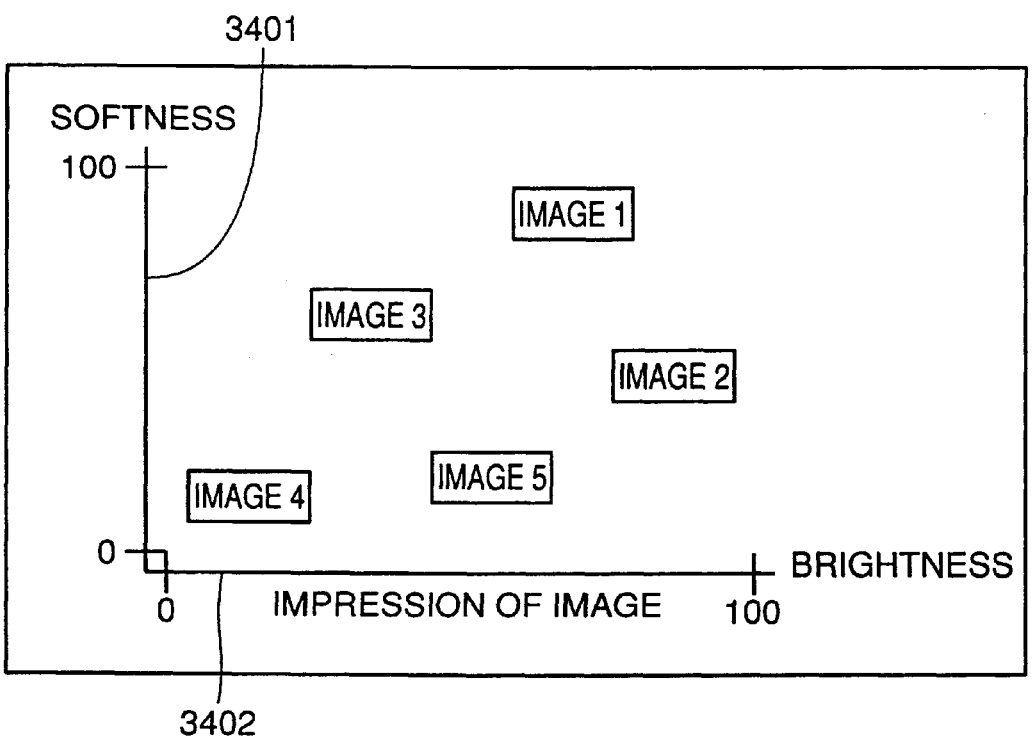

A data retrieval apparatus according to a first embodiment of the present invention will be described hereinafter with reference to the drawings. The same or corresponding components have the same reference character allotted. The labels and feature thereof are also identical. Therefore, a detailed description of the same or corresponding components will not be repeated.

Figure 10A:
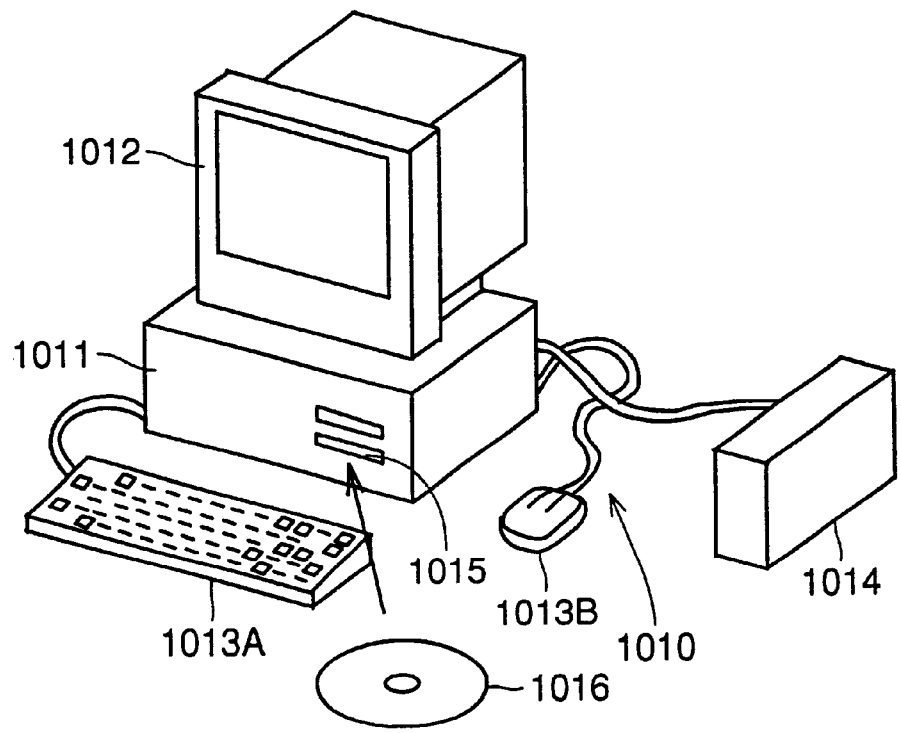
FIGS. 10A–10B depict the data retrieval apparatus according to a first embodiment of the present invention.

As shown in FIG. 10A, data retrieval apparatus 1010 includes a computer 1011, a keyboard 1013A and a mouse 1013B to provide respective designation to computer 1011, a monitor 1012 to present the information of the operated result and the like of computer 1011, a CD-ROM (Compact Disc-Read Only Memory) device 1015 for reading out a program executed by computer 1011, and a magnetic disc 1014 to store a program, data, and the like.

The program to carry out data retrieval is stored in CD-ROM 1016 which is a recording medium that can be read out by the computer. The program is read out by CD-ROM device 1015.

Figure 10B:
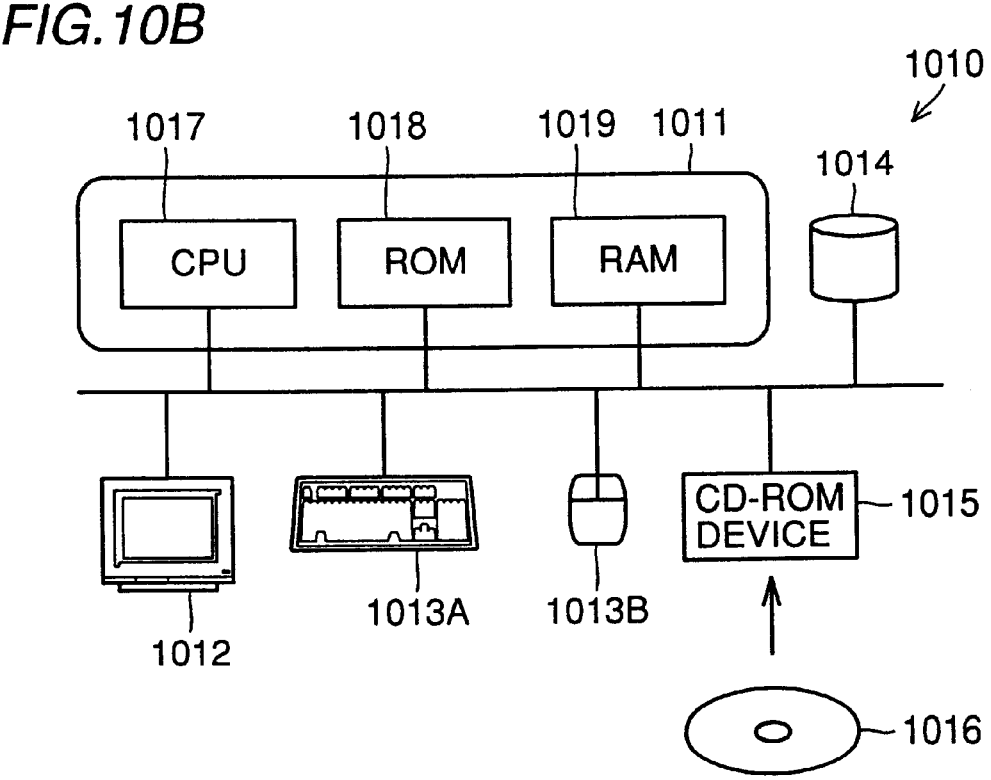

As shown in FIG. 10B, computer 1011 includes CPU (Central Processing Unit) 1017 to execute the program read out via CD-ROM device 1015, ROM (Read Only Memory) 1018 for storing the program and data required for the operation of computer 1011, and RAM (Random Access Memory) 1019 to store data such as a parameter at the time of execution of the program.

A method of data retrieval according to the above described data retrieval apparatus will be schematically described with reference to FIGS. 11–30. The following description corresponds to the case where the present method is applied to search for a child satisfying a desired condition from a data set of children in the fourth grade in elementary school. However, it should be understood that the method of the present invention is not limited to a particular subject of retrieval, a particular retrieval condition, or a particular display method.

Figure 11:
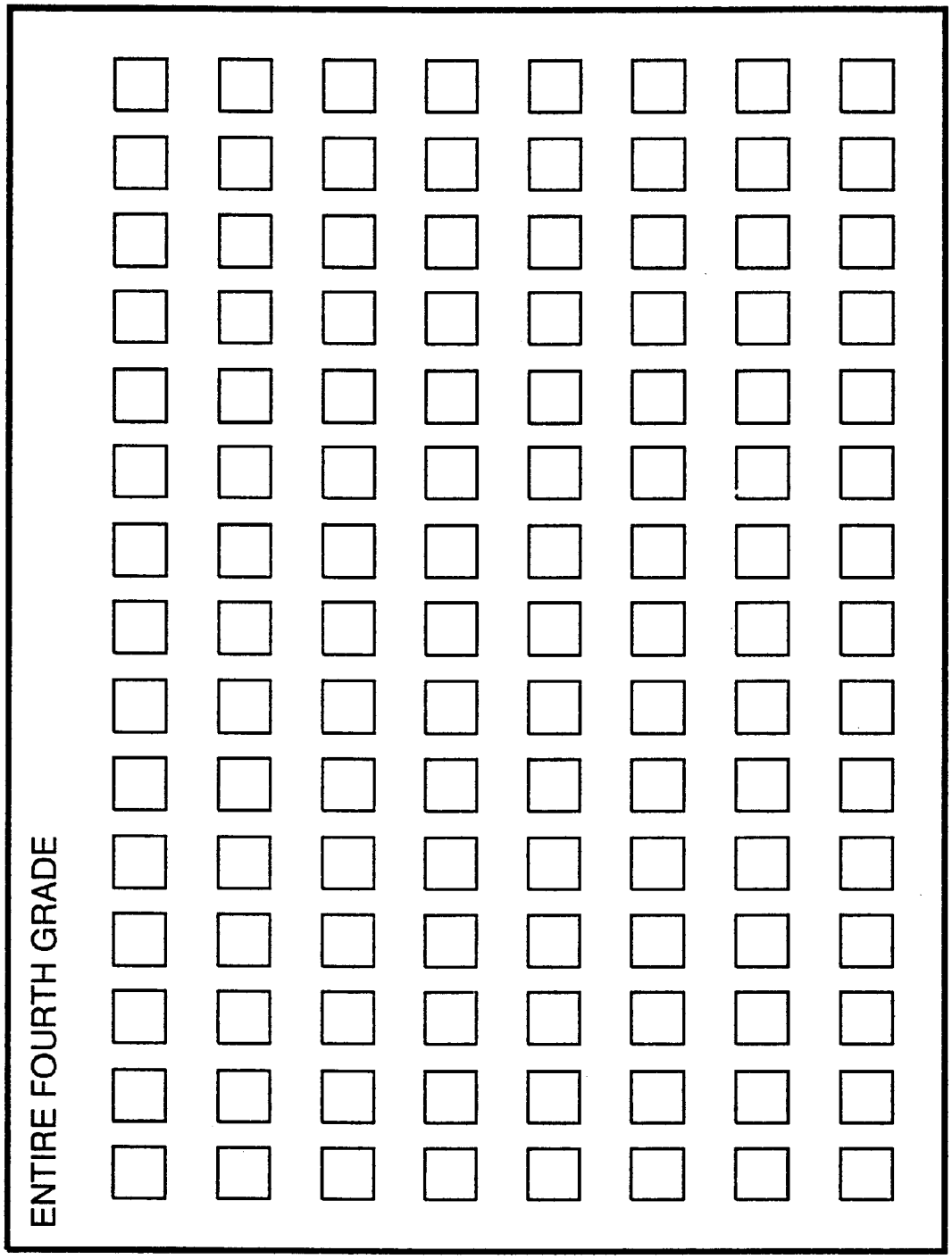
FIG. 11 shows an initial screen display where grade school students are the subject of retrieval in the data retrieval method according to the first embodiment of the present invention.

FIG. 11 shows a display of all the children in the fourth grade. Each icon corresponds to the data of one child. A face picture of a child (not shown) is displayed as an icon.

It is assumed that each child data includes an attribute value for attributes such as name, roll book number, sex, height, blood type, date of birth, and the like in addition to the face picture.

Figure 12:
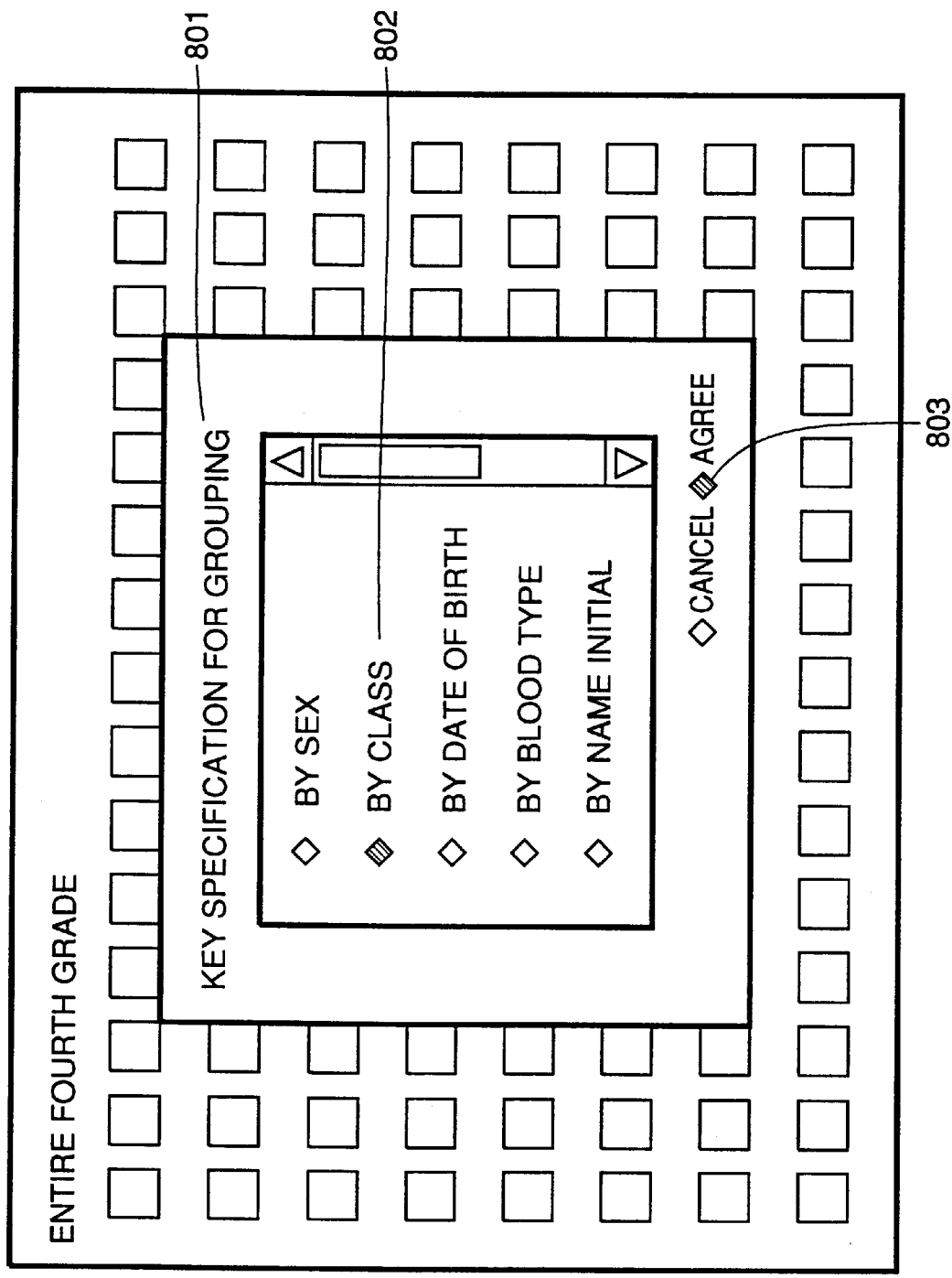
FIG. 12 shows a screen display for grouping the subjects of retrieval in the data retrieval method according to the first embodiment of the present invention.

Specification of a key to group the data set of all the children into one group or more will be described with reference to FIG. 12. A dialogue 801 is displayed by user input. The user selects one key corresponding to a relevant group from a selection box 802, and depresses the "agree" button 803. Here, the key of "classification by class" is selected.

Figure 13:
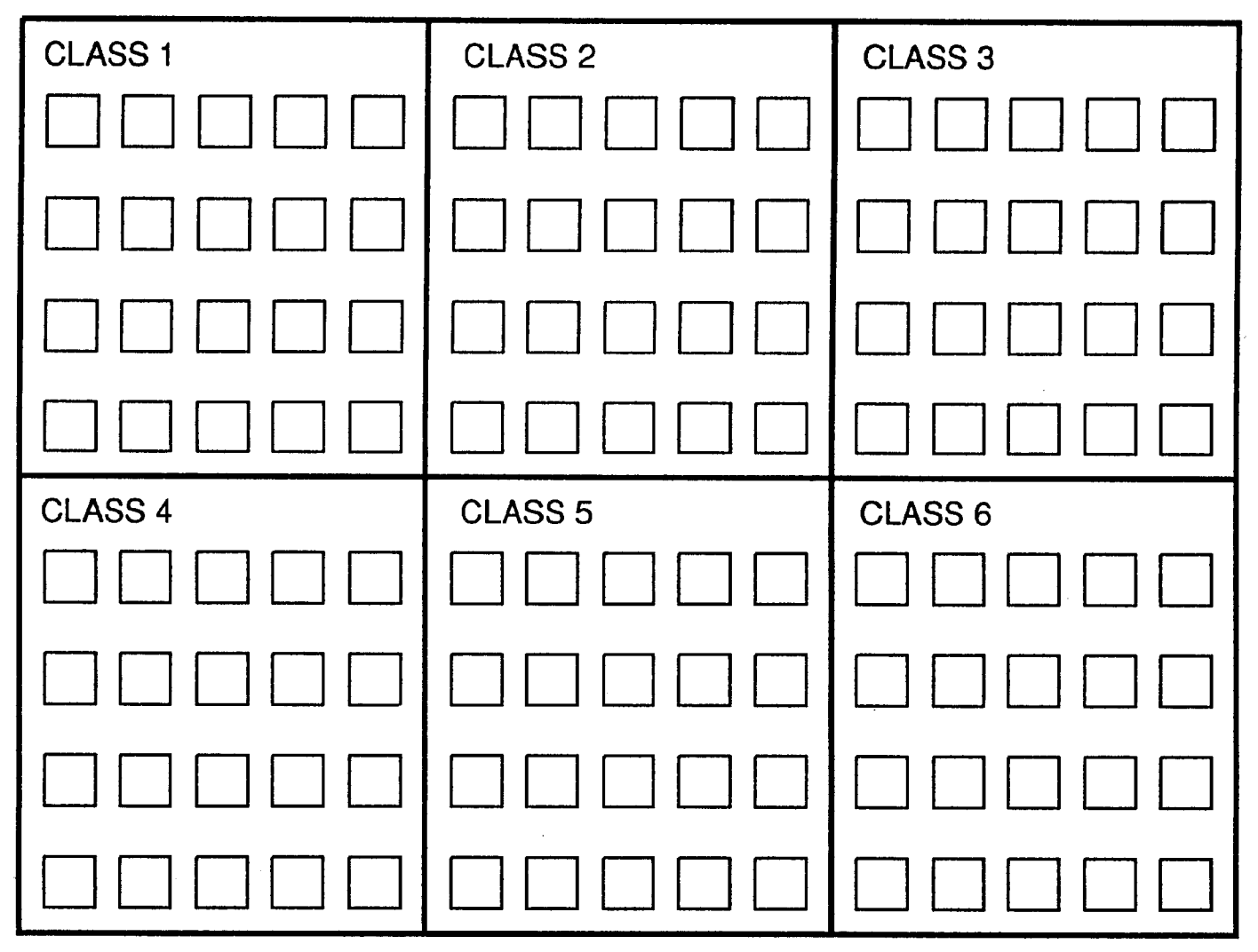

FIG. 13 shows the entire children data set grouped into classes. The children data set is grouped into classes 1–6. The label of each group is displayed at the left top area of the region corresponding to each group.

Figure 14:
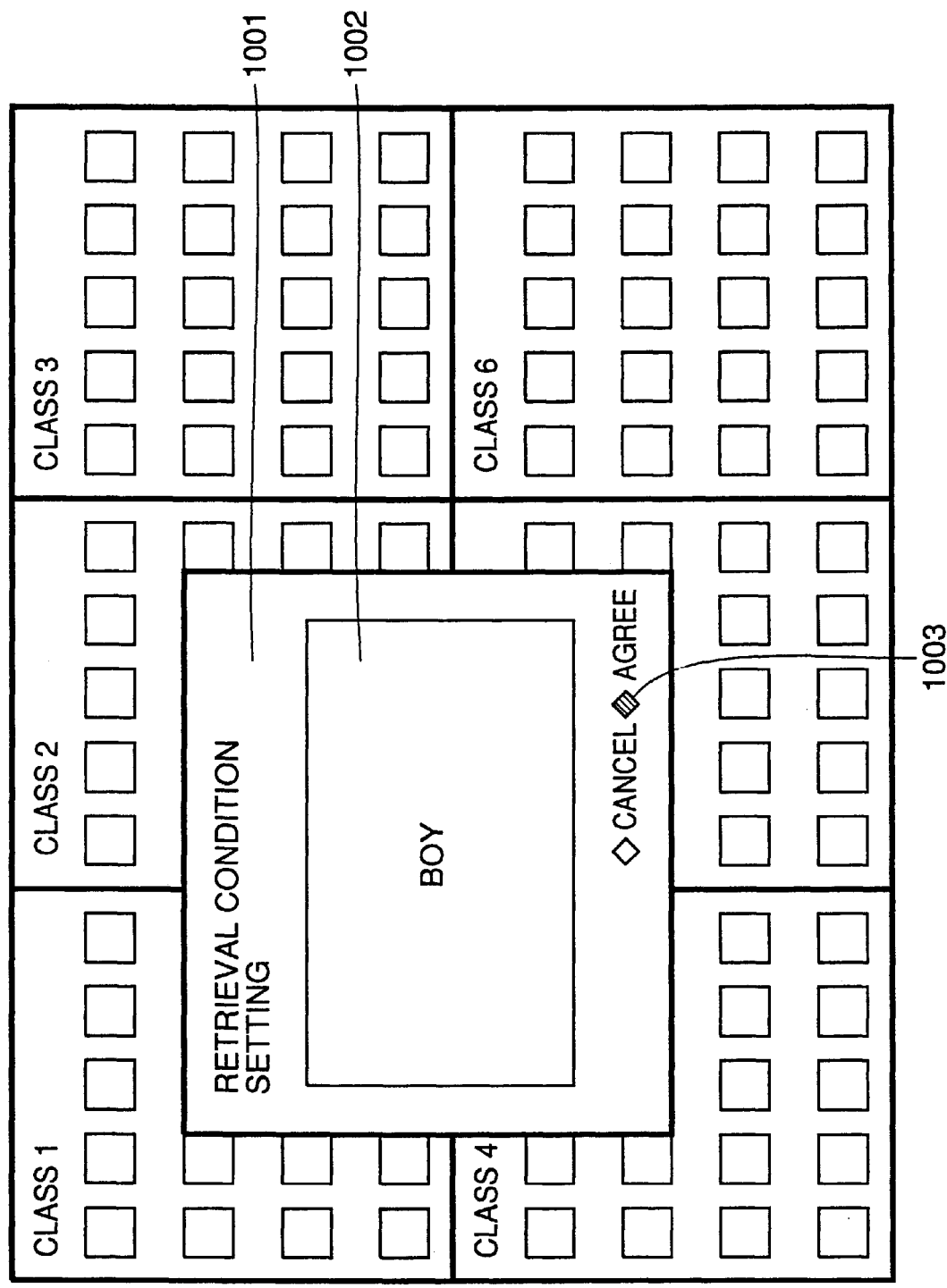
FIG. 14 shows a screen display for setting a retrieval condition of a filter to carry out retrieval by use of the filter in the data retrieval method according to the first embodiment of the present invention.

FIG. 14 shows the screen for setting a retrieval condition using a filter. Dialog 1001 is displayed in response to user input. The user enters a retrieval condition into a retrieval condition setting area 1002 and depresses agree button 1003. The area displaying dialogue 1001 functions as a filter. Here, "boy" is set as the retrieval condition.

Figure 15:
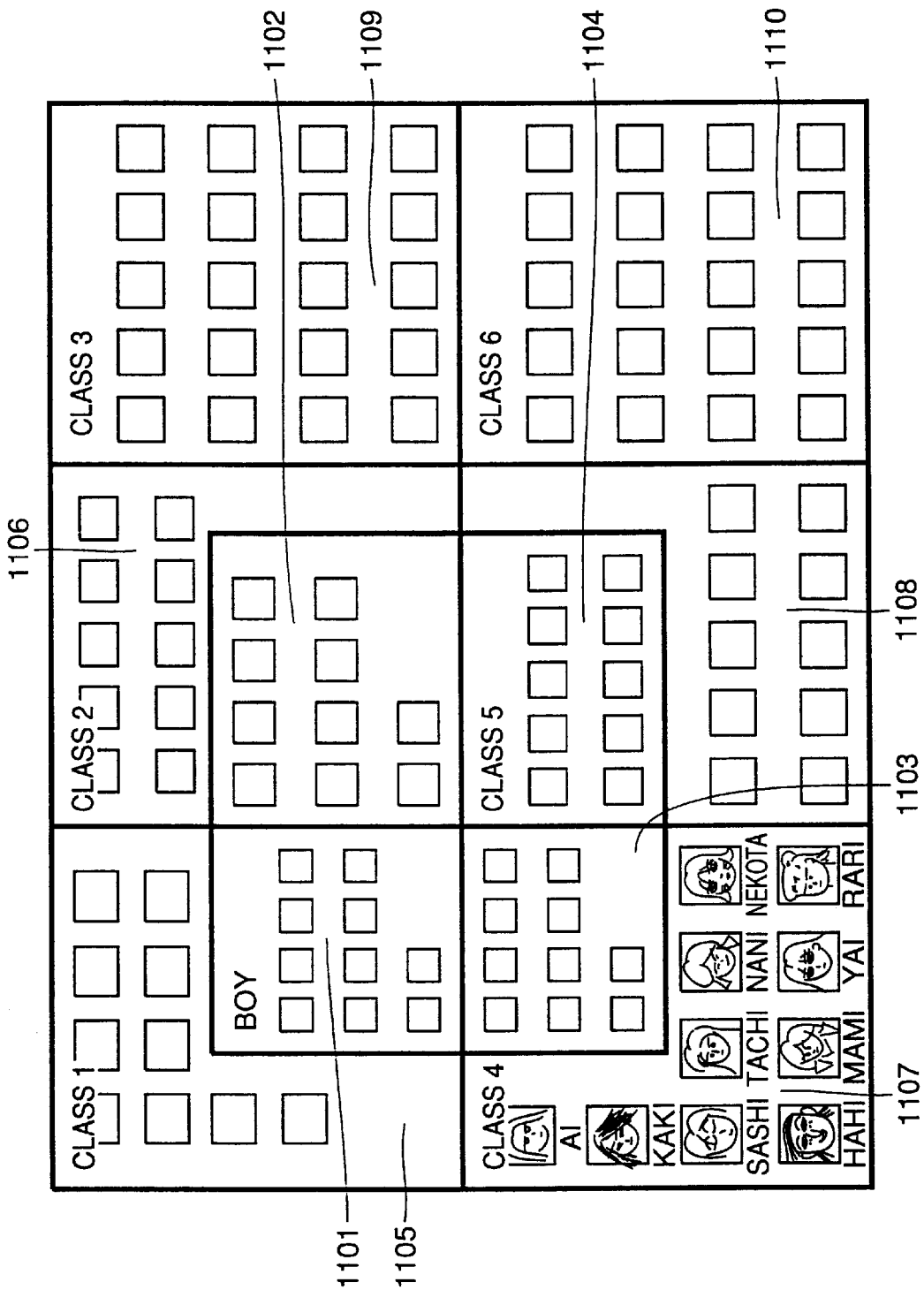
FIG. 15 shows a screen display for retrieving boy students from classes 1, 2, 3 and 4 using a filter in the data retrieval method according to the first embodiment of the present invention.

FIG. 15 shows the screen display right after agree button 1003 of FIG. 14 is depressed. The retrieval condition is displayed at the left top area of the filter. Respective icons representing a boy in each class are displayed in respective sections 1101, 1102, 1103, and 1104 where the filter overlaps the regions corresponding to classes 1, 2, 4 and 5. Also, respective icons representing a child that is not a boy, i.e. a girl are displayed in the sections 1105, 1106, 1107, and 1108 where the filter does not overlap. There is no change in regions 1109 and 1110 corresponding to classes 3 and 6 where the filter does not overlap.

When the number of displayed data relative to the size of a display area becomes so few that the display area for one data exceeds a certain standard value, detailed information of the data will be displayed, as shown in the section 1107 of FIG. 15. The size of each icon is increased to display a face picture in a more detailed manner. Also, the name of each child will newly be displayed.

Figure 16:
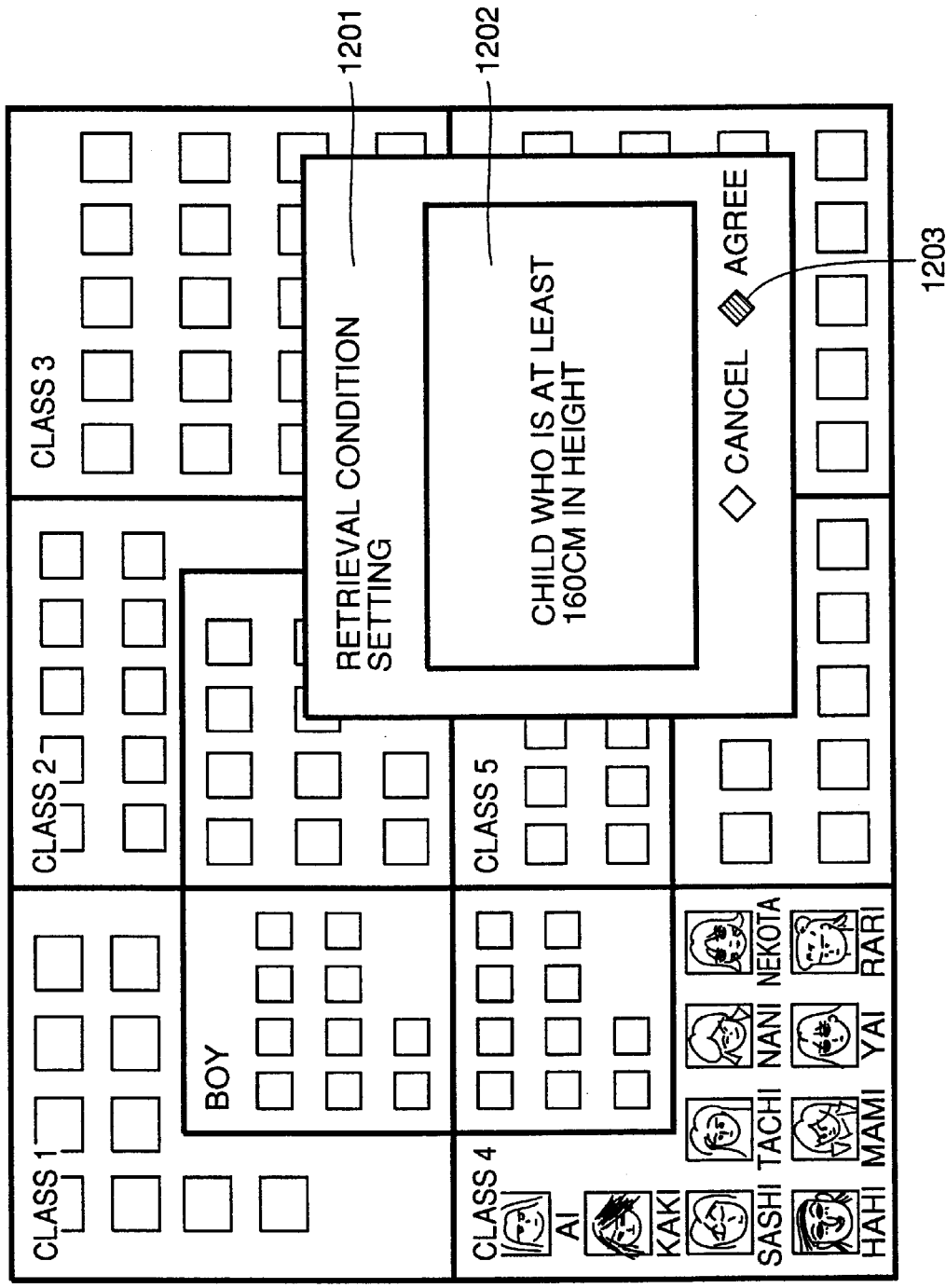
FIG. 16 shows a screen display for setting a retrieval condition for a second filter in carrying out retrieval using two filters in the data retrieval method according to the first embodiment of the present invention.

FIG. 16 shows the screen for generating a new filter to set a retrieval condition. Dialogue 1201 is displayed in response to user input. The user enters a retrieval condition into retrieval condition setting area 1202 and depresses agree button 1203. The section displaying dialogue 1201 serves as a filter. Here, "a child who is at least 160 cm in height" is set as the retrieval condition.

Figure 17:
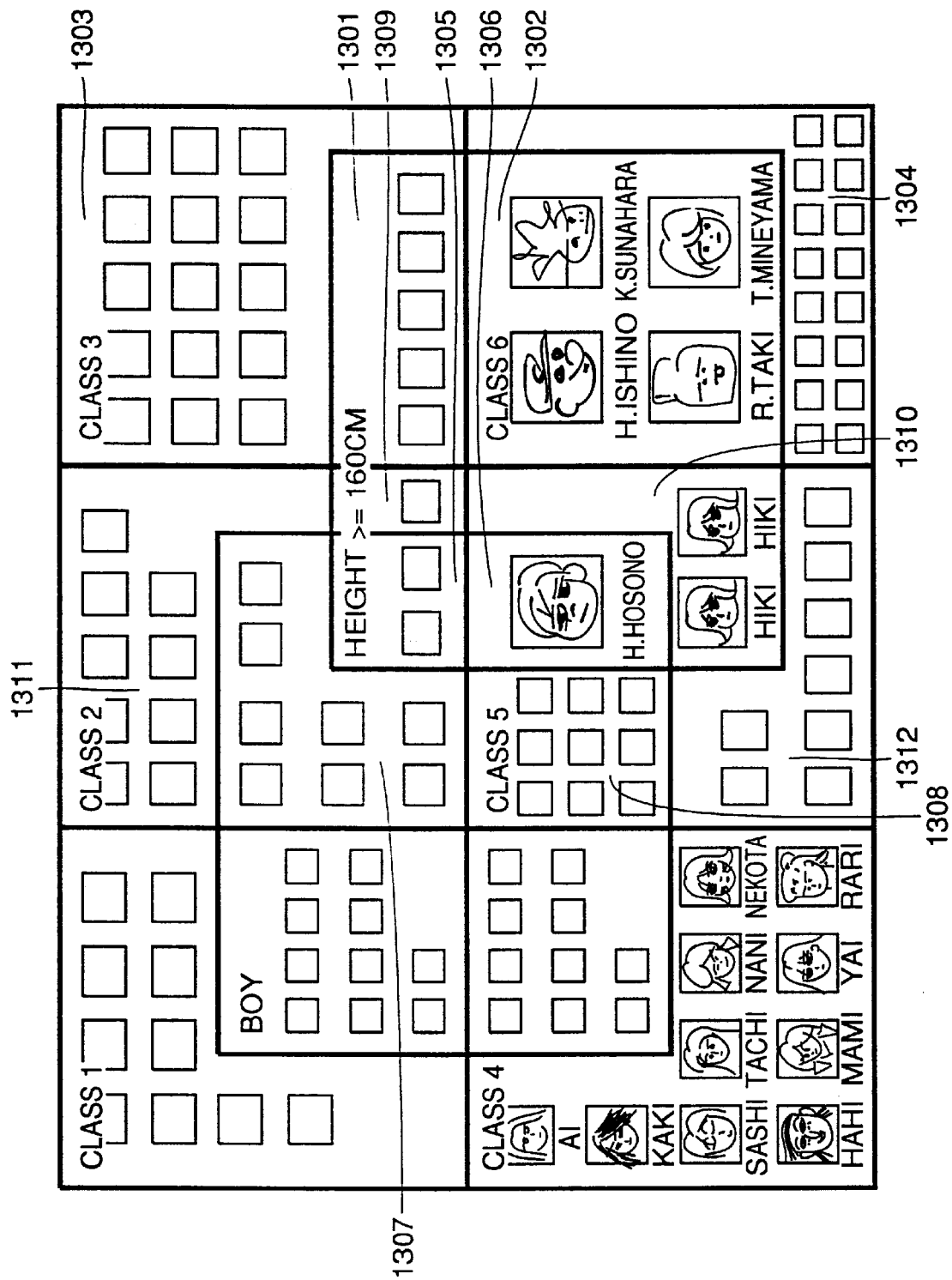
FIG. 17 shows a screen display for carrying out an AND operation retrieval using two filters in the data retrieval method according to the first embodiment of the present invention.

FIG. 17 shows the screen display right after agree button 1203 of FIG. 16 is depressed. The retrieval condition is displayed at the left upper area of the filter. In sections 1301 and 1302 in the regions of classes 3 and 6 overlapped with the filter, icons representing children who are at least 160 cm in height in each class are displayed. In sections 1303 and 1304 in the regions of class 3 and class 6 where the filter does not overlap, icons of children who are shorter than 160 cm are displayed.

In sections 1305 and 1306 in the regions of class 2 and class 5 where two filters overlap, an icon representing "a boy" and "a child who is at least 160 cm in height" in each class is displayed. In sections 1307 and 1308 in the regions of class 2 and class 5 where the filter for "a boy" overlaps and the filter for "a child who is at least 160 cm in height" does not overlap, icons representing children with the data of "a boy" and "shorter than 160 cm in height" are shown. Similarly, icons representing children with the data of "a girl" and "at least 160 cm in height" are shown in sections 1309 and 1310.

In sections 1311 and 1312 in the regions corresponding to class 2 and class 5 and where no filter overlaps, are displayed icons of the children other than the children already displayed in the region where the filter overlaps, i.e., icons representing children with the data of "girl" and "shorter than 160 cm in height" are shown.

Figure 18:
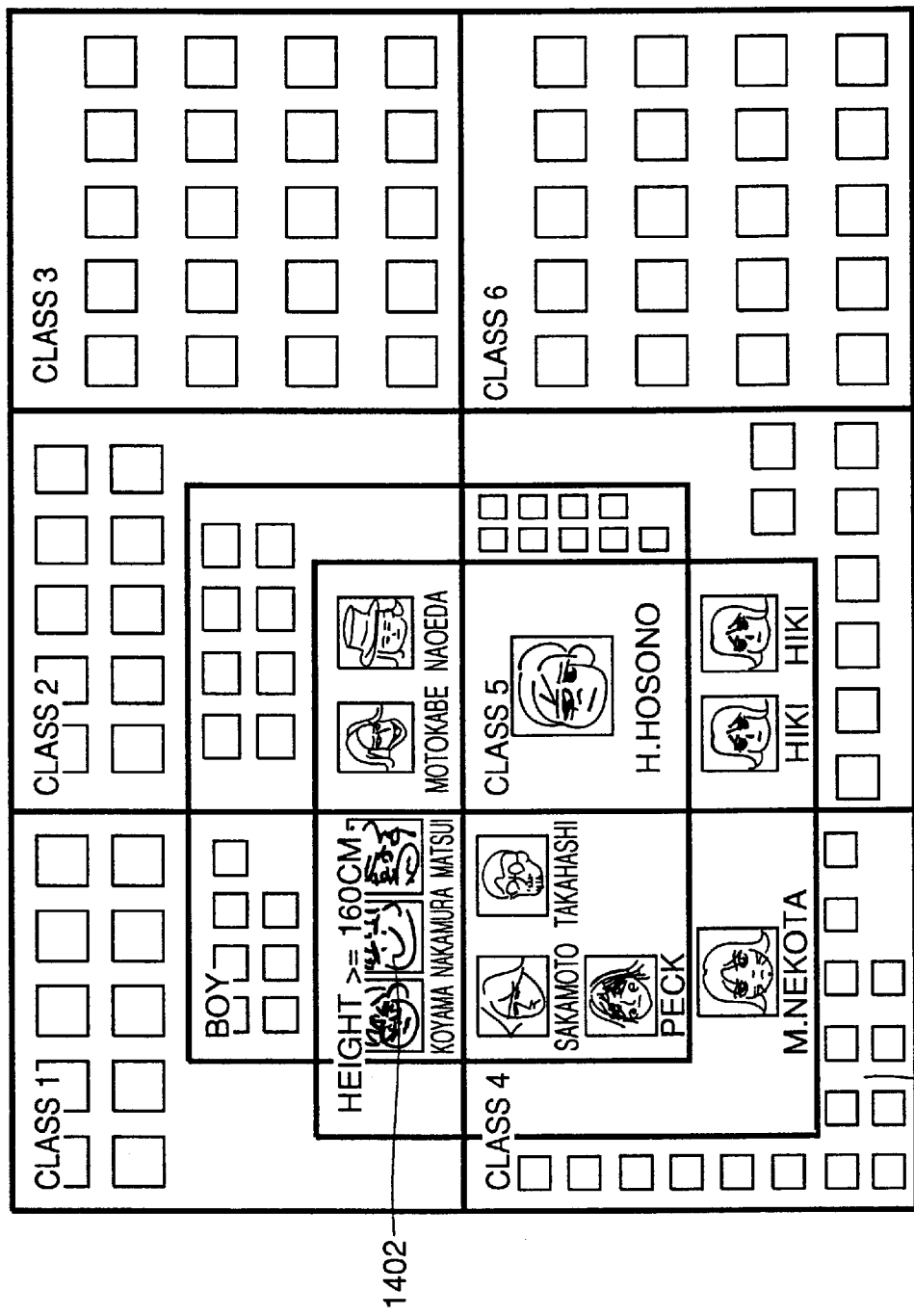
FIG. 18 shows a screen display for shifting a filter for retrieving "a student who is at least 160 cm in height" from the state of FIG. 17.

FIG. 18 displays a screen in which the filter for retrieving "a child who is at least 160 cm in height" in FIG. 17 is moved by user input. It is to be noted that the display during the shift of the filter is not instantly switched from the display of FIG. 17 to the display of FIG. 18. The overlapping state of a filter and a region corresponding to each group is sequentially computed during the move of the filter. A display is provided in which the filter and the icons are moved smoothly.

In the region of class 4 in FIG. 18, there is a section where both the filter for retrieving "a boy" and the filter for retrieving "a child who is at least 160 cm in height" overlap. However, there is no section in the region of class 4 where only the filter for retrieving "a boy" overlaps. Therefore, icons representing "a child who is shorter than 160 cm in height" and icons representing "a girl who is smaller than 160 cm in height" are both displayed in section 1401.

Figure 19:
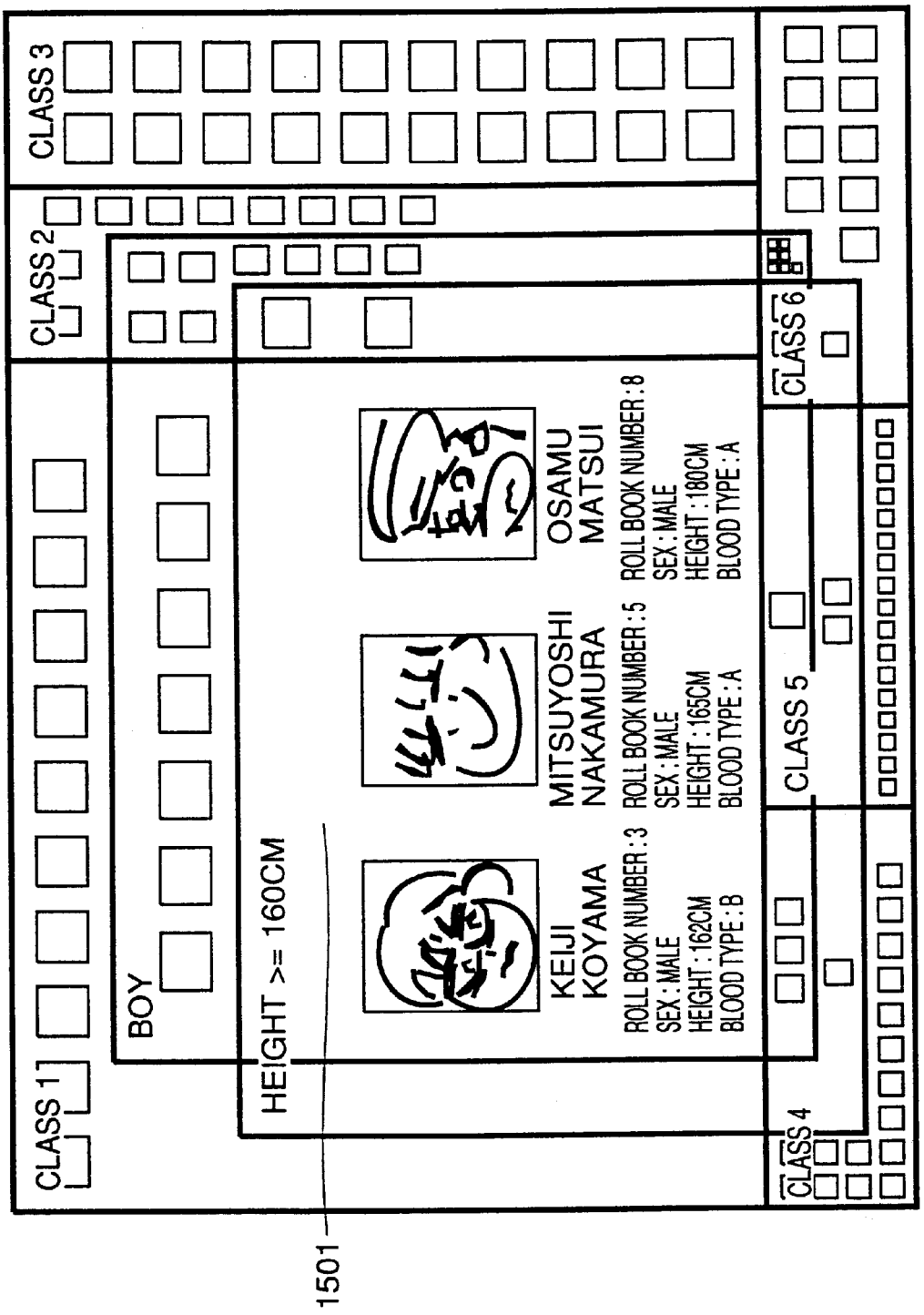
FIG. 19 shows a screen display with the section for displaying "a boy who is at least 160 cm in height in class 1" enlarged from the state of FIG. 17.

FIG. 19 shows section 1402 of FIG. 18 enlarged by user input. Similar to the shift of a filter, a smooth display transition is provided during magnification.

In the enlarged region 1501, the icons representing three children corresponding to the data of "a child who is at least 160 cm in height in class 1" are displayed. Here, the roll book number, sex, height, and blood type are displayed in addition to the face picture and name.

The icons in the sections other than the enlarged section are displayed in a shrunken manner. However, they will not be crowded out of the display region. An area to display the data set is always maintained in the display region. It is to be noted that the data does not necessarily have to be displayed in the form of an icon. When the number of icons is increased relative to the area of the display section, one icon can be displayed as representative of multiple icons. Alternatively, display of the icon can be temporarily suppressed.

Figure 20:
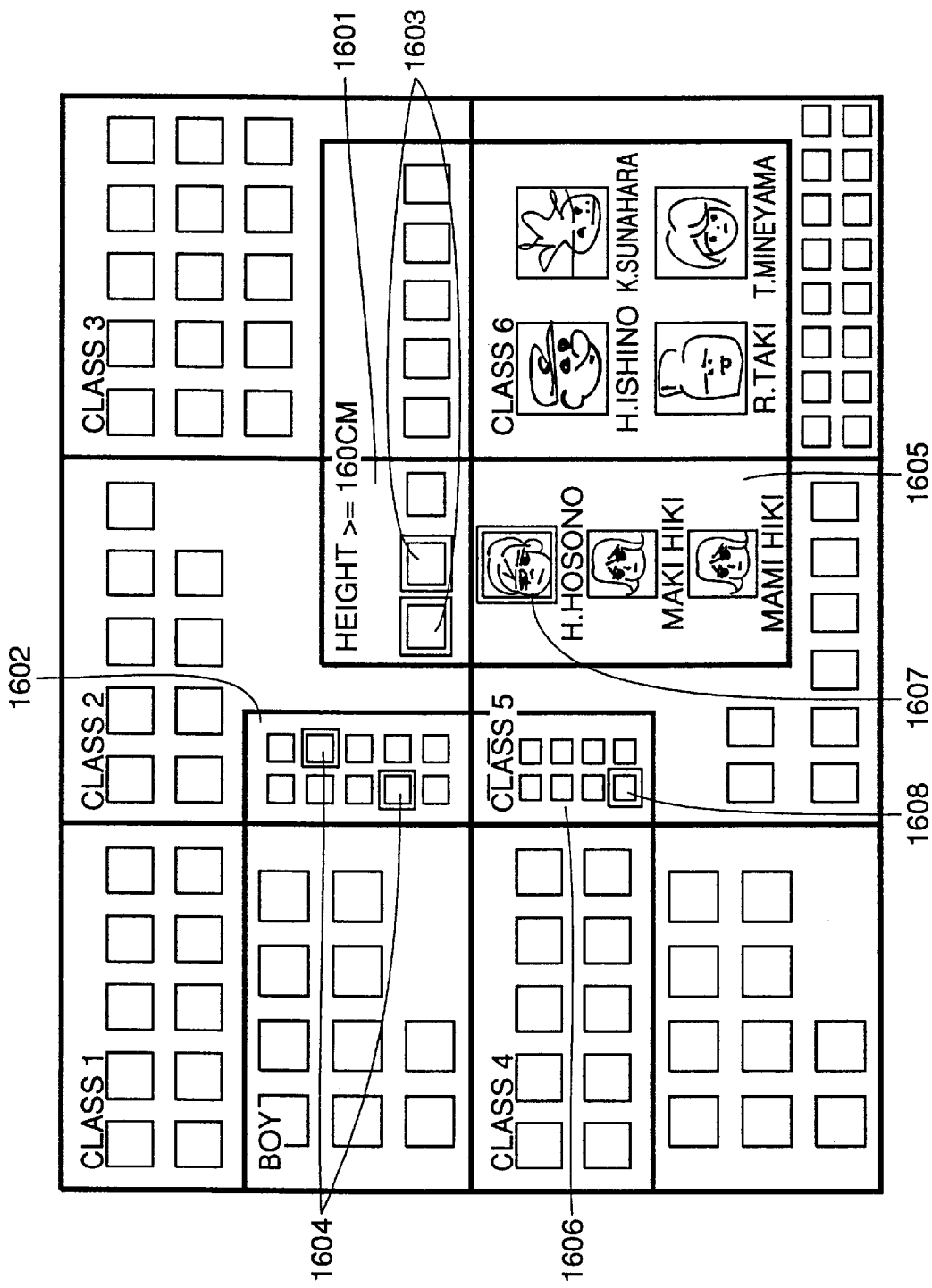
FIG. 20 shows a screen display where there is no longer any overlapping area of two filters after the filters are moved from the state of FIG. 17.

FIG. 20 shows a display in the transition of moving the filter for retrieving "a boy" from its state shown in FIG. 17. In the former screen of FIG. 17 in which two filters overlap on section 1305, icons representing two children satisfying the retrieval condition of "a boy who is at least 160 cm in height" are displayed. In FIG. 20, there is no section on the region corresponding to class 5 where the two filters overlap. Therefore, the icons representing the two children with the data of "a boy who is at least 160 cm in height" must be displayed in both the sections of 1601 and 1602. In order to explicitly indicate that the data displayed in the two section are identical, the icon indicating the same data is displayed in highlight as icons 1603 and 1604. Similarly, the icon representing the boy displayed in section 1306 is highlighted as icons 1607 and 1608 since the data is displayed in both the sections of 1605 and 1606.

The highlight display will no longer be necessary if the filter for retrieving "a boy" is shifted so as to not overlap the regions corresponding to class 2 and class 5 in FIG. 20. If the shifting process of the filter ends at the state of FIG. 20, the size of the filter is automatically altered to result in the display of FIG. 21 to provide the display of the highlighted icons as one icon. In sections 1701 and 1702 where the filter overlaps, highlighted icons 1603 and 1604 and highlighted icons 1607 and 1608 are displayed, respectively.

Figure 22:
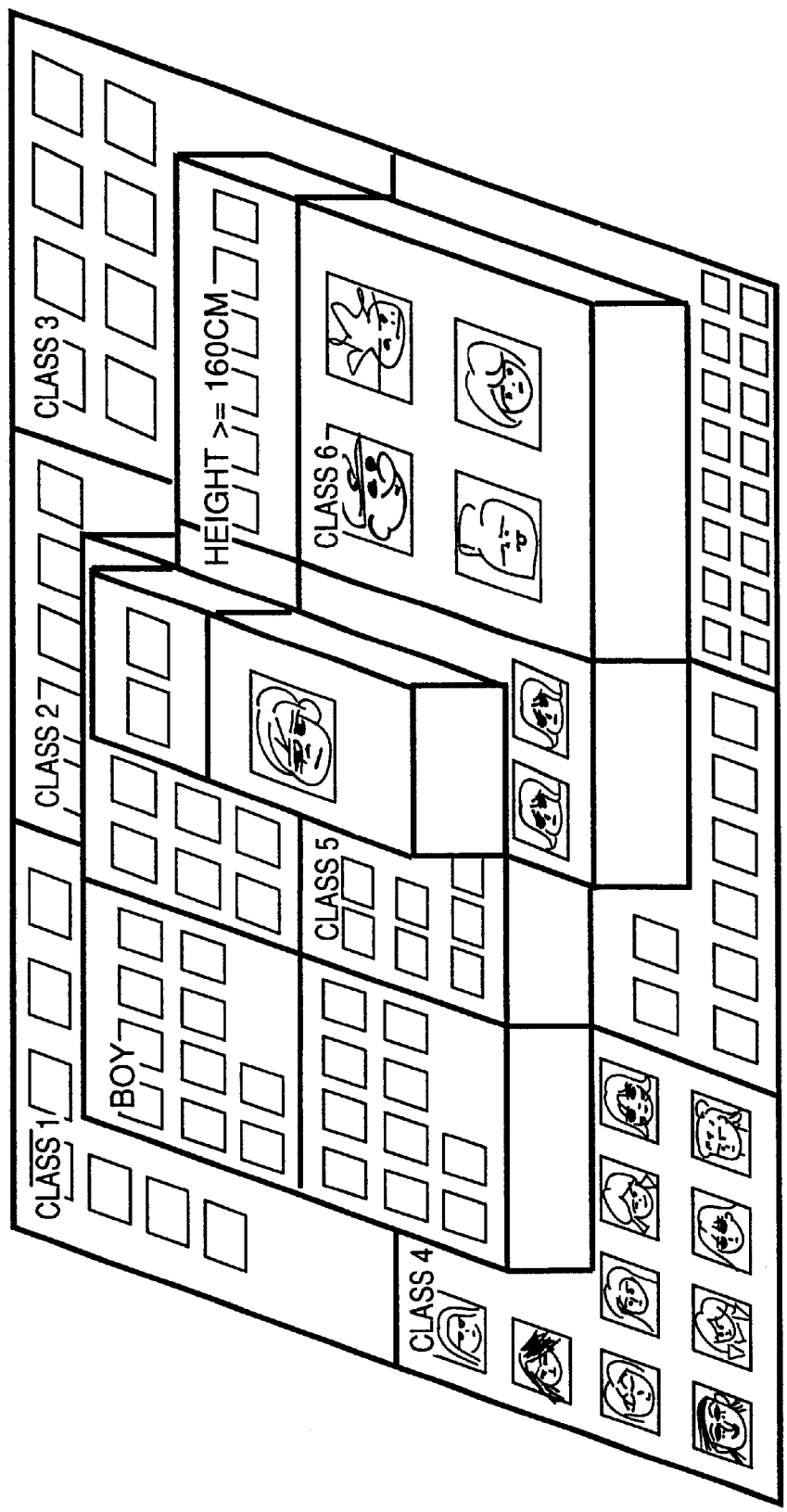
FIG. 22 shows a screen display with the display method set to a three dimensional display by a user.

FIG. 22 shows the display in a three dimensional form by user input. Each filter is applied with a height. The area where a filter overlaps is depicted with the total height of respective filters. Data may be occluded depending upon its location when the three dimensional form is employed. However, this problem of occlusion is generally of no concern since the view can be shifted to an arbitrary position in the three dimensional space by user interaction.

Figure 23:
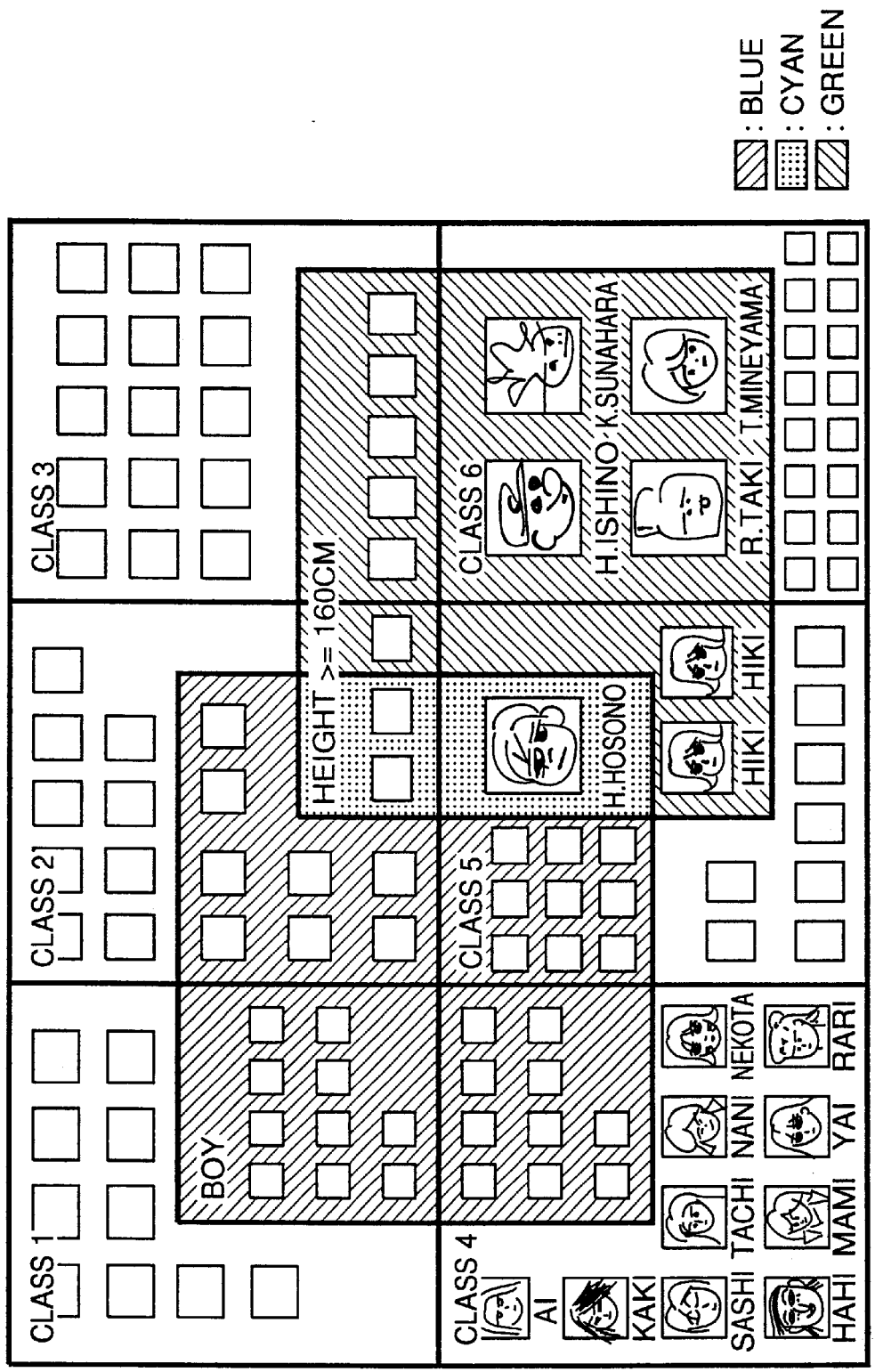
FIG. 23 shows a screen display in displaying an overlapping section with a filter in different colors by user input.

FIG. 23 shows a display in which a different color is applied to each filter by user input. The section where a plurality of filters overlap is displayed with another color. Alternatively, a translucent color can be applied to each color, whereby the section where a plurality of filters overlap can be displayed in a higher or lower transparency.

Figure 24:
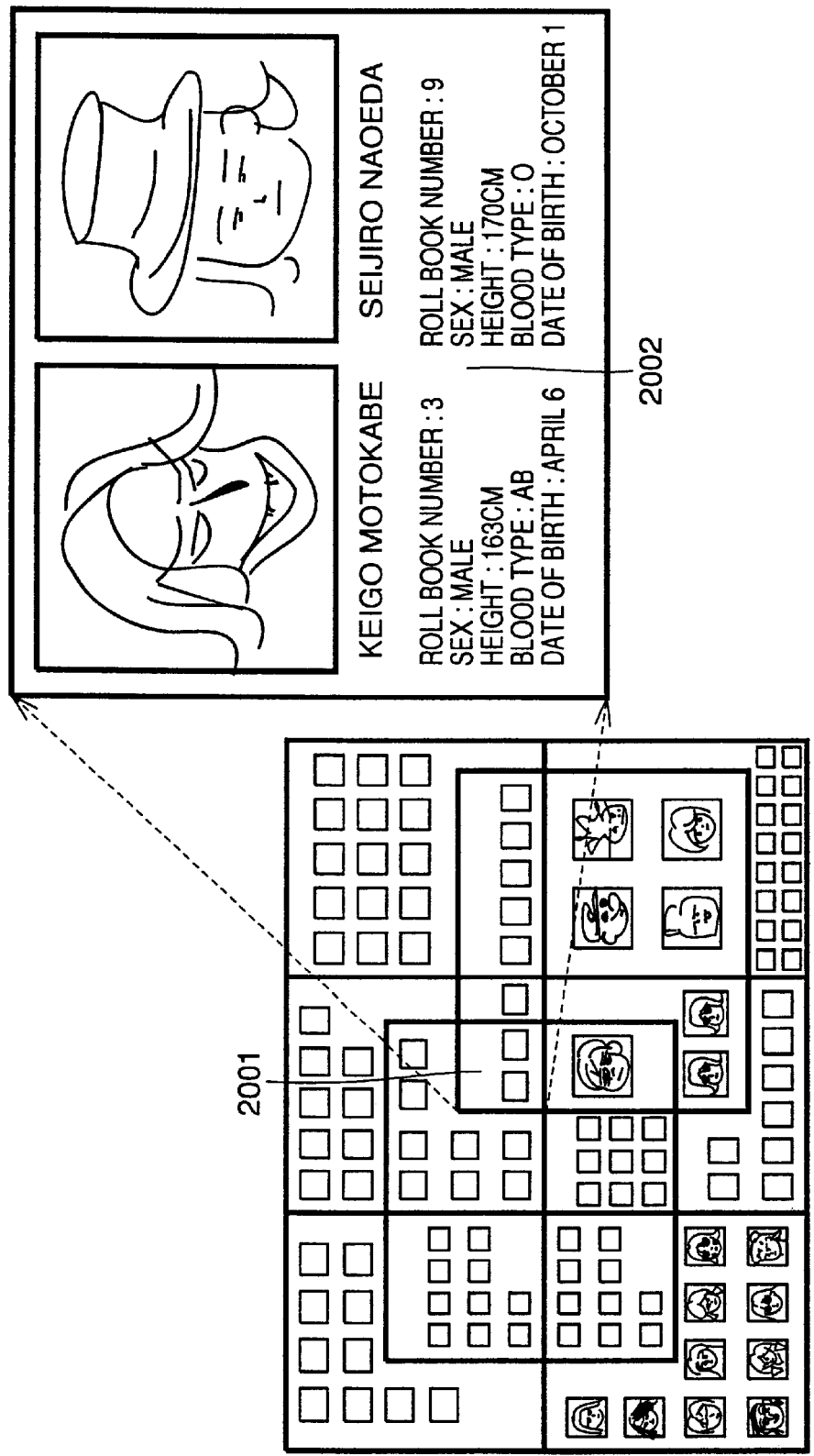
FIG. 24 shows a screen display when a section in the screen display is selected to display another region by user input.

Detailed information of data in section 2001 selected by user input can be displayed in another information display region 2002, as shown in FIG. 24.

FIG. 25 shows an example of the groups of FIG. 13 divided in a manner where the group regions do not overlap each other in the vertical direction by using group regions displayed lengthwise in the vertical direction.

Figure 26:
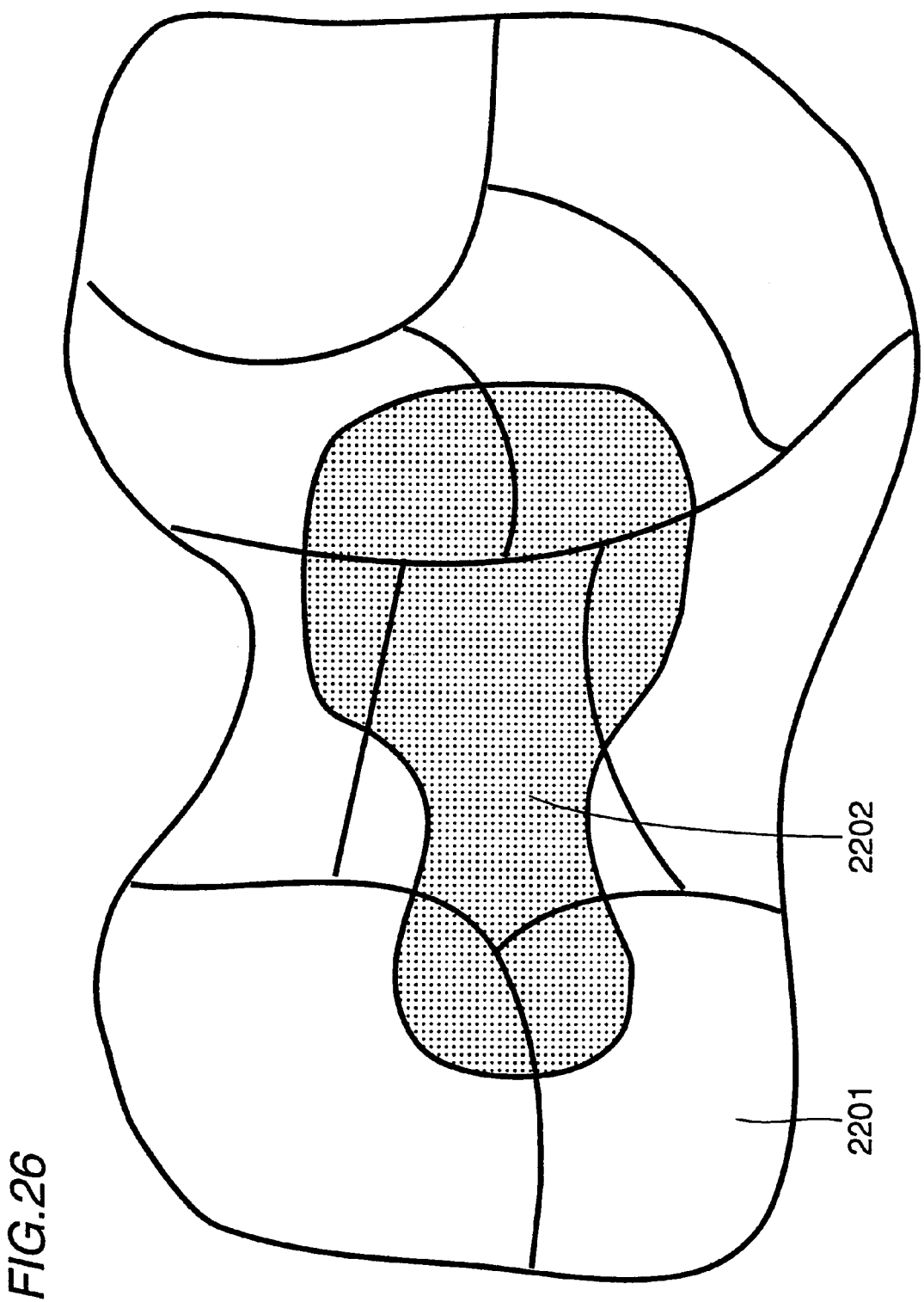
FIG. 26 shows the display in carrying out retrieval using a grouped display region of an arbitrary configuration and a filter of an arbitrary configuration in the data retrieval method according to the first embodiment of the present invention.

FIG. 26 shows an example employing grouped regions 2201 and 2202 of arbitrary configurations.

Figure 27:
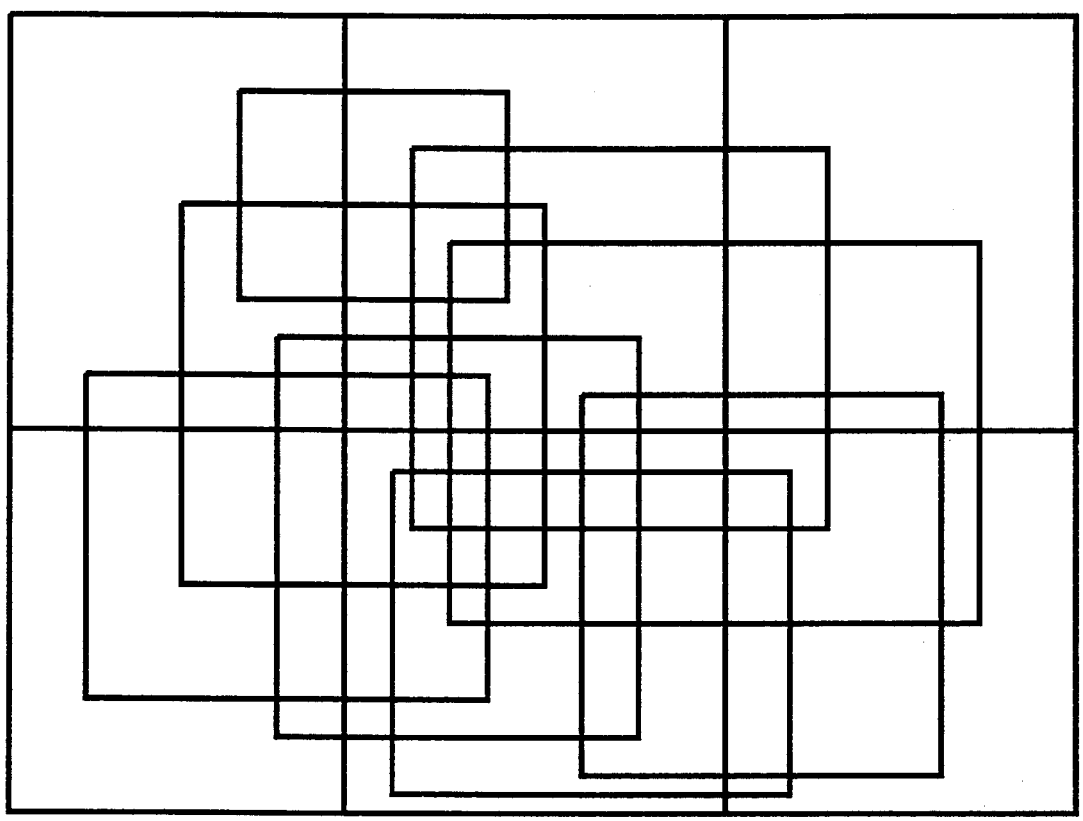
FIG. 27 shows a screen display in carrying out retrieval using an arbitrary number of filters in the data retrieval method according to the first embodiment of the present invention.

FIG. 27 shows a retrieval example using a large number of filters.

Figure 28:
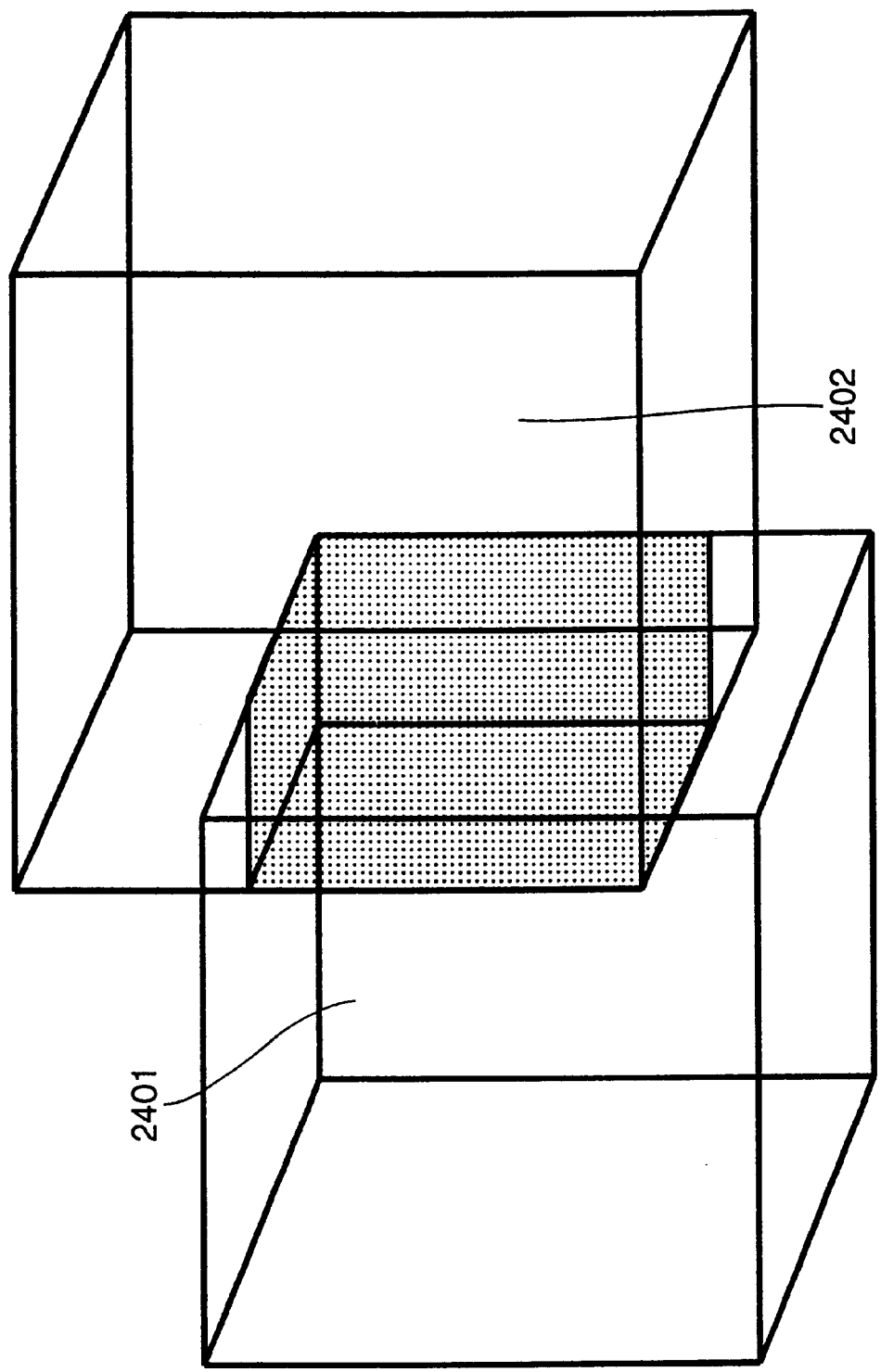
FIG. 28 shows a display screen where the data retrieval method of the first embodiment is expanded into a three dimensional form.

FIG. 28 shows the concept of the present invention extended to three dimensional form. Retrieval is carried out using filters 2401 and 2402 having respective volumes with respect to data distributed in a three dimensional space.

Figure 29:
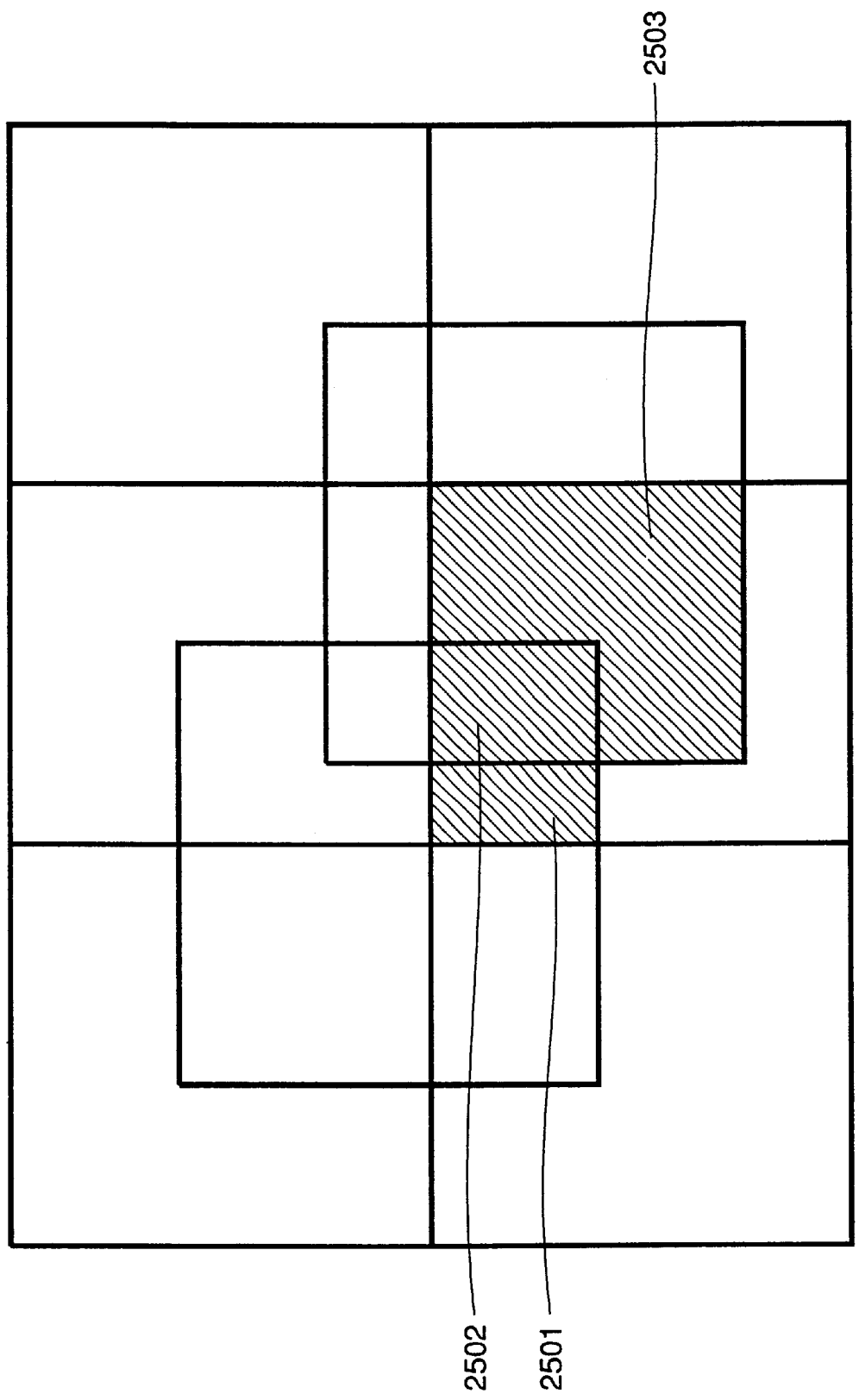
FIG. 29 shows a screen display in carrying out an OR operation retrieval by a plurality of filters in the data retrieval method according to the first embodiment of the present invention.

FIG. 29 shows an example of an OR operation retrieval according to the data retrieved method of the present embodiment. A plurality of regions divided by respective grouped regions and filters are coupled to form an OR region. In FIG. 29, regions 2501, 2502, and 2503 are OR coupled.

Figure 30:
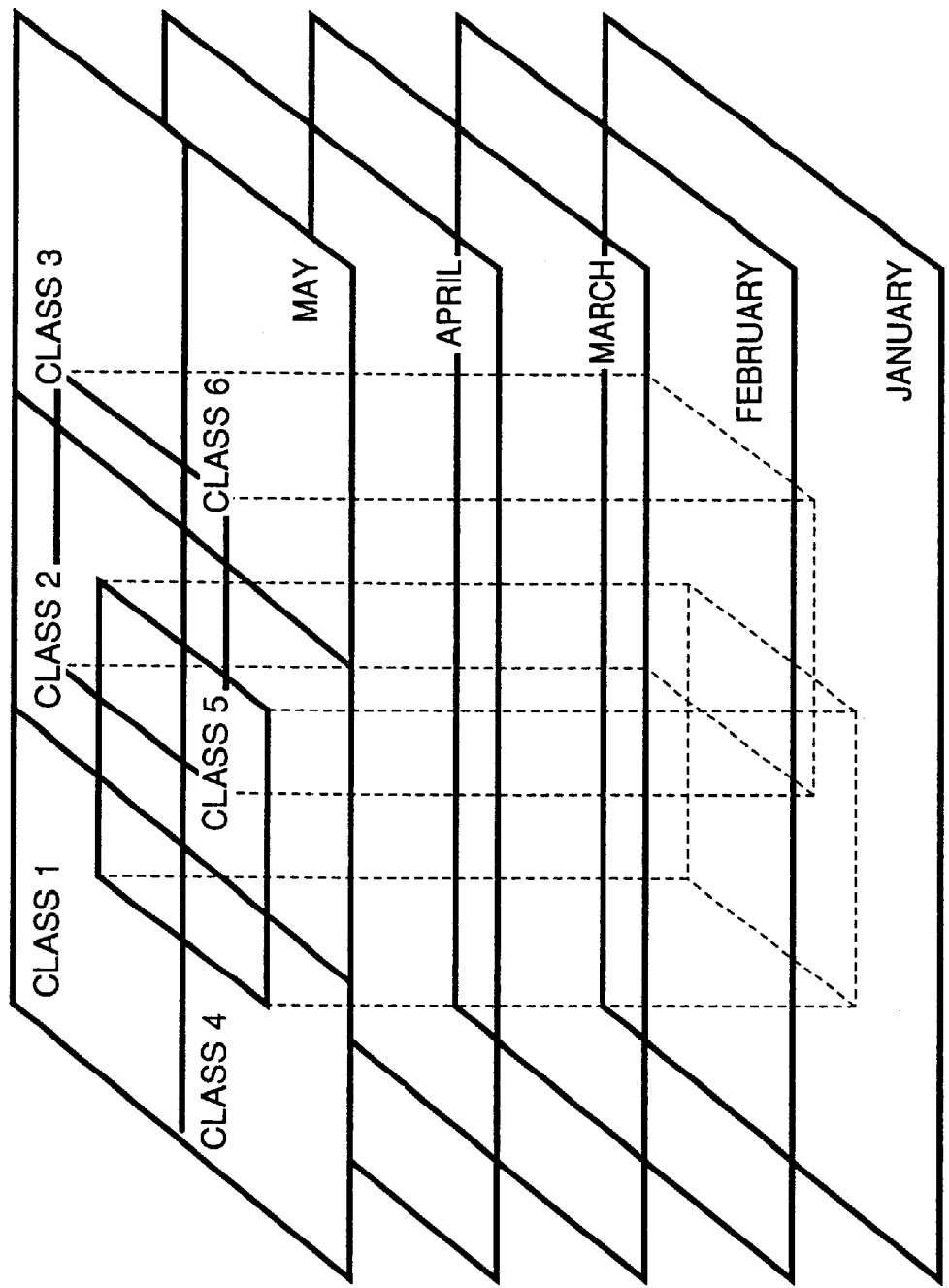
FIG. 30 shows a screen display where a third axis is introduced in the data retrieval method according to the first embodiment of the present invention.

FIG. 30 shows an example of a third axis added to the concept of the present embodiment. Here, time is allotted as the third axis. The data of each month are displayed in an accumulated manner. The filter has a volume. The retrieval condition of the filter is applied to a similar section in the data region of each month.

FIGS. 31–35 are flow charts showing the method of data retrieval according to the present embodiment. Each process will be described according to the flow chart.

Figure 31:
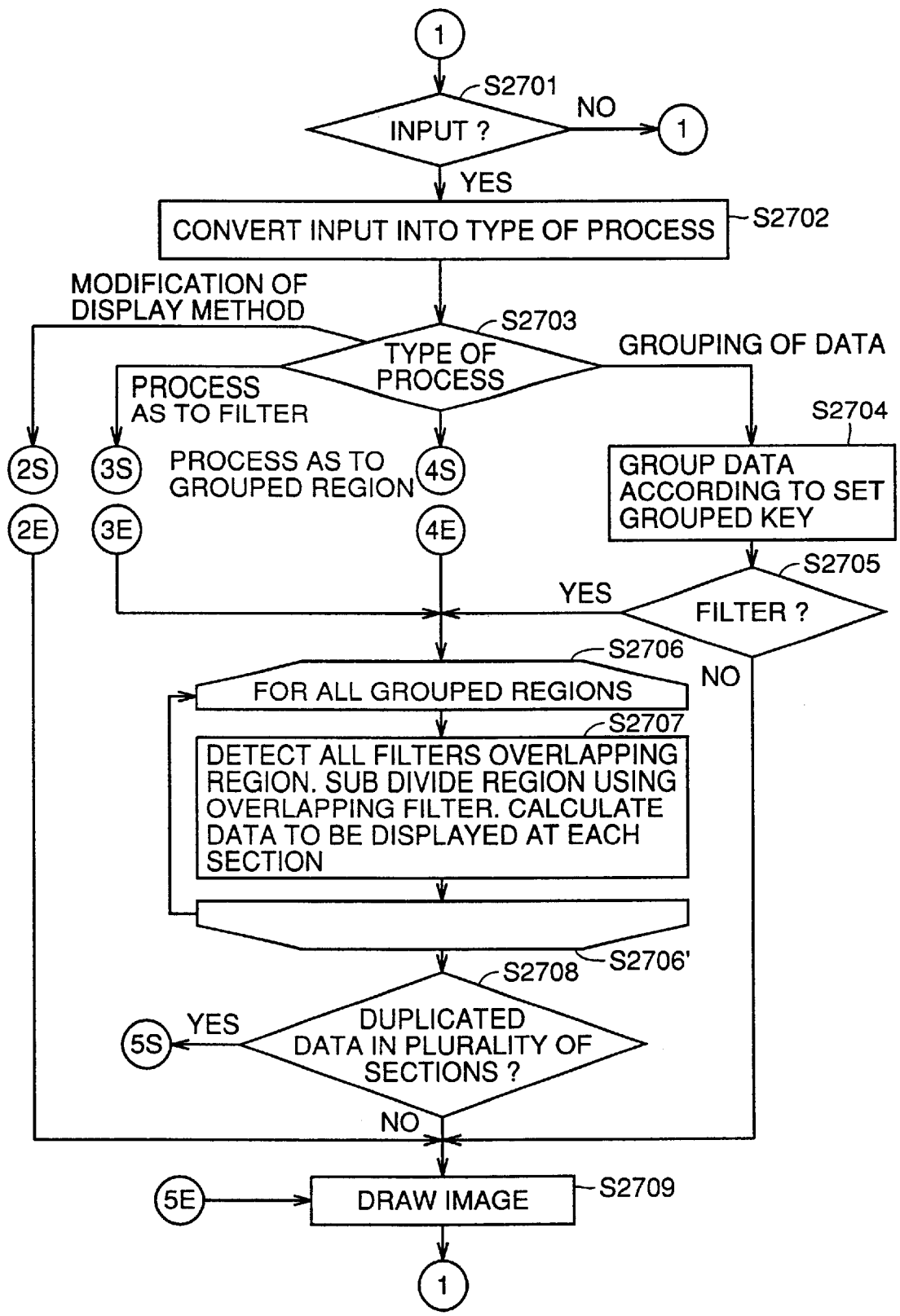
FIGS. 31, 32, 33, 34, and 35 are flow charts of the data retrieval method according to the first embodiment of the present invention.

As shown in FIG. 31, determination is made whether an instruction is input by a user or not (S2701). When there is no instruction from the user (S2701: NO), the process of S2701 is repeated.

When an instruction is input by the user (S2701: YES), the meaning of the input instruction is interpreted (S2702). For example, if the user is dragging an edge of the filter displayed in the display region, interpretation is made that an instruction of altering the size of the filter is input. Accordingly, a relevant process is executed.

Upon interpretation of the instruction, branching is effected according to the type of the process (S2703). When the type of process corresponds to "modification of display method", control proceeds to S2801. When the type of process corresponds to "process related to filter", control proceeds to S2901. When the type of process corresponds to "a process related to grouped region", control proceeds to S3001.

When the type of the process corresponds to "grouping of data", the data set is grouped (S2704). The entire data set is newly grouped according to the group key specified by the user.

Then, determination is made whether a filter has been generated or not (S2705).

If no filter has been generated (S2705: NO), an appropriate screen display is provided (S2709). The process proceeds to this step only when data is identified to be displayed in a prescribed section divided by each grouped region and an overlapping filter.

When a filter has been generated (S2705: YES), the process carries out the step located between steps S2706 and S2706', i.e., the process of S2707 is applied to all the grouped regions.

At S2707, all the filters overlapping a relevant grouped region are detected. Then, the data to be displayed in each section of the grouped region divided by the detected filters is calculated. More specifically, the data belonging to a relevant grouped region is collated with the retrieval condition of each subdivided section to determine the section to display data. When determination is made that one data is displayed in a plurality of sections, that data is displayed in the section having the greatest number of filters overlapping thereon. When there is a section with the same greatest number of filters overlapped thereof, the data is displayed at these sections in a duplicated manner.

At the end of the loop of step S2706, determination is made whether there is duplicated data in a plurality of sections (S2708). When such data is present (S2708: YES), control proceeds to S3101. When NO at S2708, an appropriate image is drawn on the screen (S2709).

When the process of S2709 ends, control returns to S2701 to wait for an input from the user.

Figure 32:
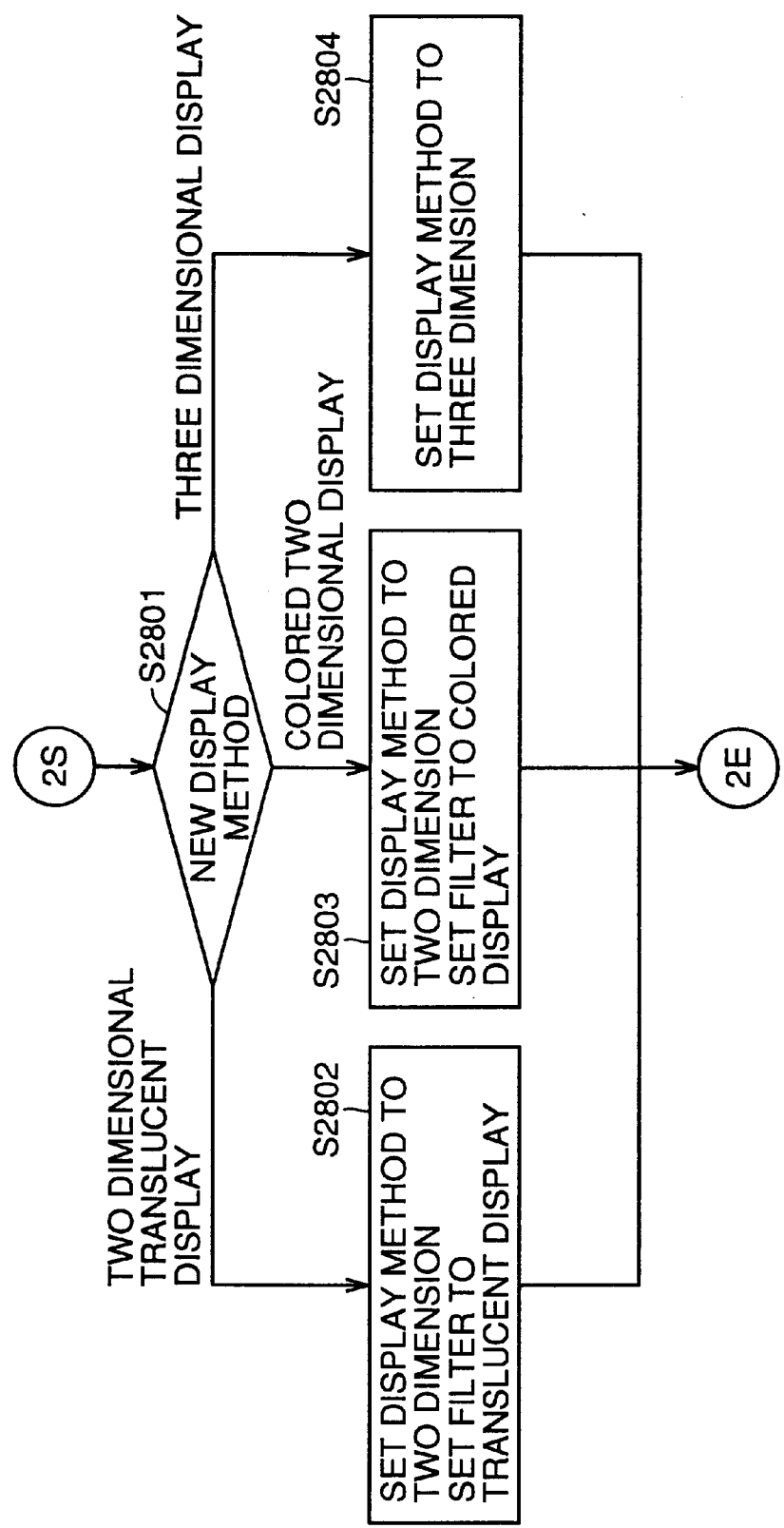

The process of modifying the display method will be described hereinafter with reference to FIG. 32. The process is branched according to the type of the new display method (S2801). When the new display method is "a two dimensional translucent display" (two dimensional translucent display at S2801), the display method is set to the two dimensional form, and the filter is set to be displayed in a translucent manner (S2802). When the new display method is "a two dimensional colored display" (two dimensional colored display at S2801), the display method is set to the two dimensional form, and the filter is set to be displayed in a colored manner (S2803). When the new display method is "a three dimensional cubic display" (three dimensional cubic display at S2801), the display method is set to the three dimensional form. When the setting of the display method is completed, control proceeds to the drawing process of S2709.

When the display method is set by the process of S2802, the display is as shown in FIG. 17. When the display method is set by the process of S2803, the display is as shown in FIG. 23. When the display method is set by the process of S2804, the display is as shown in FIG. 22.

Figure 33:
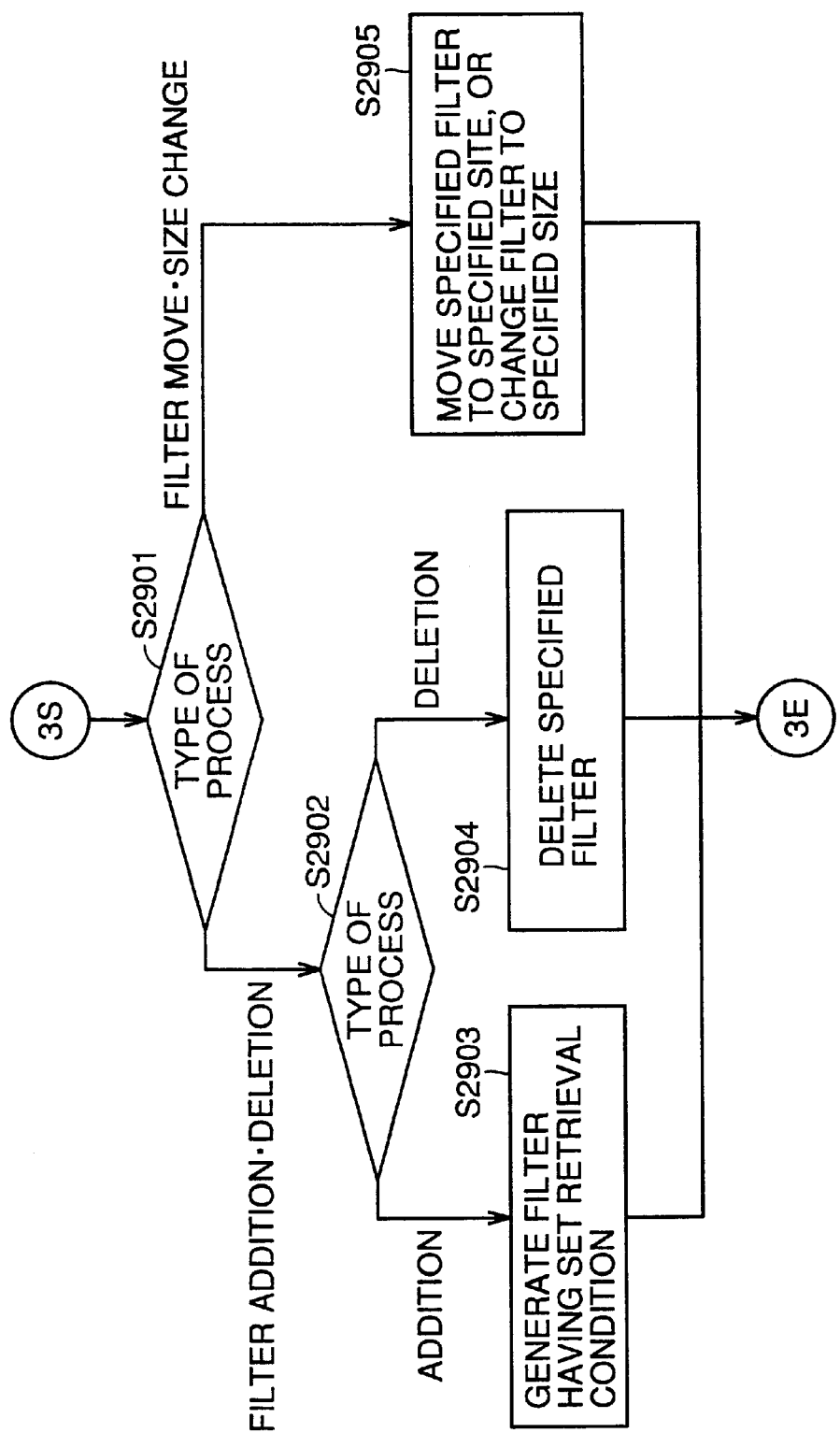

The process related to a filter will be described with reference to FIG. 33. The process is branched according to the type of the process related to the filter (S2901). When the process is to add or delete a filter (filter addition delete at S2901), the process is further branched according to the type of the process (S2902). When the process is to add a filter (addition at S2902), a filter having a retrieval condition set by the user is generated (S2903). When the process is to delete a filter (delete at S2902), the filter specified by the user is deleted (S2904). When the process is to move or alter the size of a filter (filter moves size modification at S2901), the filter is shifted to the position specified by the user, or the filter is modified to a specified size (S2905).

When the processes of S2903, S2904, and S2905 end, control proceeds to S2706 (FIG. 31).

Figure 34:
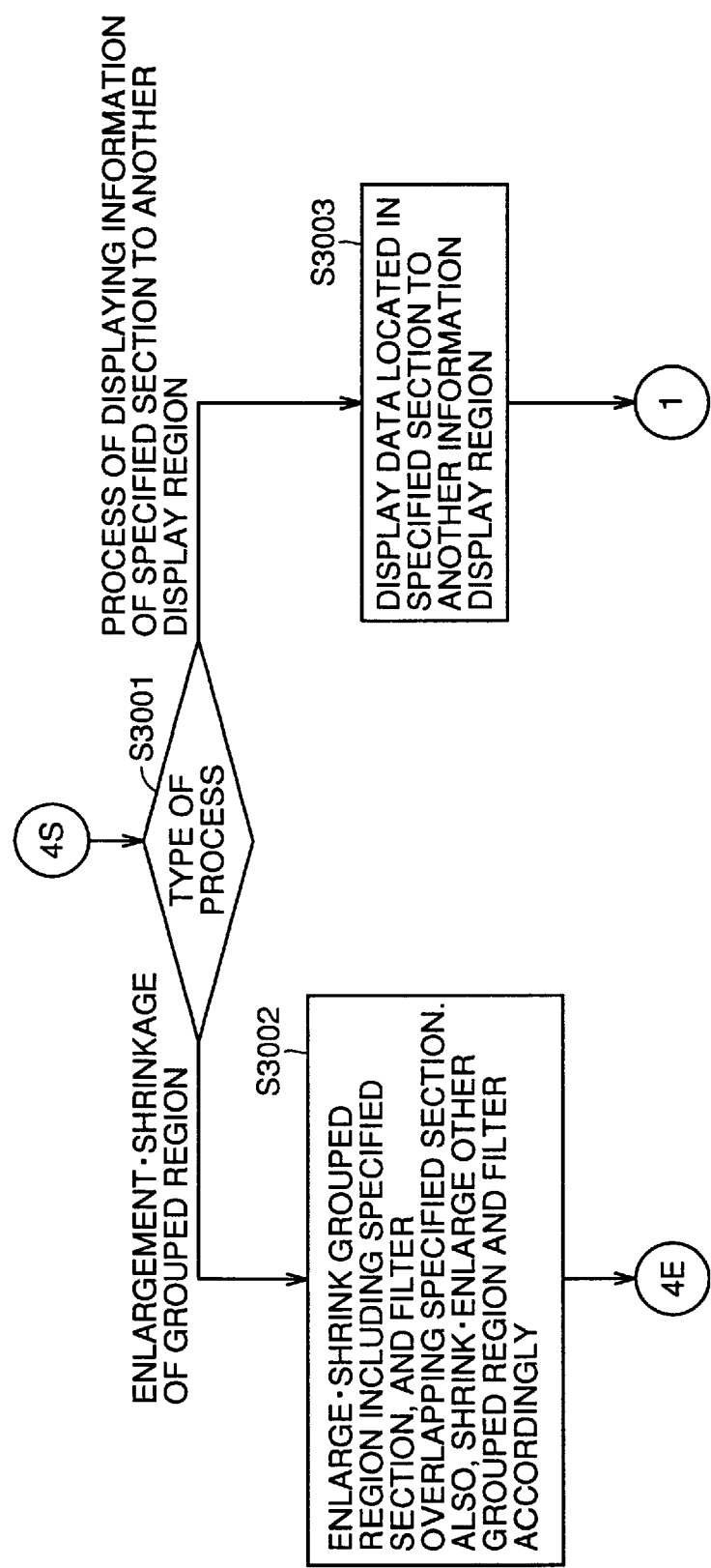

The process related to a grouped region will be described with reference to FIG. 34. The process is branched according to the type of the process related to a grouped region (S3001). When the process is to magnify/reduce a grouped region (grouped region expansion•shrinkage at S3001), the grouped region including the section specified by the user, and the filter overlapping the specified section are increased•reduced as specified by the user (S3002). In response, the remaining grouped region and filter that are not increased reduced will be magnified/shrunk.

Following the completion of the process of S3002, control proceeds to S2706 (FIG. 31).

When the process is to display the information of a specified section at another display region (process of displaying information of specified section at another display region at S3001), the data in the section specified by the user is displayed in another display region (S3003). FIG. 24 shows the display of such a case.

Following completion of the process of step S3003, control returns to the input standby state of S2701 (FIG. 31).

Figure 35:
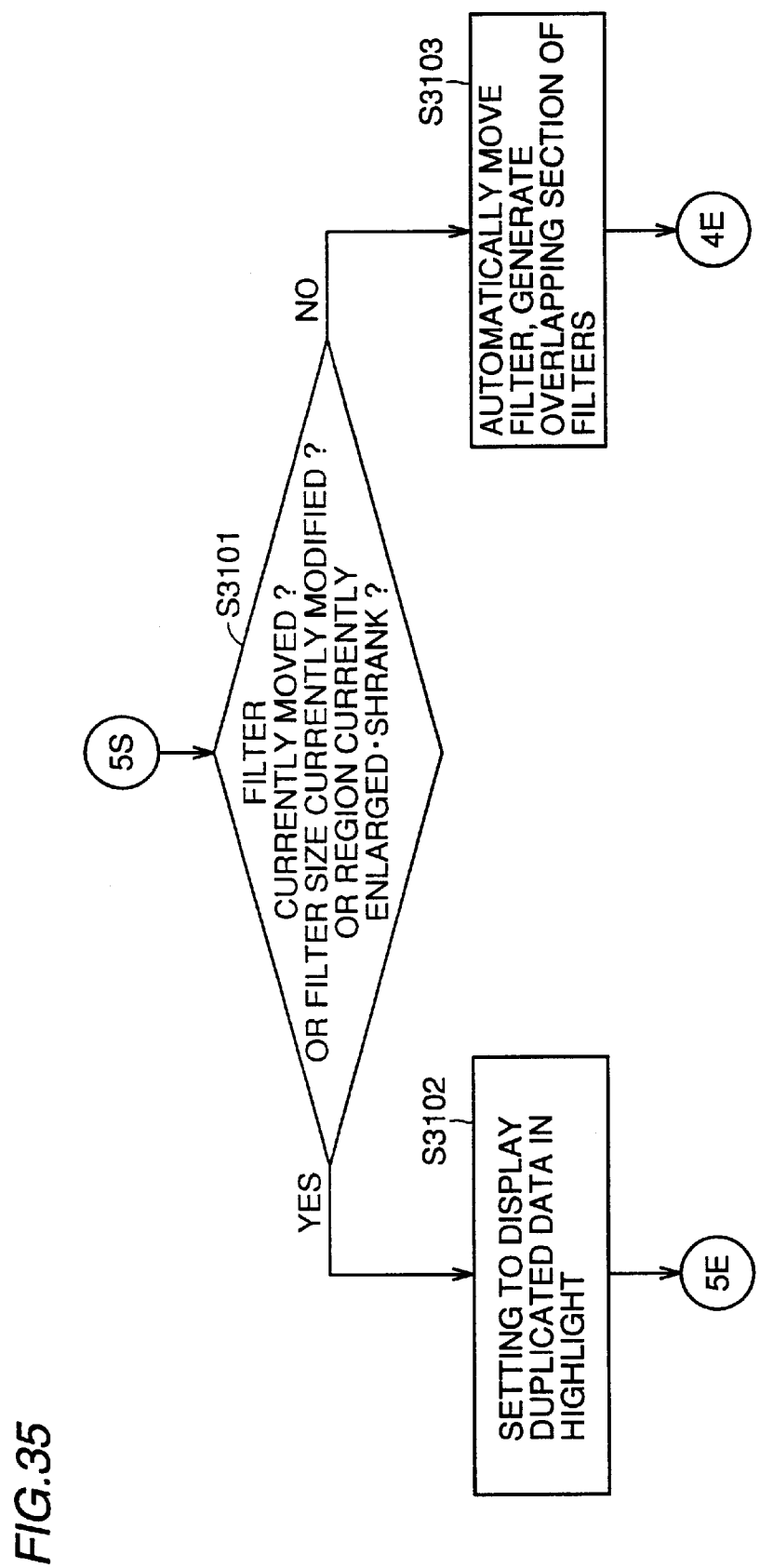

The process involving duplicated data in a plurality of sections will be described hereinafter with reference to FIG. 35. The process is branched according to whether any of the conditions of "during movement of filter, during modification of filter size, or during expansion•reduction of grouped region" is met or not at the current stage (S3101).

When any of the conditions is satisfied (S3101: YES), the duplicated display data is specified to be highlighted (S3102). When this process ends, control proceeds to the drawing process of S2709 (FIG. 31). The display in this case is as shown in FIG. 20.

Figure 21:
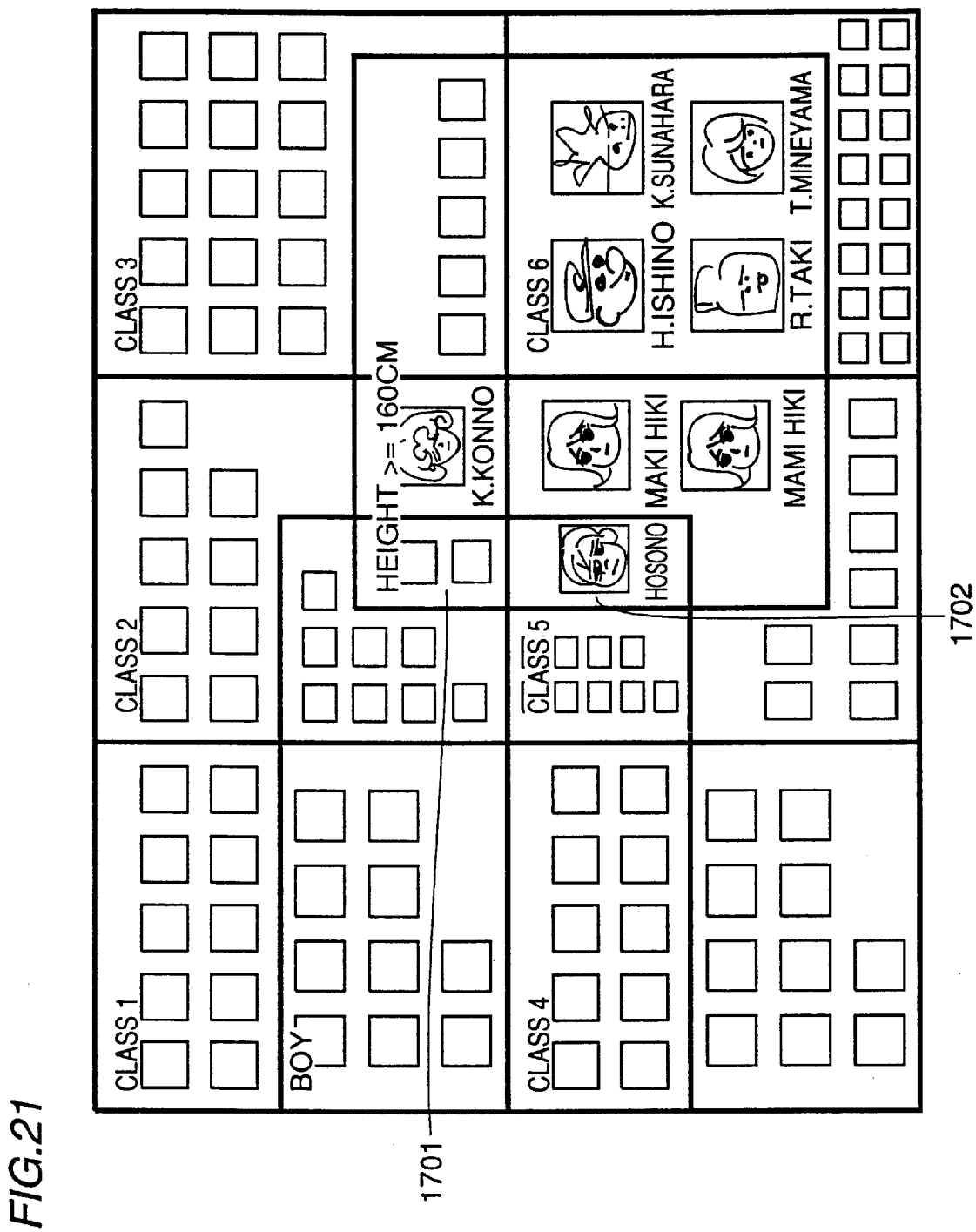
FIG. 21 shows a screen display where the configuration of the two filters is automatically modified to generate an overlapping section of filters from the state of FIG. 20.

When none of the conditions is satisfied (S3101: NO), the process is carried out to generate a filter overlapping section by automatically shifting the filter so that there is no duplicated display data (S3103). When this process ends, control proceeds to S2706. The display in this case as shown in FIG. 21.

According to the present embodiment, data satisfying a retrieval condition is displayed with an icon at a section where the region displaying at least one grouped data set overlaps with a filter to which a retrieval condition is applied. Also, data that does not meet the retrieval condition is displayed with an icon at a section where the region corresponding to the data set and the filter do not overlap. Therefore, the number of data satisfying a retrieval condition and the number of data not satisfying the retrieval condition can be obtained accurately.

The retrieval result is represented by the absence/presence of an icon and the number of icons displayed in the section where a filter overlaps. Therefore, an arbitrary number of filters can be used to allow retrieval according to an unlimited number of retrieval conditions.

When the objects of retrieval are divided into a plurality of groups, the filter is moved or the configuration of the filter is modified to generate an overlapping section of a filter and a region corresponding to the grouped data set to allow specification of a group to be retrieved. Therefore, retrieval of the group can easily be modified.

The presence of data as a result of retrieval is indicated by the absence/presence of an icon. Therefore, the configuration of the filter does not depend upon the retrieval result. Execution of a retrieval can be explicitly indicated even if there is no data that satisfies the retrieval condition.

Second Embodiment

A data management apparatus according to a second embodiment of the present invention will be described hereinafter with reference to the drawings.

[Description of hardware]

Figure 36A:
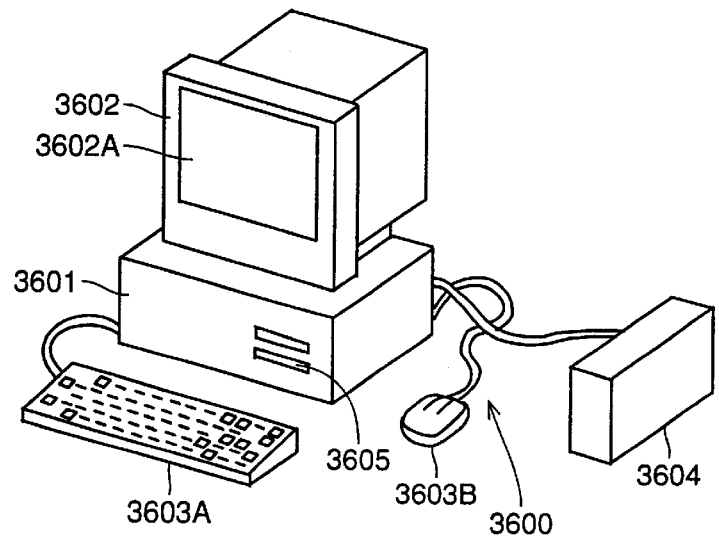
FIGS. 36A and 36B the data management apparatus according to a second embodiment of the present invention.

As shown in FIG. 36A, a data management apparatus 3600 according to the second embodiment includes main processor 3601 carrying out various operations, display device 3602 with image display screen 3602A to provide an image display of information, keyboard 3603A and mouse 3603B which are input devices for inputting information to main processor 3601, for example, to input a signal designating the process of modifying the attribute value of data, hard disc device 3604 which is an information storage device, and CD-ROM (Compact Disc-Read Only Memory) device 3605 for reading out a program recorded in a CD-ROM.

[Description of block diagram]

[Attribute, an attribute value and database 3621]

Figure 36B:
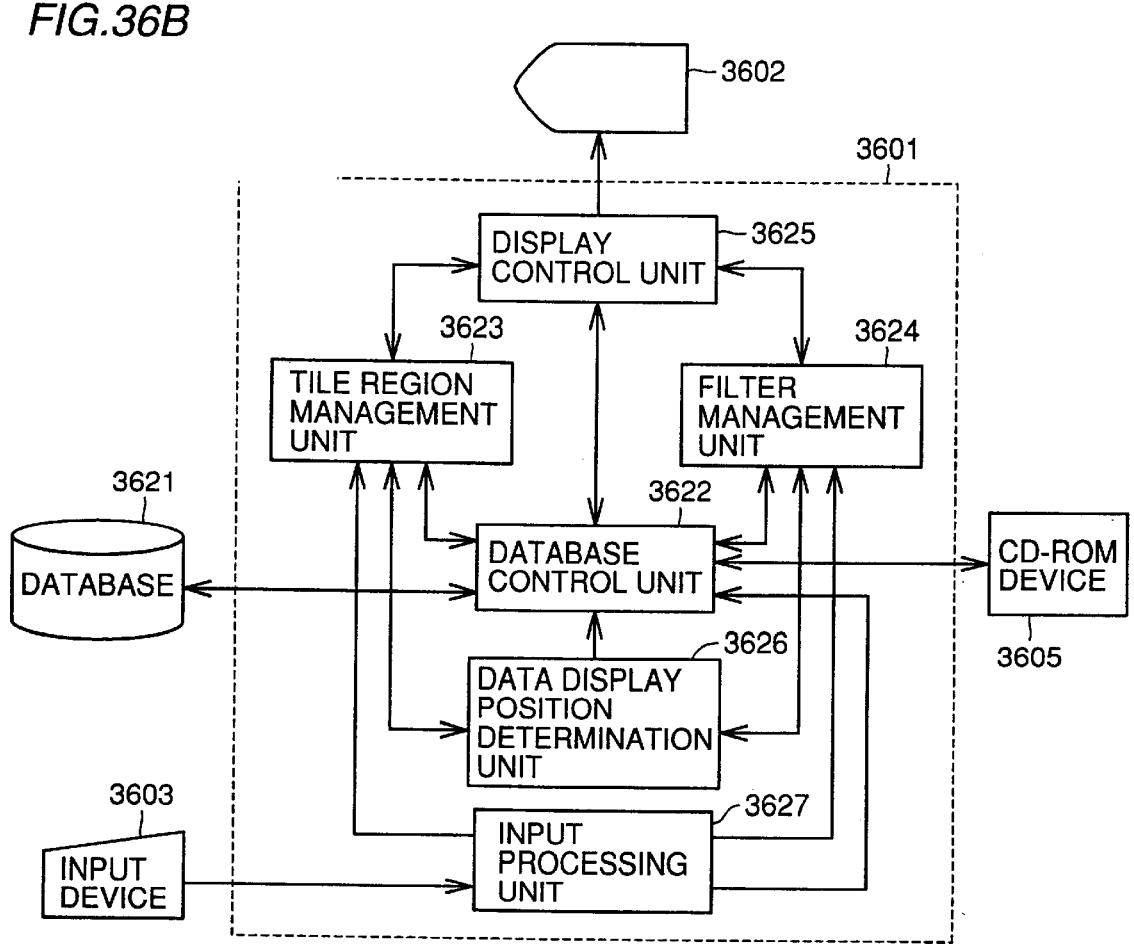

As shown in FIG. 36B, database 3621 is contained in hard disc device 3604. Database 3621 stores all the data items forming the data set that is to be monitored. Here, a data item corresponds to a "record" in database terminology. The number of attributes applied to the data set built in database 3621 is a variable number from zero and above.

Each data item forming the data set can include zero, one or a plurality of attribute values with respect to one attribute. For example, regarding a certain attribute represented by the keyword of "color", a certain data item can have a plurality of attribute values such as "white", "black" and "yellow" with respect to that attribute. A zero attribute value for a certain attribute of a certain data item means that an attribute value for that attribute is not assigned in that data item.

When an attribute value for a certain attribute is represented by a series of values, an attribute value corresponds to one particular value, or a range of values. For example, when an attribute is represented as "time", a relevant data item can have the attribute value of "March 13" or a range of "February 10 to April 9" with respect to the attribute of "time".

Each data item stored in database 3621 includes a value such as a coordinate value applied that will be used in the display on display device 3602 as an image of the data item, in addition to the attribute value for an attribute.

[Main processor 3601]

Main processor 3601 includes input processing unit 3627 for interpreting an instruction input through input device 3603 (keyboard 3603A and mouse 3603B) to determine the device to which that instruction is to be sent, and sending that instruction to the determined device, data display position determination unit 3626, database control unit 3622, tile region management unit 3623 to supervise one or a plurality of tile regions (described afterwards), filter management unit 3624 to supervise one or a plurality of filters (described afterwards), and display control unit 3625.

[Database control unit 3622]

Database control unit 3622 is connected to database 3621 to add/delete an attribute applied to the data set built in database 3621, to add/modify/read out an attribute value for an attribute of each data item, and to update/read out a value used to display the image of each data item on display device 3602. Database control unit 3622 is connected to CD-ROM device 3605, for receiving a program to be executed by database control unit 3622, and to tile region management unit 3623, filter management unit 3624, display control unit 3625, data display position determination unit 3626, and input processing unit 3627, for sending the received program to a relevant device.

[Tile region management unit 3623]

Tile region management unit 3623 receives an instruction from input processing unit 3627 that is input through input device 3603 and that is interpreted to be related to a tile region in input processing unit 3627, and carries out a corresponding process. Tile region management unit 3623 sends a request to display control unit 3625 to update the display on display device 3602. Tile region management unit 3623 also sends a request to database control unit 3622 to add/delete an attribute of the data set built in database 3621 and to modify the attribute value of each data item.

A tile region is displayed in display device 3602 with an area to display an image corresponding to each data item stored in database 3621. A tile region is assigned an attribute value for an attribute to determine the data item to be displayed in that region.

A plurality of attribute values can be applied to a relevant tile region. Also, a range can be applied as an attribute value. A tile region also has a coordinate value to indicate the position where it will be displayed. The coordinate value is used to indicate the tile region on display device 3602. A plurality of tile regions, if any, are displayed on display device 3602 without overlapping each other. Display of a tile region is effected by sending a request from tile region management unit 3623 to display control unit 3625 to update the display of display device 3602.

Regarding each data item maintained in database 3621, the data item having an attribute value that matches the attribute applied to the tile region, or the data item included in the attribute value range of the attribute applied to the tile region is displayed in that tile region.

For example, consider the case where the attribute value of "black" is assigned to the attribute of "color" in a tile region. The data item having the attribute value of "black" for the attribute of "color" out of the data items stored in database 3621 will be displayed in that tile region. When a range of "February 10 to April 9" is applied as the attribute value for the attribute of "time" in a tile region, the data item having an attribute value from "February 10" to "April 9" of "time" out of the data items stored in database 3621 will be displayed in that tile region. When a certain data item has a range as the attribute value for the attribute of "time", any data item having an attribute value that is within the range of the attribute value applied to the tile region will be displayed in that tile region.

A data item can be displayed as set forth in the following manner. After a request is sent from tile region management unit 3623 to data display position determination unit 3626 to define the position of a data item to be displayed, a request is sent to display control unit 3625 to update the display of display device 3602.

Tile region management unit 3623 can generate or delete a tile region as well as setting an attribute value for an attribute applied to a tile region through an instruction from input processing unit 3627. Also, tile region management unit 3623 can select one of the tile regions supervised by tile region control unit 3623 to increase/reduce the area for display according to an instruction input through input device 3603.

Furthermore, tile region management unit 3623 can select a data item displayed in a certain tile region to move the selected data item into another tile region for display according to an instruction received from input processing unit 3627. Here, tile region management unit 3623 applies the attribute value of the relevant attribute applied to the tile region in which the moved data item is newly located to that moved data item. When the moved data item already has an attribute value for the relevant attribute, that attribute value is modified to the new value. This process is carried out via database control unit 3622.

Tile region management unit 3623 can generate a new tile region and display the new tile region in display device 3602 so as to replace all the currently displayed tile regions. As an attribute value to be applied to the newly generated tile region, a new attribute other than the attribute that has been already applied to the data set built in database 3621 can be defined and applied. Here, the newly defined attribute is added to the data set built in database 3621. Accordingly, each data item stored in database 3621 can have an attribute value for a newly added attribute.

[Filter management unit 3624]

Filter management unit 3624 receives an instruction input by input device 3603 and from input processing unit 3627 interpreted to be related to a filter in input processing unit 3627, to carry out a corresponding process. Filter management unit 3624 sends a request to display control unit 3625 to update the display of display device 3602. Also, filter management unit 3624 sends a request to database control unit 3622 to modify the attribute value of each data item stored in database 3621.

A filter is a region displayed on display device 3602, having an area to display an image corresponding to each data item stored in database 3621. A filter is displayed on a relevant tile region in an overlapping manner.

A filter is assigned an attribute value for a relevant attribute to determine the data item to be displayed in that region. The data item having an attribute value included in the attribute value range applied to the filter or a matching attribute value among all the data items displayed in all the relevant tile regions where the filter overlaps is displayed inside the filter. More specifically, a filter can be used to retrieve a data item.

A plurality of attribute values can be applied. Also, a range can be applied as an attribute value. The filter includes a coordinate value to indicate the position where the filter is to be displayed. The coordinate value is used to indicate a filter in display device 3602.

When there are a plurality of filters, the data item satisfying an attribute value for the attributes applied to all the filters that overlap is displayed in the section where the filters overlap each other. Filter display is effected by sending a request from filter management unit 3624 to display control unit 3625 to update the display of display device 3602.

Regarding each data item retained in database 3621, any data item having a matching attribute value for the attribute applied to the filter or any data item included in the attribute value range among all the data items displayed in all the relevant tile regions where the filter overlaps is displayed within that filter.

For example, consider the case where the attribute value of "black" is applied to the attribute of "color" to the filter. A data item having a "black" attribute value for the attribute of "color" out of all the data items displayed in all the tile regions where the filter overlaps is displayed inside that filter. When the range of "February 10 to April 9" is applied as the attribute value for the attribute of "time" to the filter, any data item having an attribute value between "February 10" to "April 9" for the attribute of "time" out of all the data items displayed in all the tile regions where the filter overlaps in displayed inside that filter. When the data item has an attribute value range for the attribute of "time", any data item having an attribute value within the range of the attribute value applied to the filter will be displayed inside that filter.

Display of each data item is set forth in the following. After a request is sent from filter management unit 3624 to data display position determination unit 3626 to determine the display position of a data item, a request is sent to display control unit 3625 to update the display of display device 3602.

Filter management unit 3624 can generate/delete a filter as well as setting an attribute value for an attribute applied to the filter by means of an instruction received from input processing unit 3627. Filter management unit 3624 can also select one of the filters to increase/reduce the area for display according to an instruction input through input device 3603.

Furthermore, filter management unit 3624 can select a data item located in a certain filter to move the selected item into another filter and to another tile region for display according to an instruction received from input processing unit 3627. Here, the attribute value for the relevant attribute applied to the filter and the tile region in which the moved data item is newly located is applied to the moved data item. When the moved data item already has an attribute value with respect to the relevant attribute, filter management unit 3624 modifies the attribute value of the moved data item to the new value. This process is carried out via database control unit 3622.

[Data display position determination unit 3626]

When the instruction input by input device 3603 is interpreted by input processing unit 3627 to have the possibility of modifying the display position of the data item that is now displayed, data display position determination unit 3626 determines the new display position of each data item stored in database 3621 according to the request from any of database control unit 3622, tile region management unit 3623 and filter management unit 3624.

Data display position determination unit 3626 reads out each attribute value of each data item stored in database 3621 via database control unit 3622. Data display position determination unit 3626 refers to the attribute value for the attribute applied to the tile region supervised by tile region management unit 3623 and the attribute value for the attribute applied to the filter supervised by filter management unit 3624 to determine the position of each data item in database 3621 to be displayed.

[Display control unit 3625]

Display control unit 3625 receives the request to rewrite the contents displayed on display device 3602 via any of database control unit 3622, tile region management unit 3623, and filter management unit 3624. When the request from database control unit 3622 is received, display control unit 3625 reads out the display position of each data item stored in database 3621 via database control unit 3622. When the request is received from tile region management unit 3623, display control unit 3625 reads out the display position of each tile region under control of tile region management unit 3623. When the request is received from filter management unit 3624, display control unit 3625 reads out the display position of each filter under control of filter management unit 3624. Then, display control unit 3625 updates the information displayed in display device 3602.

[Data management method]

The data management method according to the present embodiment will be described schematically with reference to FIGS. 37–77.

The present embodiment corresponds to the data management method of the present invention as applied to a case where a database for professional baseball players is to be supervised. However, it should be more understood that the method of the present invention is not limited to any particular subject or display method.

[Addition of new attribute]

The method of adding a new attribute to each data item m a database will be described with reference to FIGS. 37–40.

Figures 37, 38:
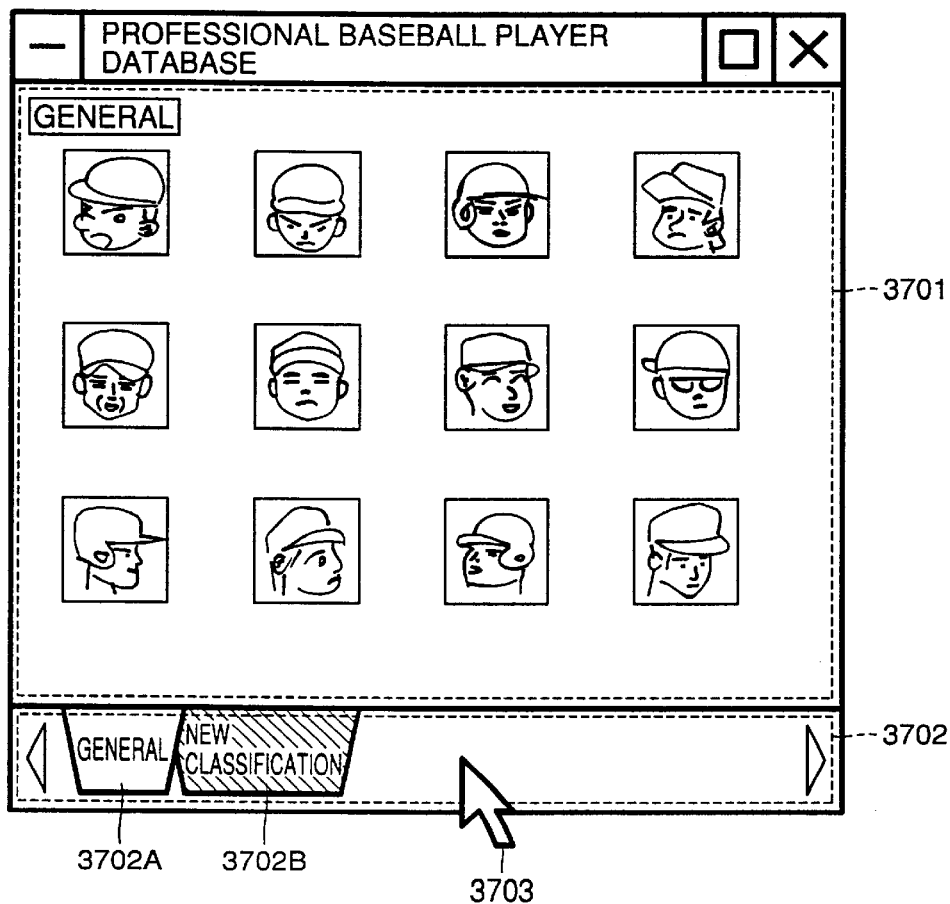
FIG. 37 shows an initial screen of a data management application having a database of professional baseball players according to a second embodiment of the present invention.
FIG. 38 shows a data management table at the initial time point.

FIG. 37 shows a screen display of a data management application including the function of the data management method of the present invention. A data display region 3701 and a group classification display switch interface 3702 are displayed on the screen.

A tile region to display data is provided in data display region 3701. Each data corresponding to a professional baseball player stored in the current database is represented by an icon.

In the present embodiment, the data is displayed as an icon of an illustration of a baseball player. The symbolic data is not limited to the displayed icon, and may be a picture or a row of characters.

For the sake of simplification, the number of data is limited to twelve. However, the method of the present invention is not limited to a data set of a constant number. Data can be newly added to the data set as will be described afterwards.

The size of the icons displayed in the tile region and also the number of icons displayed in the tile region are appropriately determined depending upon the area and configuration of the tile region.

It is assumed that each data does not have an attribute in the state shown in FIG. 37. Only a data ID for identification is applied to each data. FIG. 38 shows a data management table corresponding to the state of FIG. 37. A data management table shows the state of each data in the database in table format. It is appreciated that the data ID of 101–112 are applied to the twelve data items, respectively.

As shown in FIG. 37, tabs 3702A and 3702B, to switch the group classification display, are provided in group classification display switch interface 3702 when the data is divided into groups by the attribute value possessed by the data.

At the current stage, no attribute nor attribute value for an attribute is applied to each data. Therefore, group classification is not effected. The "general" tab 3702A to display all the data items within one tile region is selected. Any tab that is not selected is displayed in a hatched manner.

In order to add a new attribute to each data, the user selects the "new classification" tab 3702B in group classification display switch interface 3702 by clicking with a mouse pointer 3703.

Figure 39:
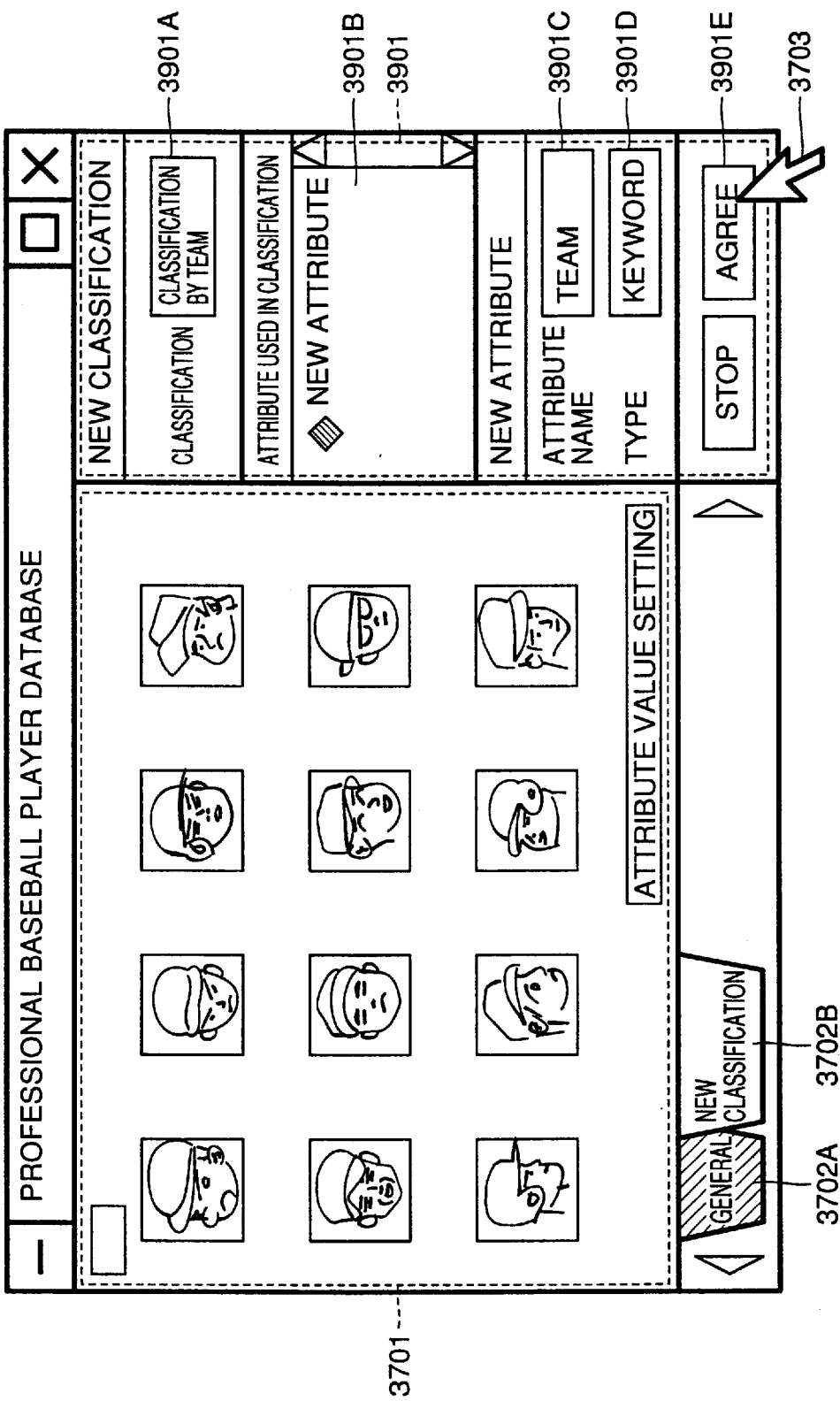
FIG. 39 shows a display screen in which data classification is newly carried out to add a new attribute to each data.

FIG. 39 shows the screen when "new classification" tab 3702B is selected. A new classification generation interface 3901 is displayed at the right side of data display region 3701.

The user specifies the label for the new group classification by entering a row of characters into text box 390 1A. Here, the character string of "classification by team" is specified. Then, the user detennines the attribute of the data to be used for group classification. More specifically, the user selects one item from the display in selection box 390 1B i.e., an attribute from all the current attributes of the data or the "new attribute" to be generated to be used for classification. Since no data has an attribute in the display state shown in FIG. 39, only "new attribute" is displayed for selection in selection box 390 1B.

When "new attribute" is selected in selection box 390 1B, text boxes 3901C and 3901D to specify the feature of the new attribute to be generated is displayed. The user enters a row of characters therein to specify the label and the type of the new attribute. Here, the label is "team" and the type is "keyword". "Type" implies the type of an attribute value, such as "integer discrete value" besides "keyword".

Following the specification of the feature of an attribute to be newly generated, the user clicks the "agree" button 390 1B with mouse pointer 3703.

By the above operation, the attribute of "team" is assigned to each data. It is to be noted that an attribute value with respect to the attribute of "team" for each data is not yet specified.

FIG. 40 shows a data management table corresponding to the display state shown in FIG. 39. The attribute of "team" is applied to each data. However, the column for the attribute of "team" is left blank since an attribute value thereof is not yet set.

[Setting of attribute value using tile region]

The method of modifying the attribute value of each data will be described with reference to FIGS. 41–47.

Figure 41:
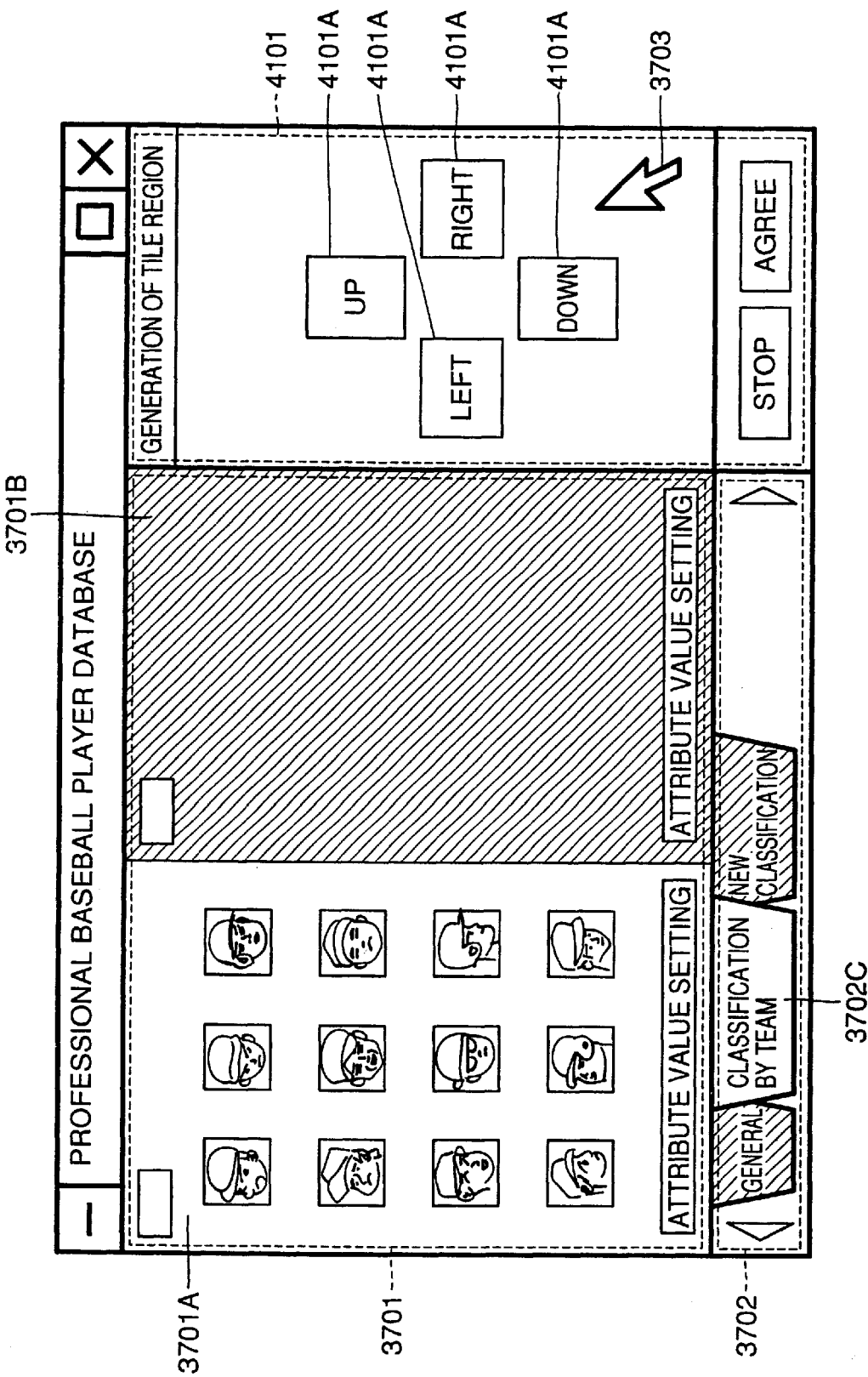
FIG. 41 shows a display screen for generating a tile region to display data classification in a data management application.

When agree button 3901E is depressed at the display state shown in FIG. 39, tile region generation interface 4101 is newly displayed at the right side of data display region 3701 as shown in FIG. 41. Also, tab 3702C indicating "classification by team" that is newly generated is displayed in group classification display switch interface 3702 for selection.

Tile region generation interface 4101 is used to generate a tile region that is used to classify and display the data. By depressing tile region generation button 410 1A in tile region generation interface 4101, the user can generate a new tile region at the left, right, upper or lower side of the current tile region of interest. A tile region of interest can be specified by clicking the new tile region of interest with a mouse pointer 3703.

In data display region 3701, region 3701A displayed as an open rectangle is the tile region of interest. The hatched tile region 370 1B is the tile region that is newly generated.

Figure 42:
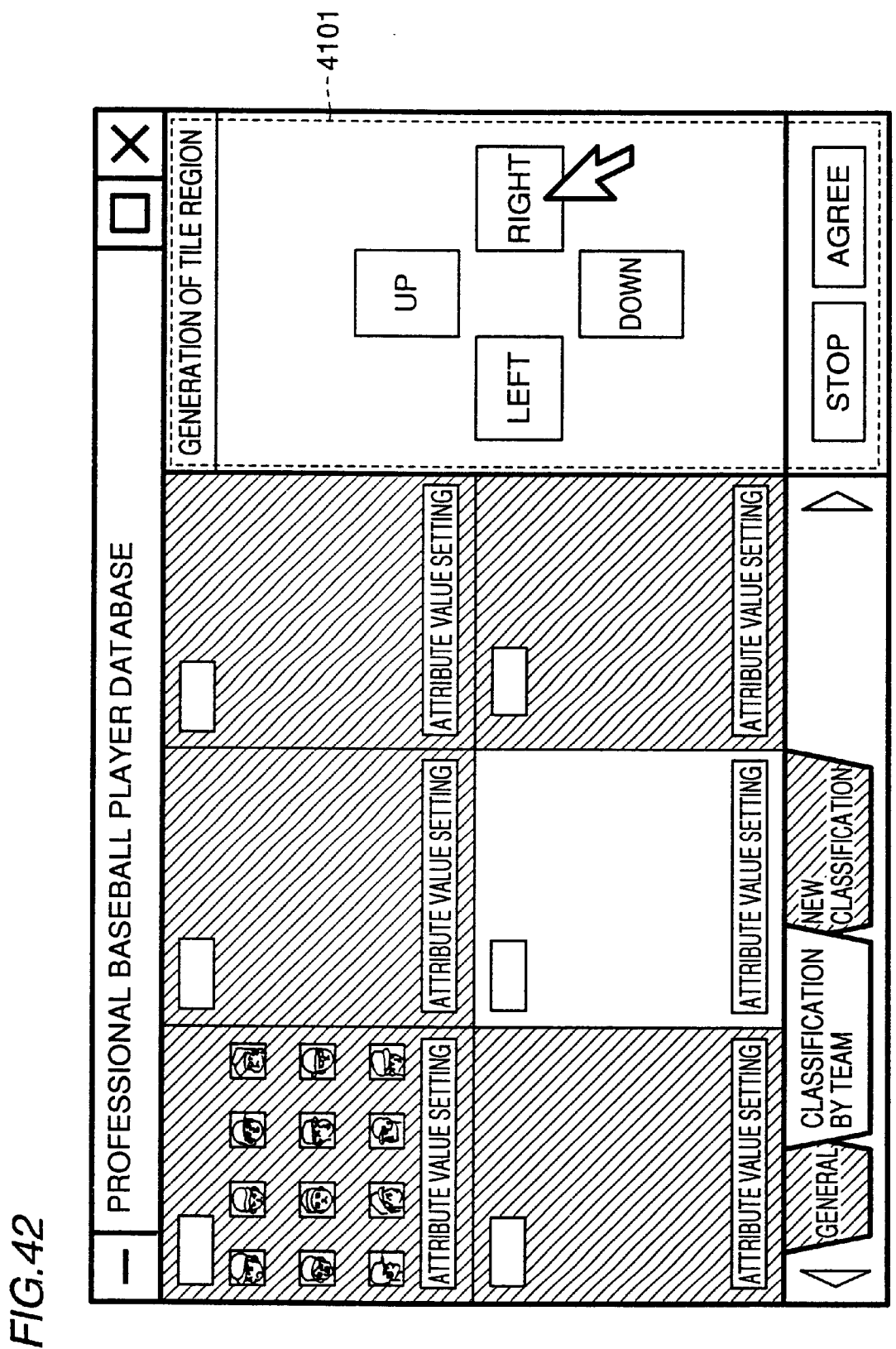
FIG. 42 shows a display screen for generating six tile regions to display data classification in a data management application.

FIG. 42 shows the screen subsequent to generation of six tile regions using tile region generation interface 4101. The user then carries out the setting to connect an attribute value to each generated tile region.

Figure 43:
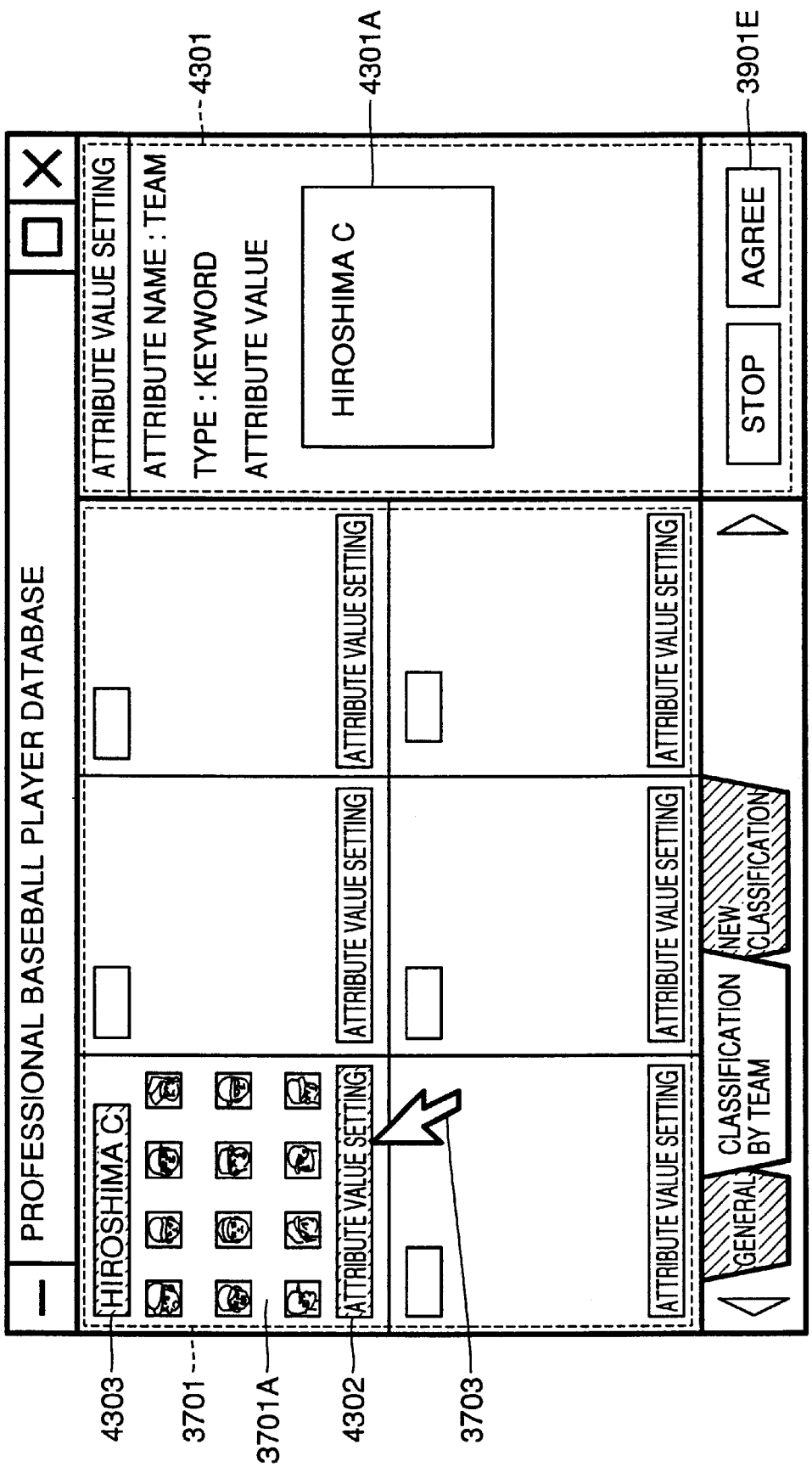
FIG. 43 shows a screen display for assigning an attribute value to a tile region generated for the display of data classification in a data management application.

FIG. 43 shows the display when "attribute value setting" button 4302 in tile region 370 1A is clicked with mouse pointer 3703. An attribute value setting interface 4301 is displayed at the right side of data display region 3701.

The label and type of the attribute set in text boxes 3901C and 3901D (FIG. 39) are displayed in attribute value set interface 4301. Text box 4301A to set an attribute value for that attribute is located in attribute value set interface 4301.

By entering a row of characters into text box 4301A, the user can set an attribute value for the attribute related to the selected tile region. Here, the attribute value of "Hiroshima C" with respect to the attribute of "team" is set as to tile region 3701A.

Figures 44, 45:
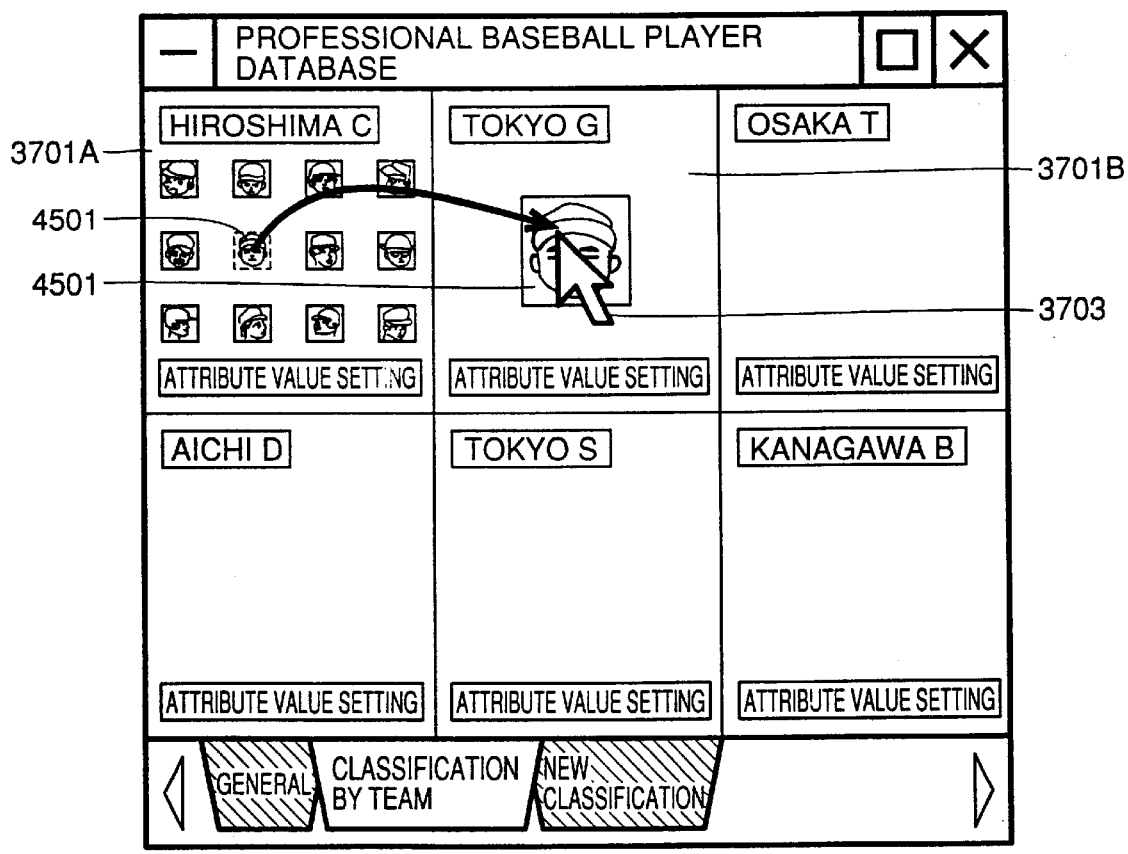
FIG. 44 shows a data management table in which ali the attribute values for the attribute of "team" of each data are "Hiroshima C".
FIG. 45 shows a screen display for modifying the attribute value of moved data by a drag-and-drop operation with respect to data shifted from a certain tile region to another tile region in a data management application.

By this operation, the attribute value of "Hiroshima C" is applied to the attribute of "team" for all the data displayed in tile region 3701A. The data management table corresponding to the state of FIG. 43 is shown in FIG. 44. The attribute value of "Hiroshima C" is applied to the attribute of "team" for all the data.

When an attribute value associated with a certain tile region is set as shown in FIG. 43, a general outline of the set attribute value is displayed in attribute value display box 4303 provided at the left upper area of the tile region. Following the setting of an attribute value to be similarly related for all the generated tile regions, the user depresses "agree" button 3901E.

FIG. 45 shows a screen corresponding to the state where an attribute value is set for all the six generated tile regions in FIG. 43 using attribute value set interface 4301 and depressing agree button 3901E. It is to be noted that attribute value set interface 4301 displayed in FIG. 43 has disappeared from FIG. 45.

Here, the user moves an icon representing data from a certain tile region to another tile region by a drag-and-drop operation to modify the attribute value of the data to the attribute value related to the newly dropped tile region.

As shown in FIG. 45, the user selects an icon 4501 representing the player's data displayed in tile region 3701A associated with the attribute value of "Hiroshima C" for the attribute of "team" with mouse pointer 3703. The user moves mouse pointer 3703 while depressing the mouse button (drag operation) to the site of tile region 3701B associated with the attribute value of "Tokyo G" for the attribute of "team", and cancels the depression of the mouse button (drop operation).

By this drag-and-drop operation, the attribute value with respect to the data attribute of "team" represented by icon 4501 that is moved to another tile region is altered from "Hiroshima C" to "Tokyo G".

Figures 46, 47:
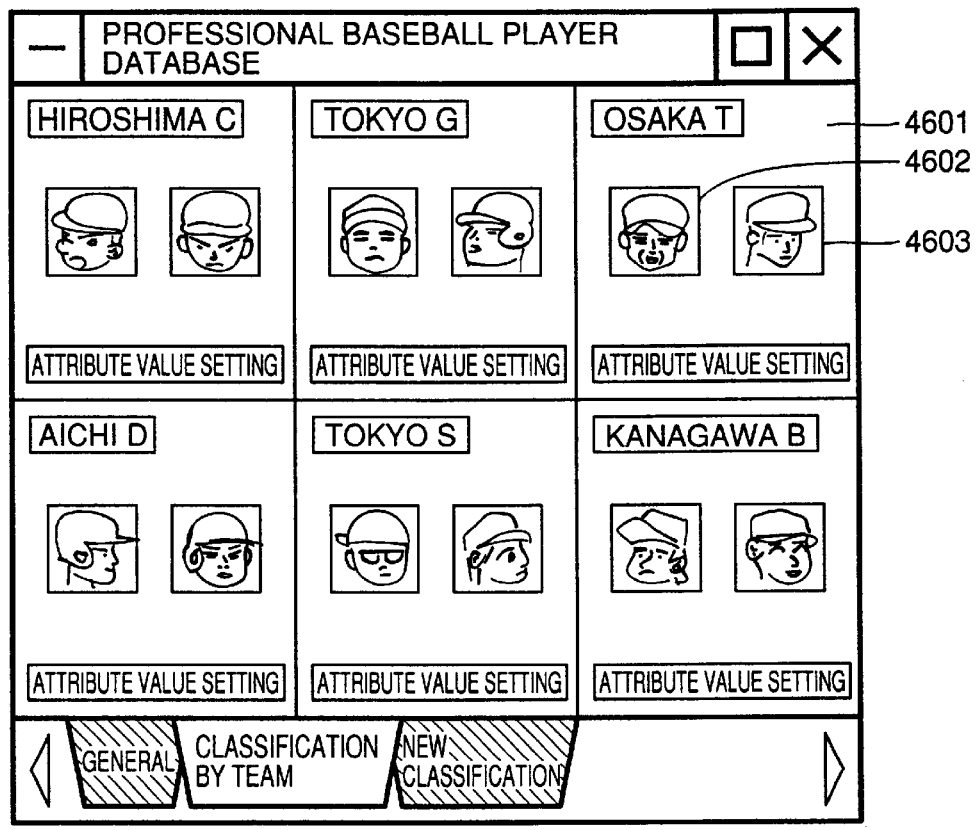
FIG. 46 shows a screen display for assigning an attribute value to the attribute of "fteam" with respect to data by moving the data between the tile regions in a data management application.
FIG. 47 shows a data management table in which the attribute value for the attribute of "team" of each data is set.

FIG. 46 shows the screen after the attribute value for the attribute of "team" of each data is altered by the drag-and-drop operation of the icon.

More specifically, the two data 4602 and 4603 located in tile region 4601 associated with attribute value "Osaka T" for the attribute of "team" corresponds to data having the attribute value of "Osaka T" for the attribute of "team".

By the above operation, the attribute value for the attribute of "team" has been applied to the professional baseball player data in the database. FIG. 47 shows a data management table corresponding to the state of FIG. 46. The attribute value for the attribute of "team" of each data has been set.

[Data retrieval and attribute value modification using filter]

The method of modifying an attribute value of data using a filter will be described with respect to FIGS. 48–53.

Figure 48:
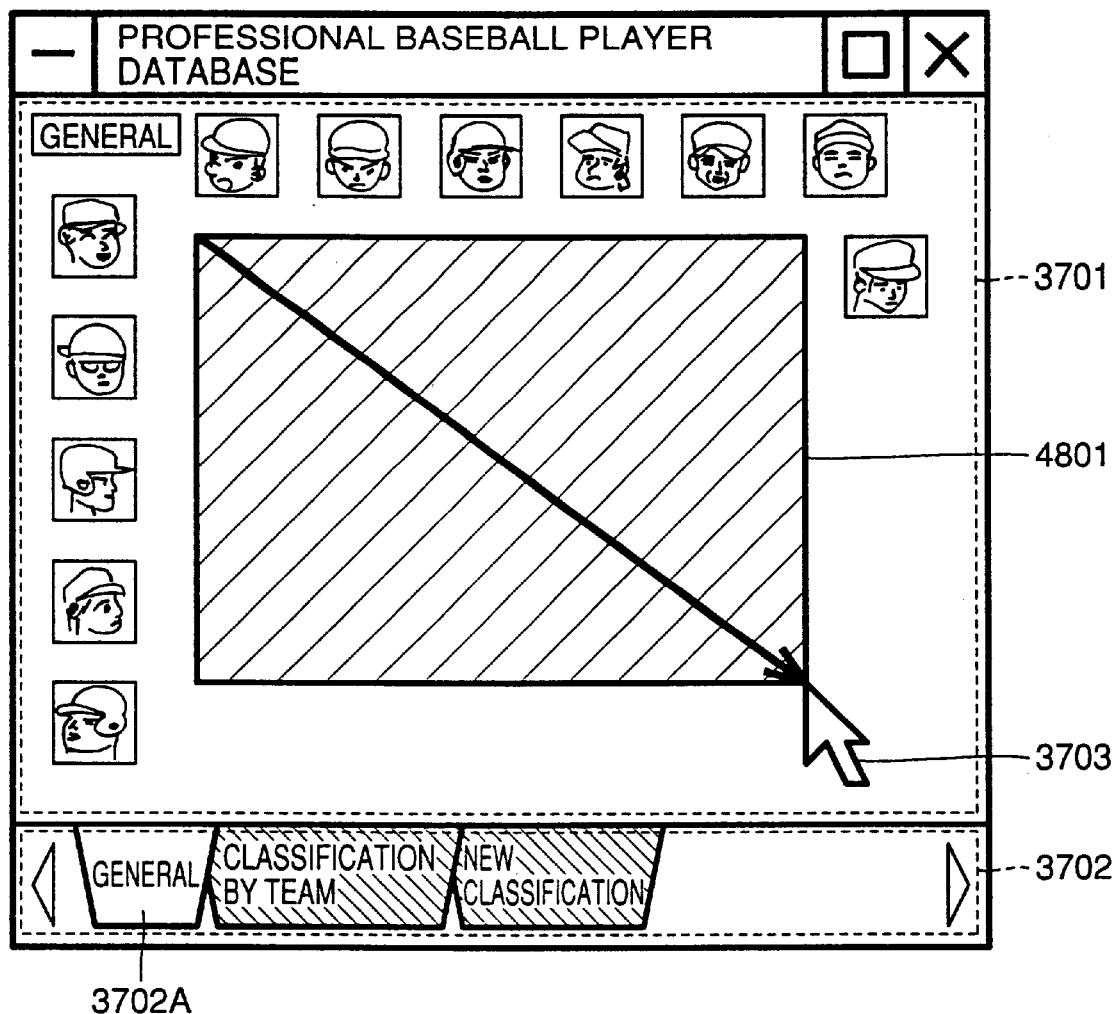
FIG. 48 shows a display screen for generating a filter to carry out data retrieval and supervising the attribute value in a data management application.

FIG. 48 shows the method of generating a filter. Here, a filter refers to an interface that allows data retrieval and modification of the attribute value possessed by the data, as described in the section of [Filter management unit 3624].

The user moves mouse pointer 3703 to an arbitrary position in data display region 3701 and depresses the mouse button. Then, the user moves mouse pointer 3703 to the next arbitrary position with the mouse button still depressed. By canceling the mouse button at the second arbitrary position, a rectangular filter 4801 is generated. More specifically, filter 4801 is generated with the first arbitrary position where the mouse button is depressed and the second arbitrary position where the mouse button is canceled as the two diagonal corners.

For the sake of illustration, the filter is displayed in a hatched manner in FIG. 48. In practice, the filter may be displayed in a translucent manner, or only the frame line may be displayed.

An attribute value similar to that of the above-described tile region can be connected to the filter. As to all the data displayed in the tile region where all the filters overlap, the data having an attribute value identical to the attribute value associated with the filter, or the data having an attribute value included in the range of the attribute value associated with the filter is displayed inside the filter. In other words, data retrieval is carried out with the attribute value related to the filter as the retrieval condition, and the retrieval result is displayed inside the filter.

There is no attribute value related to the filter at the time the filter is generated. Therefore, the icons displayed on the tile region are moved to avoid the filter so as not to be located at the area overlapping the filter.

According to the group classification display switch interface 3702 shown in FIG. 48, only one tile region is displayed since the "general" tab 3702A is selected. A filter can be generated by a similar method even in the case where a plurality of tile regions are displayed.

The method of determining an attribute associated with a filter and an attribute value for the attribute will be described with reference to FIG. 49. A filter interface 4901 is displayed on the filter when a filter is generated. A selection box 4901A for setting an attribute associated with the filter and an attribute value set interface 4901B for setting an attribute value with respect to a related attribute are displayed in filter interface 4901.

All the attributes for the data are displayed in selection box 4901A. The user selects one of the attributes. At the current stage, the data has only the attribute of "team". Therefore, the attribute of "team" is selected.

When a new attribute is added to each data in the database, the new attribute will be displayed automatically in selection box 4901A to enable the correspondence between the filter and the attribute value for the newly added attribute.

In attribute value set interface 4901B, the interface to set an attribute value for the selected attribute in selection box 4901A is displayed. The attribute of "team" is a keyword. Therefore, all the keywords for the "team" of each data are displayed to allow selection thereof. In FIG. 49, "Hiroshima C" is selected as the keyword. The user can select a plurality of keywords at the same time. In such a case, the inclusive OR thereof becomes the attribute value set to the filter.

At the time point when "Hiroshima C" is selected by mouse pointer 3703, the icon of the data with the attribute value of "Hiroshima C" for the attribute of "team" out of the 12 data in tile region 4902 is immediately shifted into the filter to be displayed. More specifically, the data having the attribute value of "Hiroshima C" are retrieved from the data. Icons 4903 and 4904 corresponds to the data having the attribute value of "Hiroshima C" for the attribute of "team". At the time point when "Hiroshima C" is selected, icons 4903 and 4904 are moved into the filter for display.

In a conventional retrieval system, the user generally took the procedure of setting a retrieval condition and then depressing a button to initiate execution of retrieval. In the data management apparatus of the present embodiment, the icon of the data with the attribute value matching the attribute value related to the filter or that is included in the attribute value range that is set or modified by the user is shifted into the filter for display immediately when that attribute value is set or modified. Thus, data retrieval can be carried out with a simple operation.

Upon depressing interface erase button 4901C, the display of selection box 4901A and attribute value select interface 4901B disappear from the screen.

Figure 49:
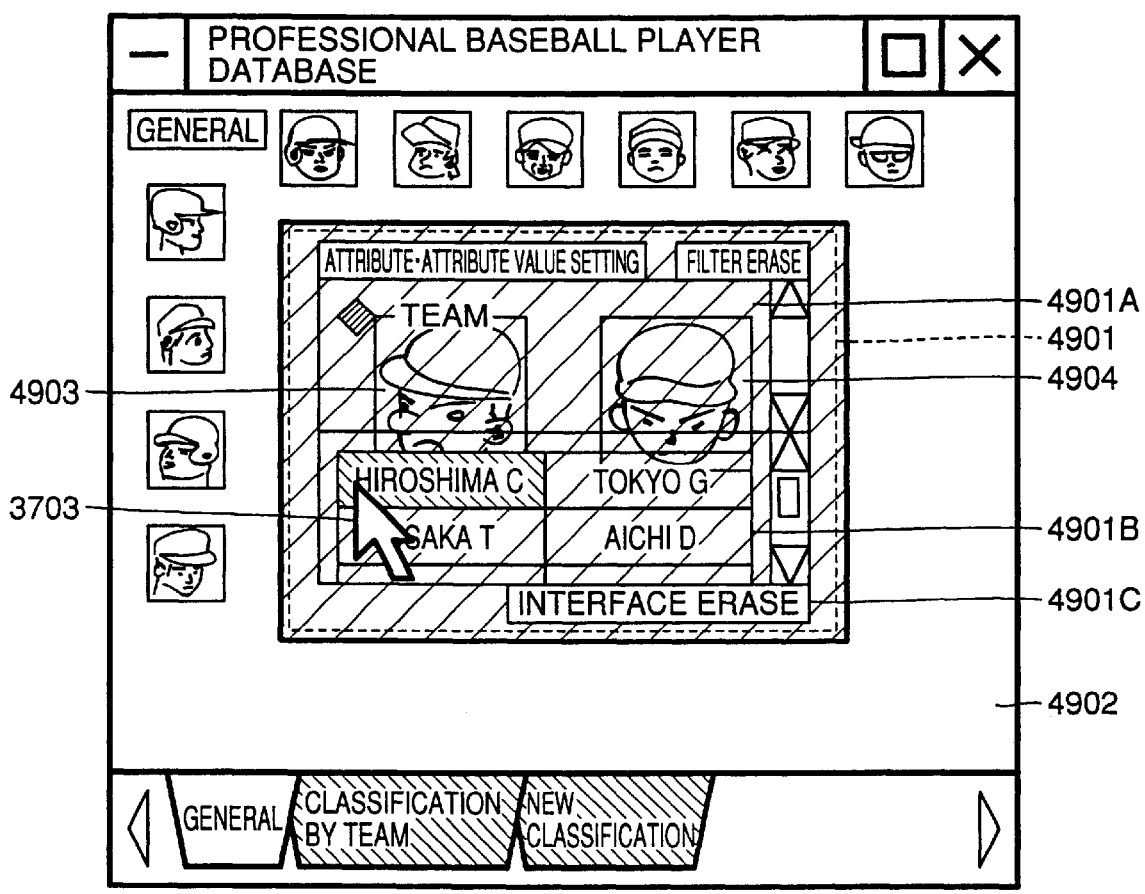
FIG. 49 shows a screen display for assigning an attribute value for a filter in a data management application.
Figure 50:
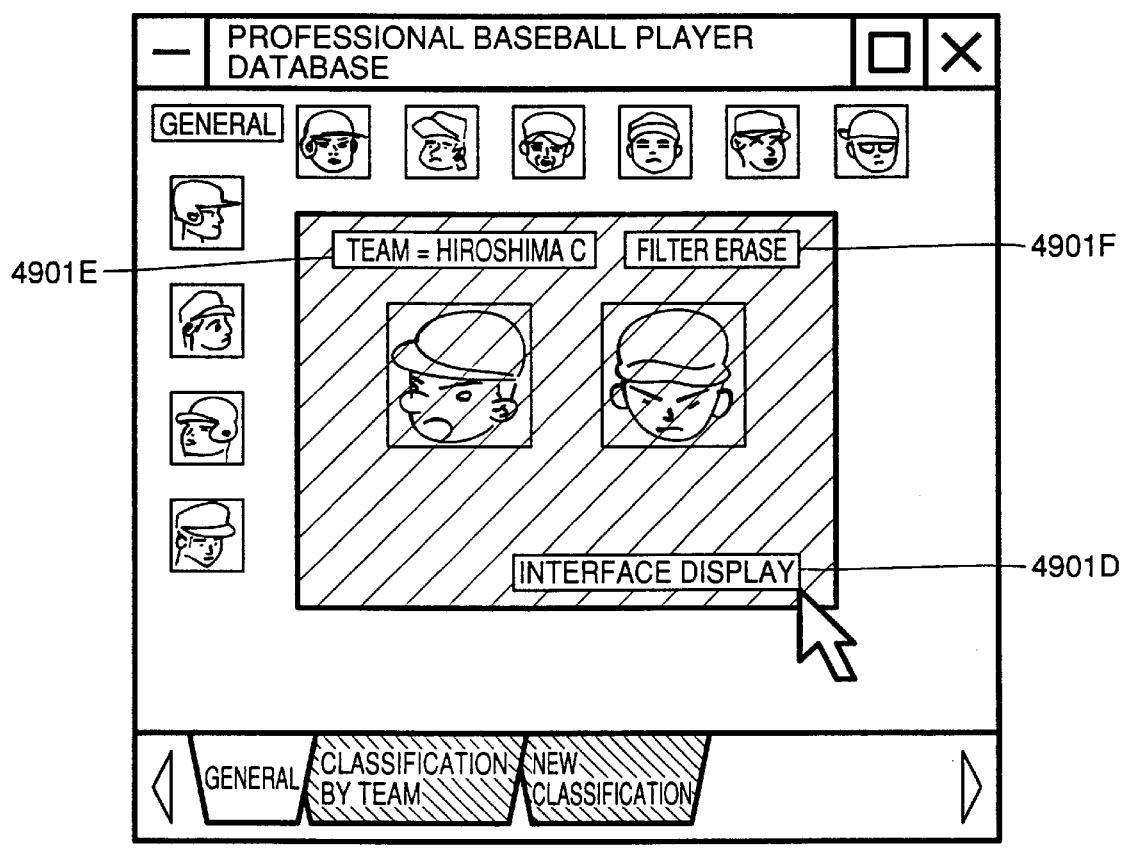
FIG. 50 shows a screen display for erasing an interface to set an attribute value displayed on a filter in a data management application.

FIG. 50 shows the resulting screen when interface erase button 4901C of FIG. 49 is depressed.

Selection box 4901A and attribute value set interface 4901B of FIG. 49 are not displayed. The general outline of the attribute and the attribute value associated with the filter is displayed in attribute value display area 4901E at the left upper portion of the filter.

Also, interface erase button 4901C is replaced with interface display button 4901D. The screen returns to the display of FIG. 49 when interface display button 4901D is depressed.

The filter itself will be erased when filter erase button 4901F is depressed.

The method of modifying an attribute value of a data item using a filter will be described with reference to FIG. 51. The user selects an icon 5101 that is displayed in an area that does not overlap with the filter by means of mouse pointer 3703. The user moves mouse pointer 3703 with the mouse button depressed to a site where filter 4801 overlaps. The user cancels the depression of the mouse button (drag-and-drop operation). As a result, icon 5101 is moved to its new location inside filter 4801.

Here, the attribute value corresponding to the attribute of "team" possessed by the data representing the moved icon 5101 is modified to the attribute value of "Hiroshima C" associated with filter 4801.

Figure 51:
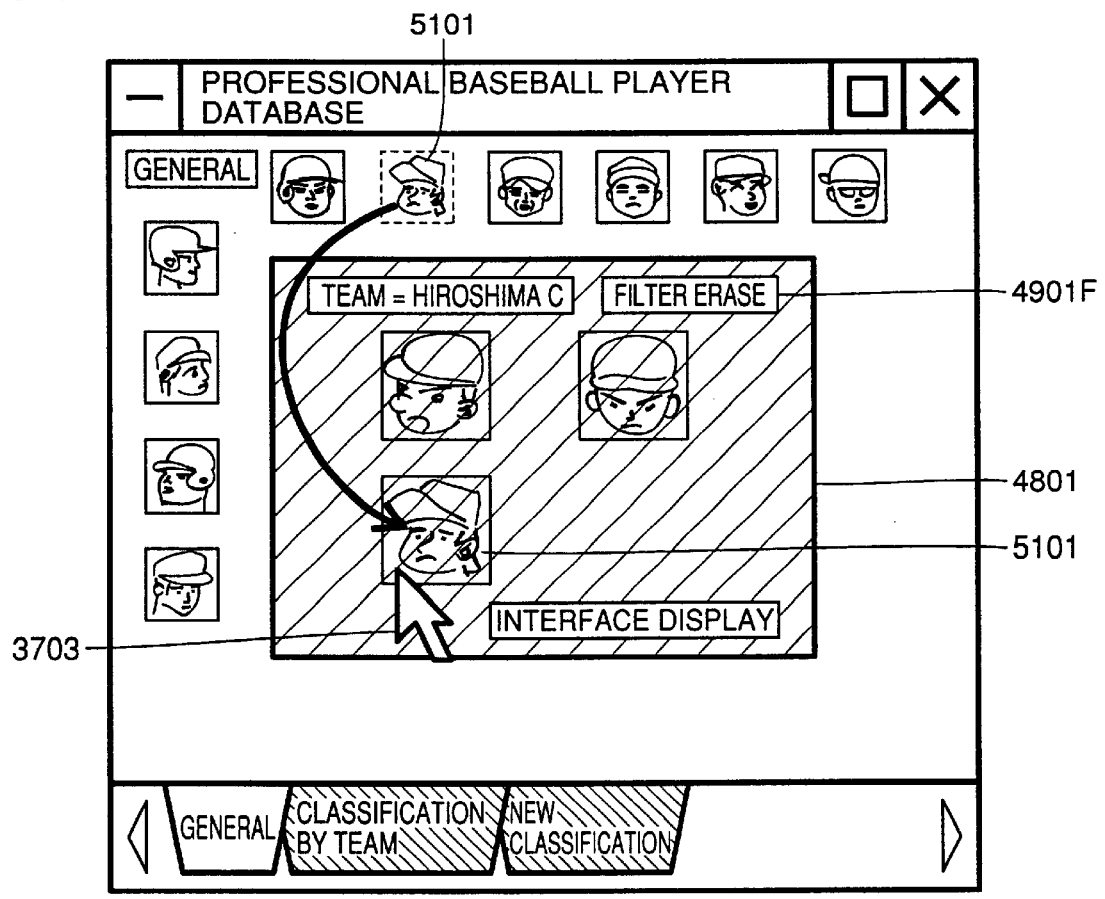
FIG. 51 shows a screen display for modifying the attribute value of a moved data by shifting data displayed outside the filter into the filter by a drag-and-drop operation.

FIG. 52 shows a data management table corresponding to the state of FIG. 51. The attribute value for the attribute of "team" applied to the data of data ID 104 is altered from "Kanagawa B" of FIG. 47 to "Hiroshima C".

Figure 53:
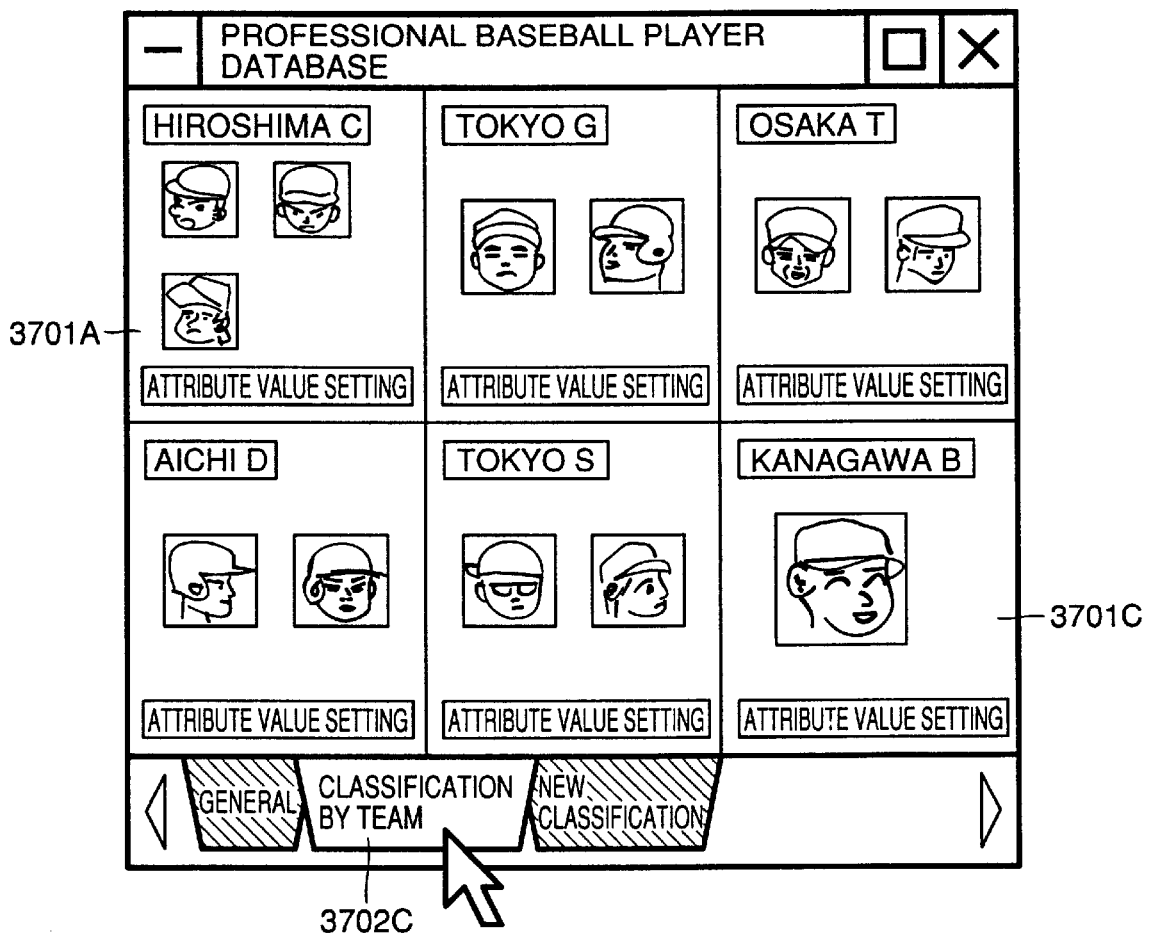
FIG. 53 shows a screen display for classifying each data by the attribute value for the "team" attribute in a data management application.

FIG. 53 shows a screen where the filter is removed by depressing filter erase button 4901F shown in FIG. 51 and when "classification by team" tab 3702C is depressed.

By the drag-and-drop operation described with reference to FIG. 51, the attribute value for the attribute of "team" for one data item is modified to "Hiroshima C". As a result, the number of icons displayed in tile region 3701A corresponding to the attribute value of "Hiroshima C" is incremented by one to the total of 3 from the state shown in FIG. 46. Since the number of icons displayed in tile region 3701C corresponding to the attribute value of "Kanagawa B" is decremented by 1 from the state shown in FIG. 46, it can be identified that the data with the modified attribute value previously had the attribute value of "Kanagawa B".

The attribute value can similarly be modified by a drag-and-drop operation between tile regions described with reference to FIG. 45.

The attribute value of data can be modified using a filter by the above-described operation.

[addition of attribute value, and one-time modification of attribute value for a plurality of attributes]

The method of adding a new attribute with a series of values as an attribute value for each data item in a database, and the method of modifying the attribute value for a plurality of attributes for the data at one time using a plurality of filters will be described with reference to FIGS. 54–71.

Figure 54:
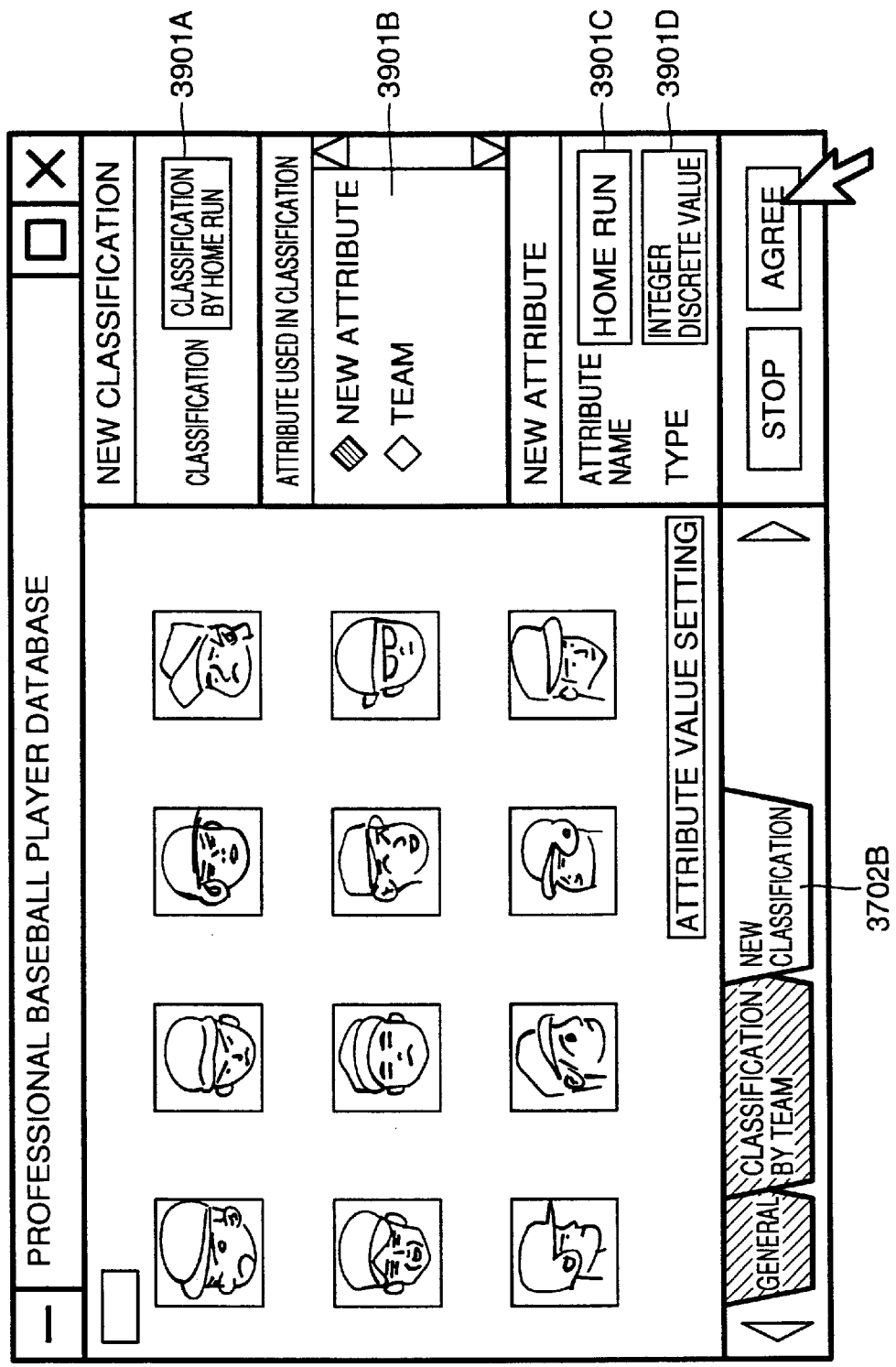
FIG. 54 shows a display screen in which group classification is newly carried out to add a new attribute of "home run" in a data management application.

FIG. 54 shows a screen when "new classification" tab 3702B is depressed. Similar to the case of FIG. 39, the user sets the label of the new group classification in text box 3901A. "Classification by home run" is set as the label in FIG. 54. The previously generated attribute of "team" is displayed in selection box 3901B. Here, the user selects "new attribute". Then, the user sets the label of the new attribute as "home run" in text box 3901C, and sets the type of the attribute to be newly generated in text box 3901D as "integer discrete value".

Figure 55:
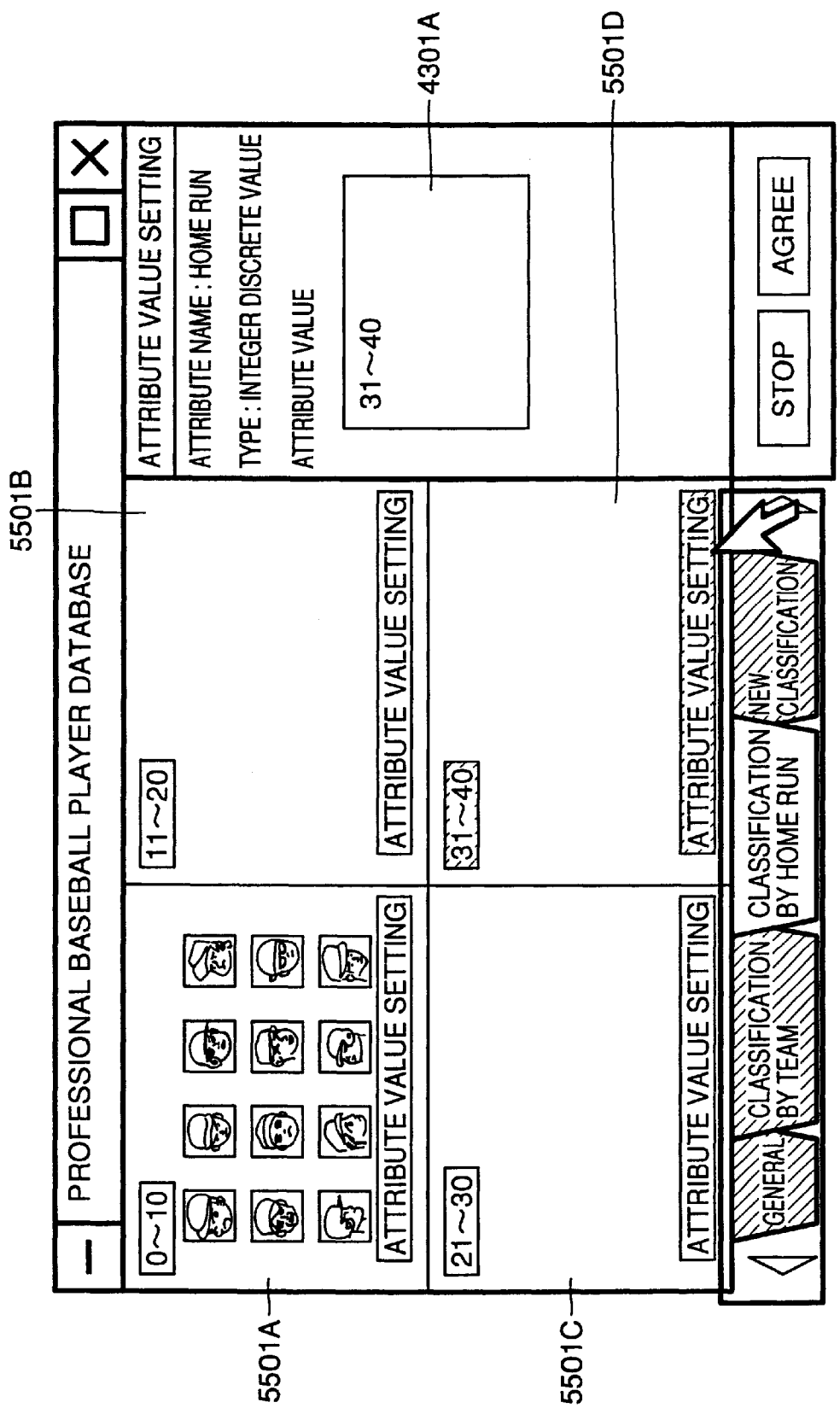
FIG. 55 shows a screen display for assigning an attribute value for a tile region which is generated to display classification in the new group classification in a data management application.

FIG. 55 shows a screen when an attribute value associated with a tile region is set. It is to be noted that four tile regions 5501A, 5501B, 5501C and 5501D are already generated using tile region generation interface 4101 described with reference to FIG. 41. Accordingly, the details thereof will not be repeated here.

The user sets the attribute value associated with each tile region in text box 4301k Here, the attribute value range of "0–10" (0–10 implies "at least 0 and not more than 10") with respect to the attribute of "home run" for tile region 5501A. Similarly, the attribute value range of "11–20", the attribute value range of "21–30" and the attribute value range of "31–40" are related to tile regions 5501B, 5501C and 5501D, respectively.

At this current stage, the data displayed in tile region 5501A is assigned the attribute value range of "0–10" for the attribute of "home run".

Figure 56:
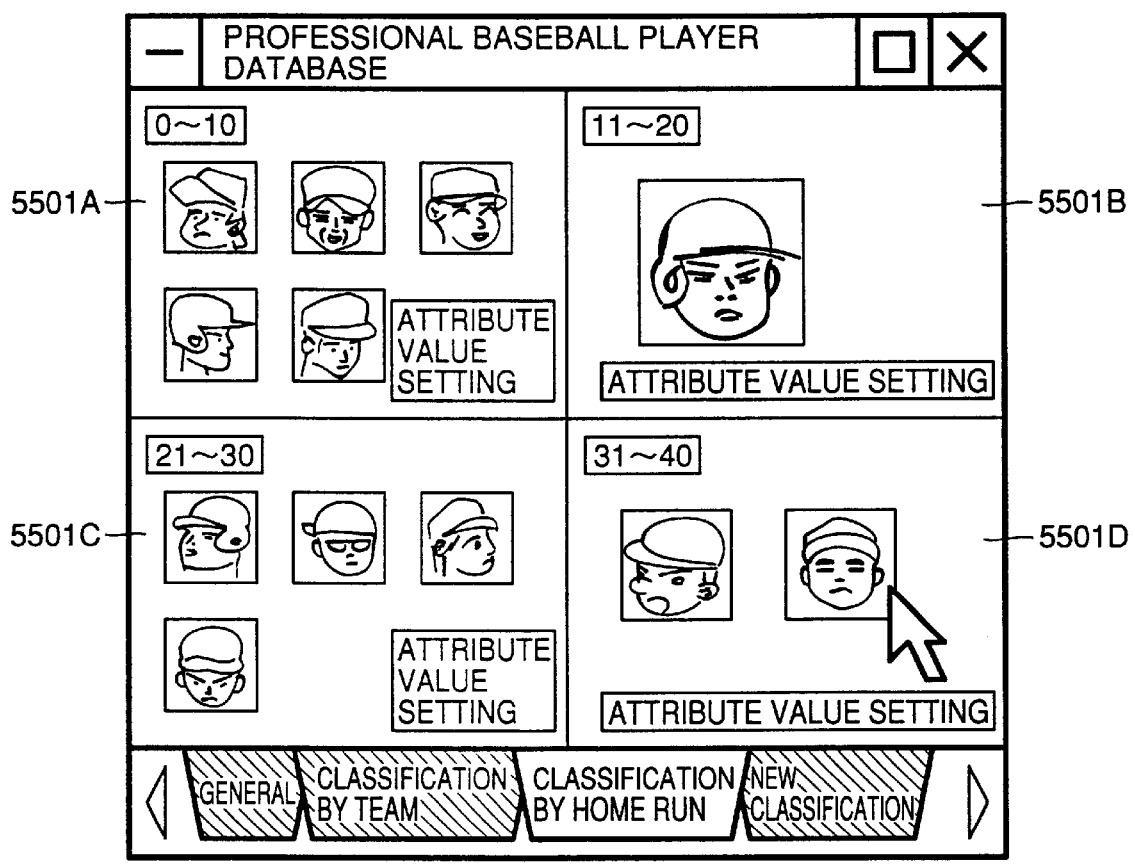
FIG. 56 shows a screen display for assigning the attribute value for the attribute of "home run" for each data by moving data between tile regions by a drag-and-drop operation in a data management application.

FIG. 56 shows the screen when data displayed in tile region 5501A are shifted to tile regions 5501B, 5501C and 5501D using the drag-and-drop operation described with reference to FIG. 45. The data displayed in each tile region is assigned an attribute value range related to that tile region.

FIG. 57 shows a data management table corresponding to the state of FIG. 56. The attribute of "home run" is added to each data item. Also, the attribute value for the attribute of "home run" is set in respective ranges.

Figure 58:
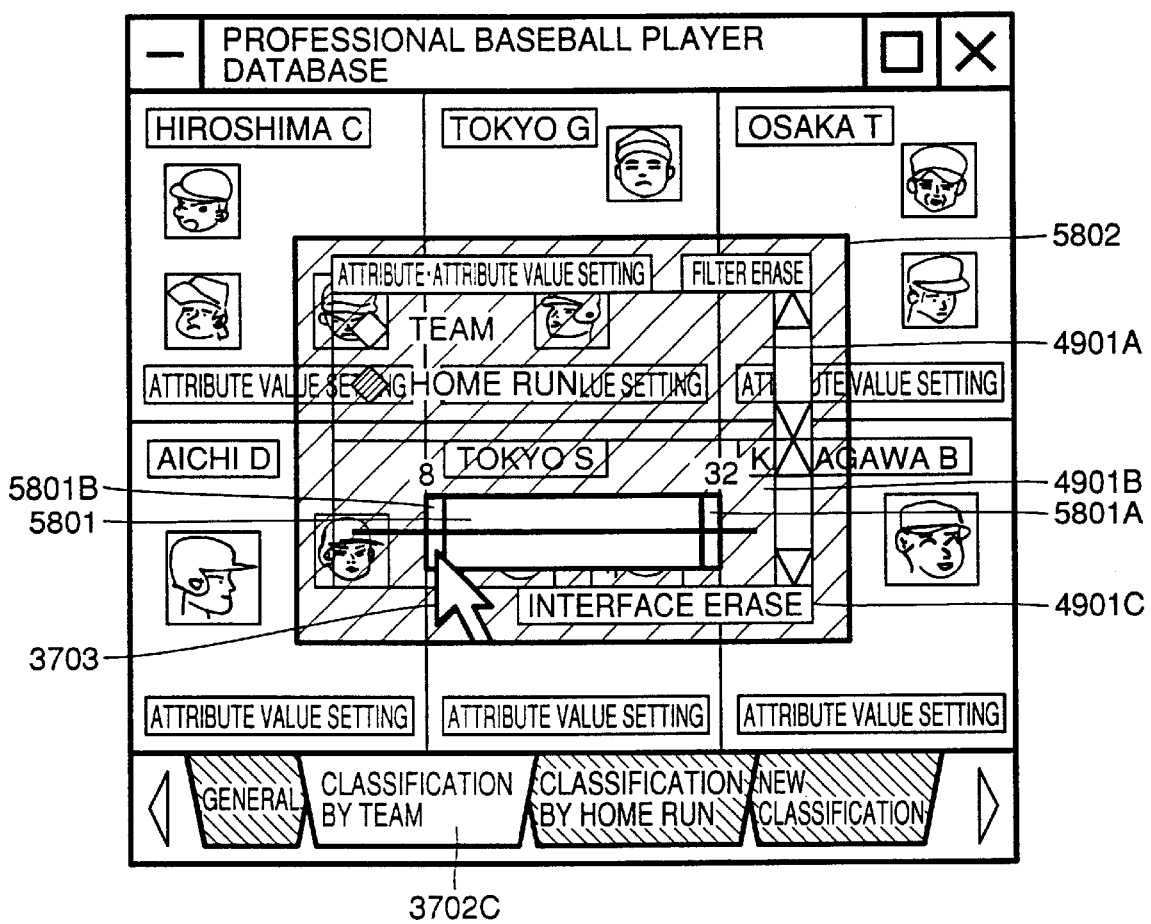
FIG. 58 shows a screen display when a filter is generated for data retrieval and modification of an attribute value of data to set an attribute associated with the filter and the range of the attribute value.

FIG. 58 shows the screen where "classification by team" tab 3702C is selected and a new filter 5802 is generated employing the method described with reference to FIG. 48.

In selection box 4901A displayed on filter 5802 to select an attribute associated with filter 5802, the two generated attributes of "team" and "home run" are displayed. Here, "home run" is selected.

In attribute value set interface 4901B, the interface to set the attribute value for the attribute of "home run" selected in selection box 4901A is displayed.

The attribute value for the selected attribute of "home run" takes a series of discrete values. A slider 5801 to specify an attribute value range is displayed in attribute value set interface 4901B.

By dragging the right end 5801A of slider 5801 with mouse pointer 3703, the upper limit of the attribute value range can be set. Here, "32" is set as the upper limit. By dragging the left end 5801B of slider 5801 with mouse pointer 3703, the lower limit of the attribute value range can be set. Here, "8" is set as the lower limit. The attribute value range can be modified while maintaining the width between the upper limit value and the lower limit value by dragging the main body of slider 5801.

By modifying the attribute value range using attribute value set interface 4901B, the data having an attribute value range completely included in the attribute value range of the filter is immediately moved into filter 5802 to be displayed. It is to be noted that the displayed data will not be crowded out from the tile region.

By this operation, the retrieval of "a player with the number of "home runs" of 8–32" from all the players of each "team" is effected.

Figure 59:
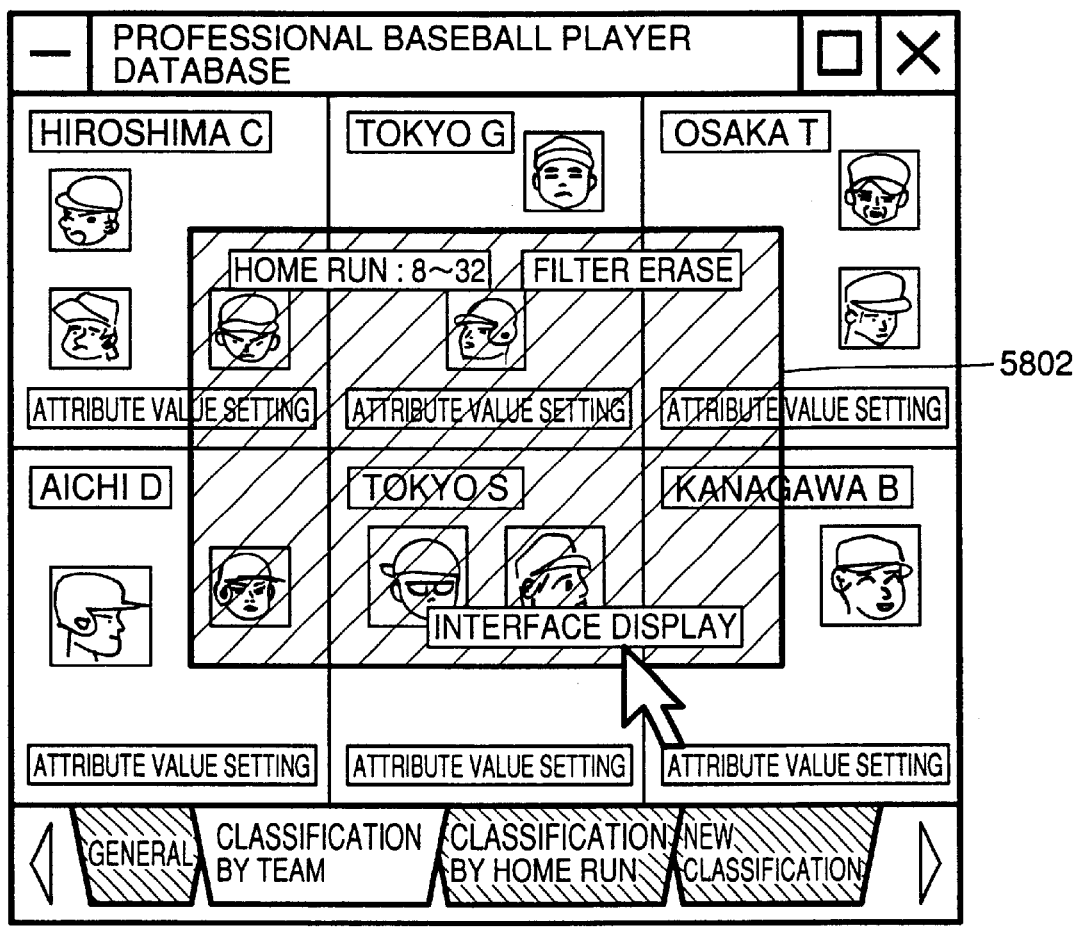
FIG. 59 shows a screen display for erasing the interface to specify an attribute value displayed on a filter in a data management application.

FIG. 59 shows the resulting screen when interface erase button 4901C, shown in FIG. 58 is depressed. Data having an attribute value range completely included in the attribute value range associated with filter 5802 among the data located in respective sections of each tile region overlapping with filter 5802 is displayed in the section overlapping with filter 5802.

All the filters can be moved and deformed arbitrarily by operating the mouse.

Figure 60:
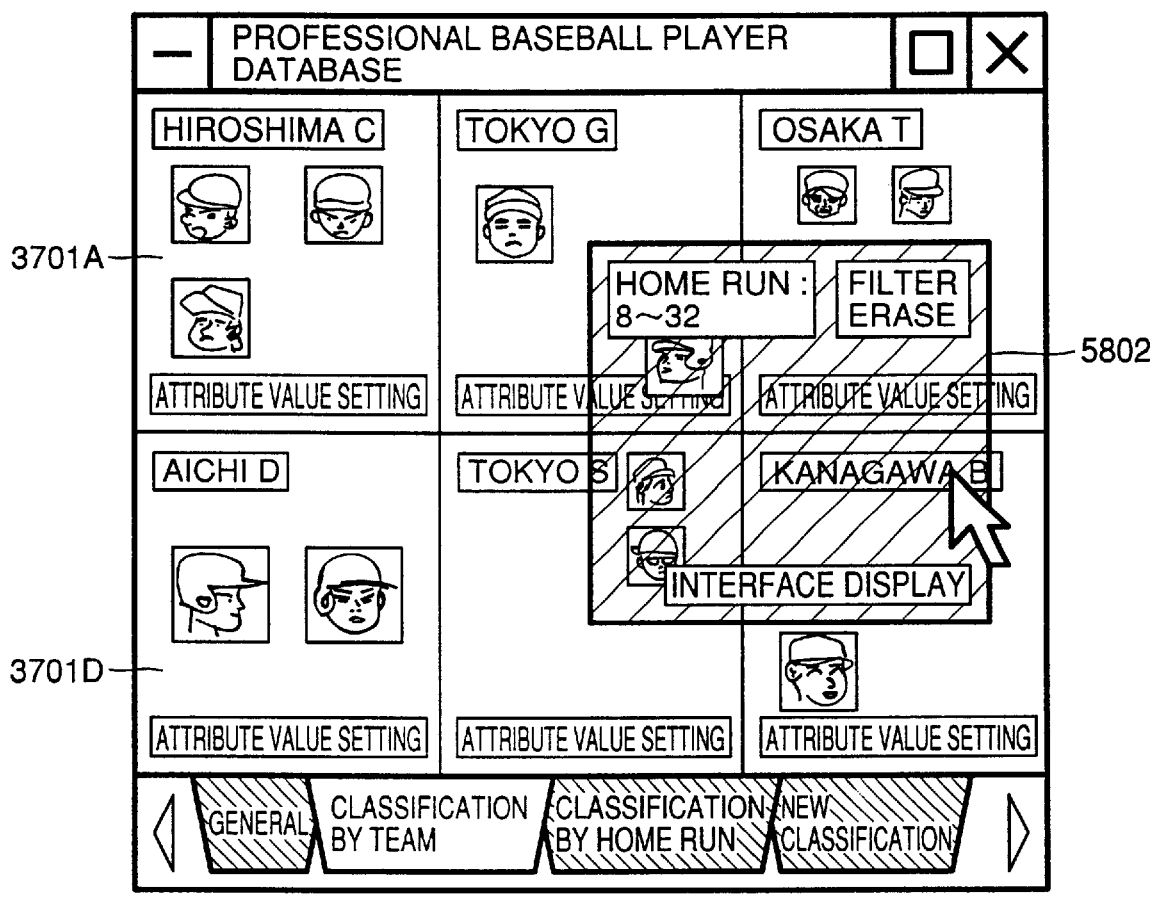
FIG. 60 shows a screen display for modifying the configuration and the position of a filter in a data management application.

FIG. 60 shows the screen where filter 5802 displayed in FIG. 59 is shrunken and shifted. By this operation, each data displayed in tile regions 3701A and 3701D that no longer overlap with filter 5802 will not be displayed inside filter 5802 although it may be completely included in the attribute value range associated with filter 5802.

Figure 61:
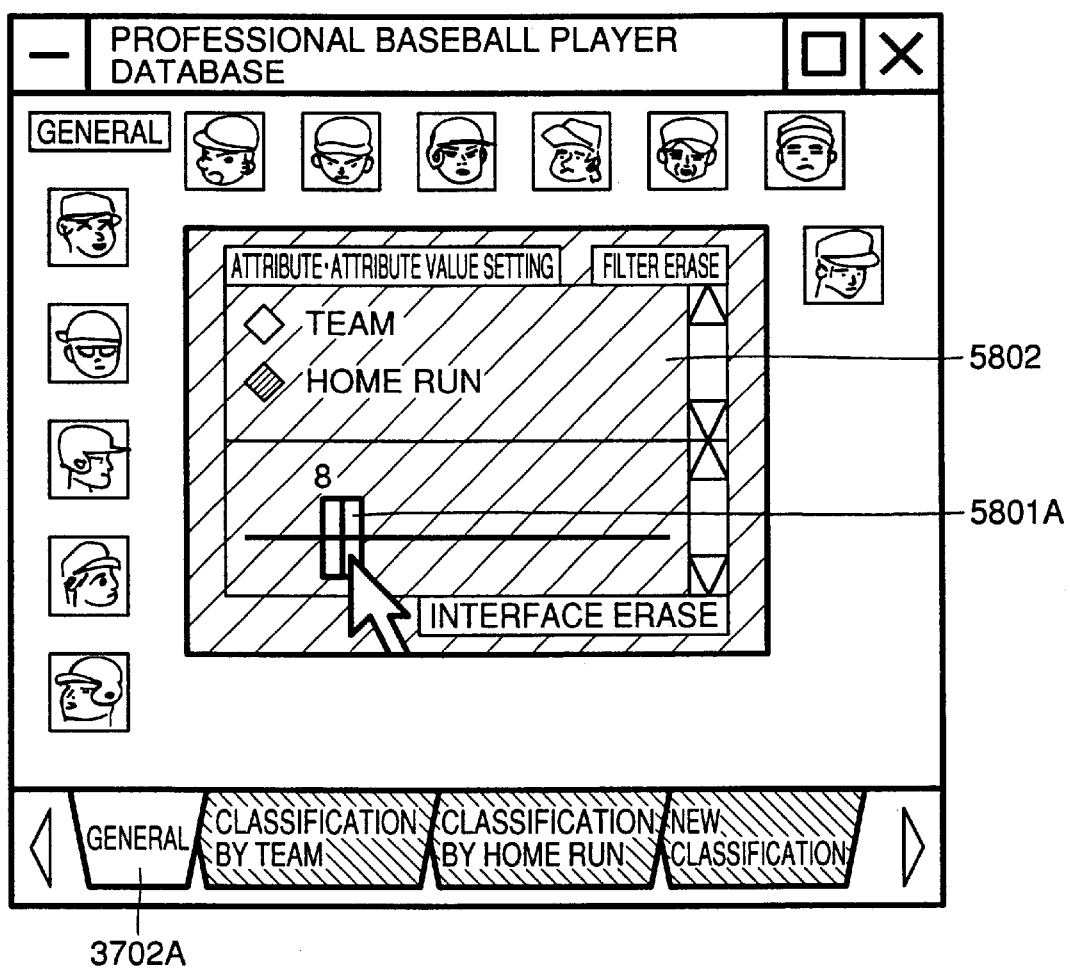
FIG. 61 shows a screen display for modifying the range of an attribute value related to a filter in a data management application.

FIG. 61 shows the screen where the right end 5801A of slider 5801 in FIG. 58 is dragged to set "8", and "general" tab 3702A is selected. By this operation, the attribute value of "8" for the attribute of "home run" is associated with filter 5802. However, there is no data that has the attribute value of "8" for the attribute of "home run". Therefore, all the data are moved to a section that does not overlap with filter 5802 and then displayed on the screen.

The method of modifying the attribute value of a data item using a filter will be described with reference to FIG. 62. Similar to the case of FIG. 51, upon moving icon 6201 into filter 5802 by the drag-and-drop operation using mouse pointer 3703, the attribute value for the attribute "home run" with respect to the data represented by the moved icon 6201 is modified to "8".

Here, the upper limit and the lower limit of the attribute to be associated with filter 5802 are both set to "8". Therefore, the attribute value of "8" is applied to the moved data. When a similar operation is carried out with the upper limit of the attribute value associated with the filter as "10", the attribute value range of "8–10" is applied to the data of the shifted icon.

Figure 62:
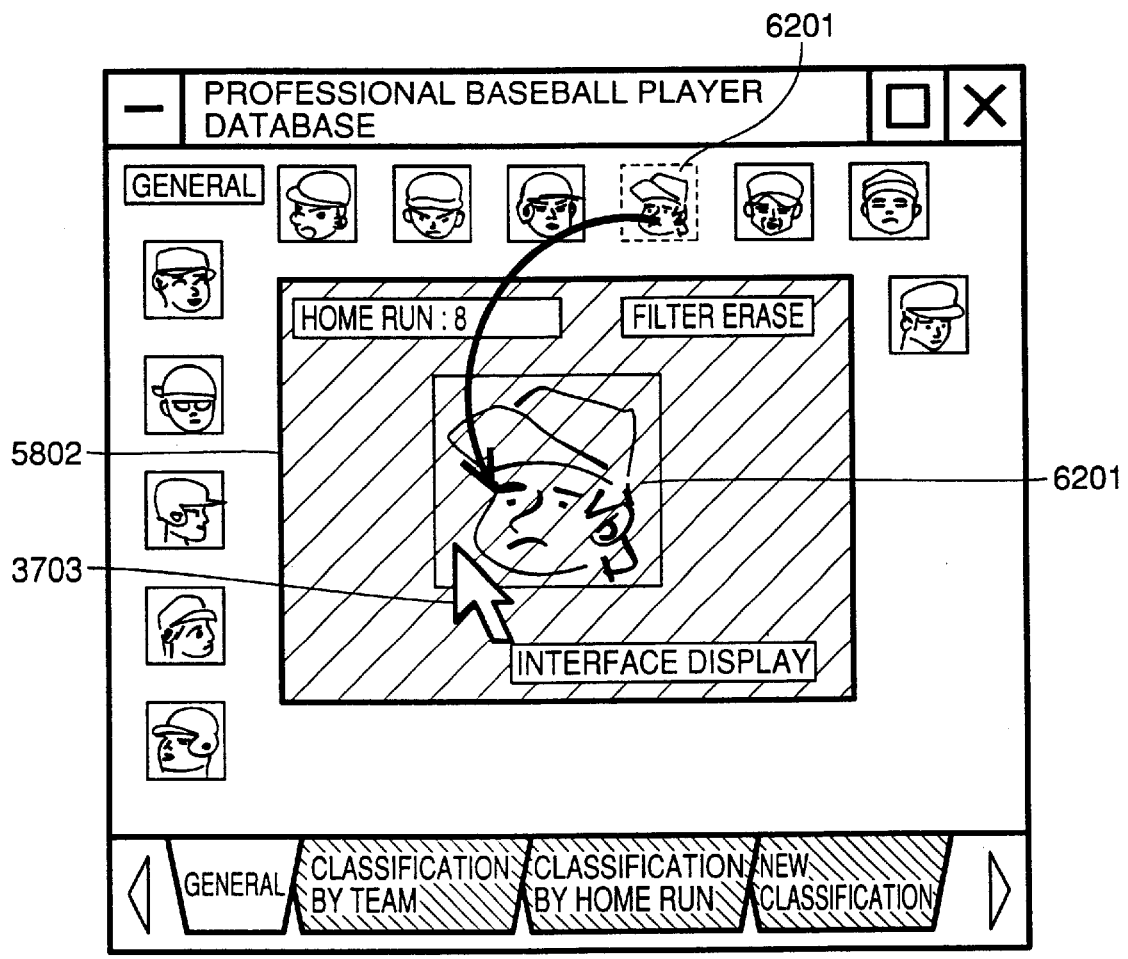
FIG. 62 shows a screen display for modifying an attribute value of data by moving the data located outside a filter into the filter by a drag-and drop operation in a data management application.

FIG. 63 shows a data management table corresponding to the state of FIG. 62. The attribute value for the attribute of "home run" of the data corresponding to data ID 104 is modified from "0–10" as shown in FIG. 57, to "8".

Figure 64:
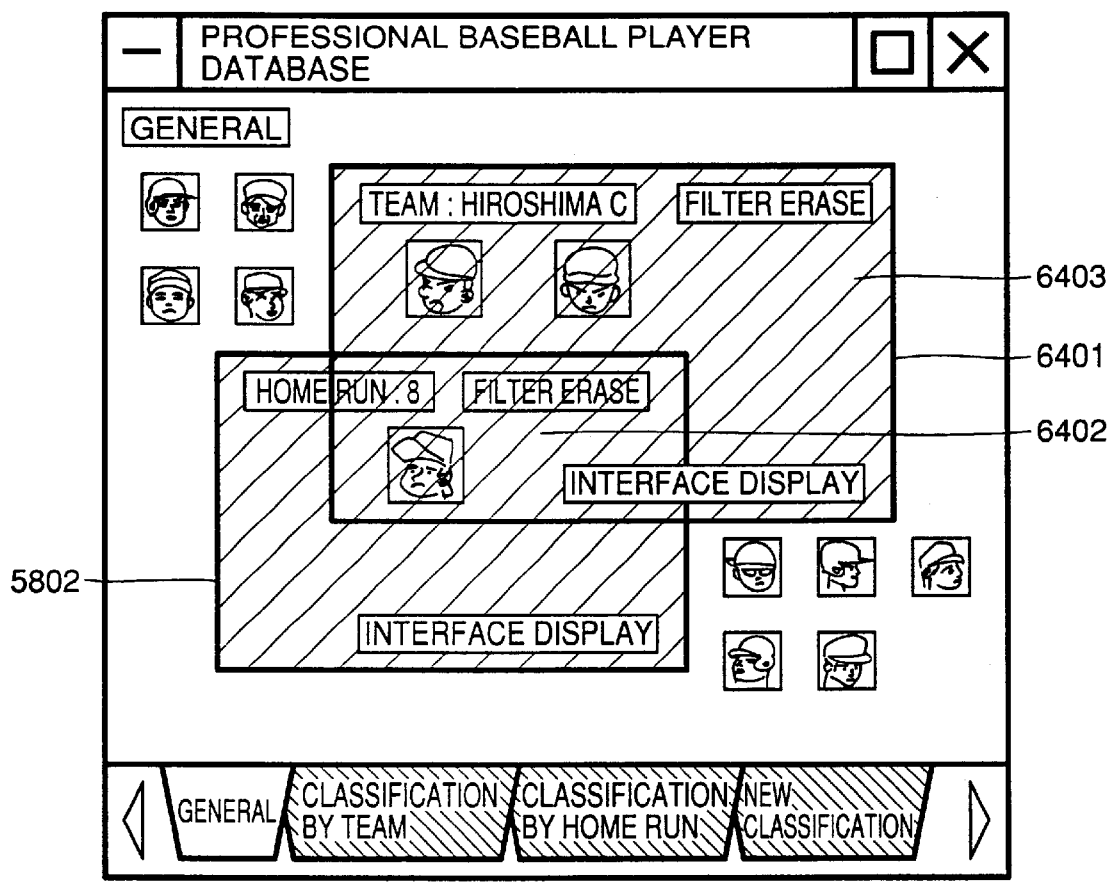
FIG. 64 shows a screen display for generating and overlapping two filters in a data management application.

FIG. 64 shows the screen where filter 5802 displayed in FIG. 62 is shifted and deformed, and overlapped with a generated filter 6401 having the attribute value of "Hiroshima C" for attribute "team", according to the method described with reference to FIGS. 48 and 49.

In region 6402 where the two filters overlap, the data having an attribute value of "Hiroshima C" for the attribute of "team", and the data having an attribute value "8" for the attribute of "home run" out of the data items in the database is displayed.

In region 6403 where only filter 6401 overlaps, data having the attribute value of "Hiroshima C" for the attribute of "team" and not having the attribute value "8" for the attribute of "home run" is displayed.

Figure 65:
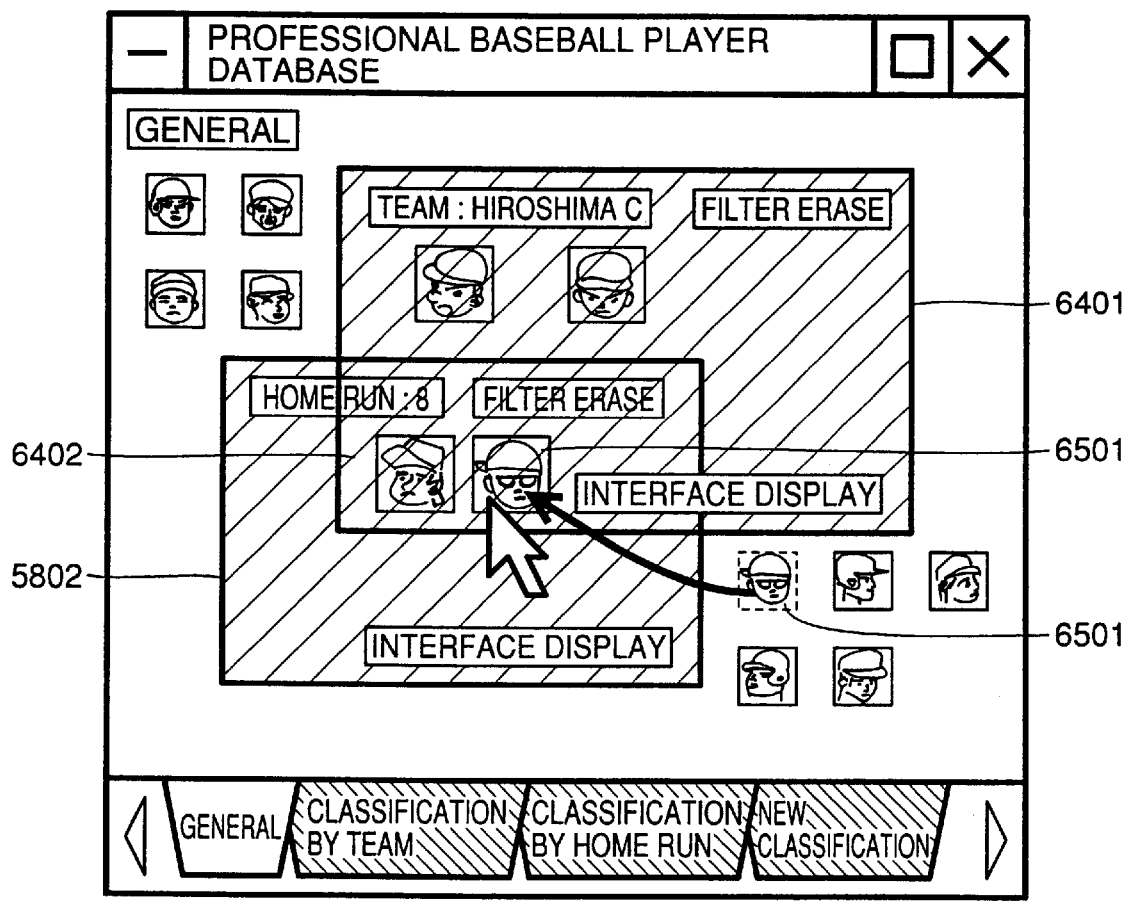
FIG. 65 shows a screen display for modifying the attribute value for a plurality of attributes at one time by moving data located outside the filter to an overlapping section of two filters by a drag-and-drop operation in a data management application.

FIG. 65 shows the screen where icon 6501 located in FIG. 64 at a section where the two filters 5802 and 6401 do not overlap is shifted to a region 6402 where the two filters overlap using the drag-and-drop operation. The attribute of "team" and the attribute of "home run" for the data represented by icon 6501 moved by this operation are set with the attribute values of "Hiroshima C" and "8" respectively.

By moving the icon to a section where a plurality of filters overlap using the drag-and-drop operation, the attribute values for a plurality of attributes can be modified by one operation.

FIG. 66 shows a data management table corresponding to the state of FIG. 65. It is appreciated that the attribute values for the attributes of "team" and "home run" of the data corresponding to data ID 108 are modified from "Tokyo 5" and "21–30" in FIG. 63 to "Hiroshima C" and "8" in FIG. 66 at one time.

In the present embodiment, the attribute values for two attributes are modified using two filters. However, the number of filters that can be overlapped is unlimited. Therefore, the attribute values for an unlimited number of attributes can be modified at one time by moving the data to an overlapping section of the filters by the drag-and-drop operation.

Figure 67:
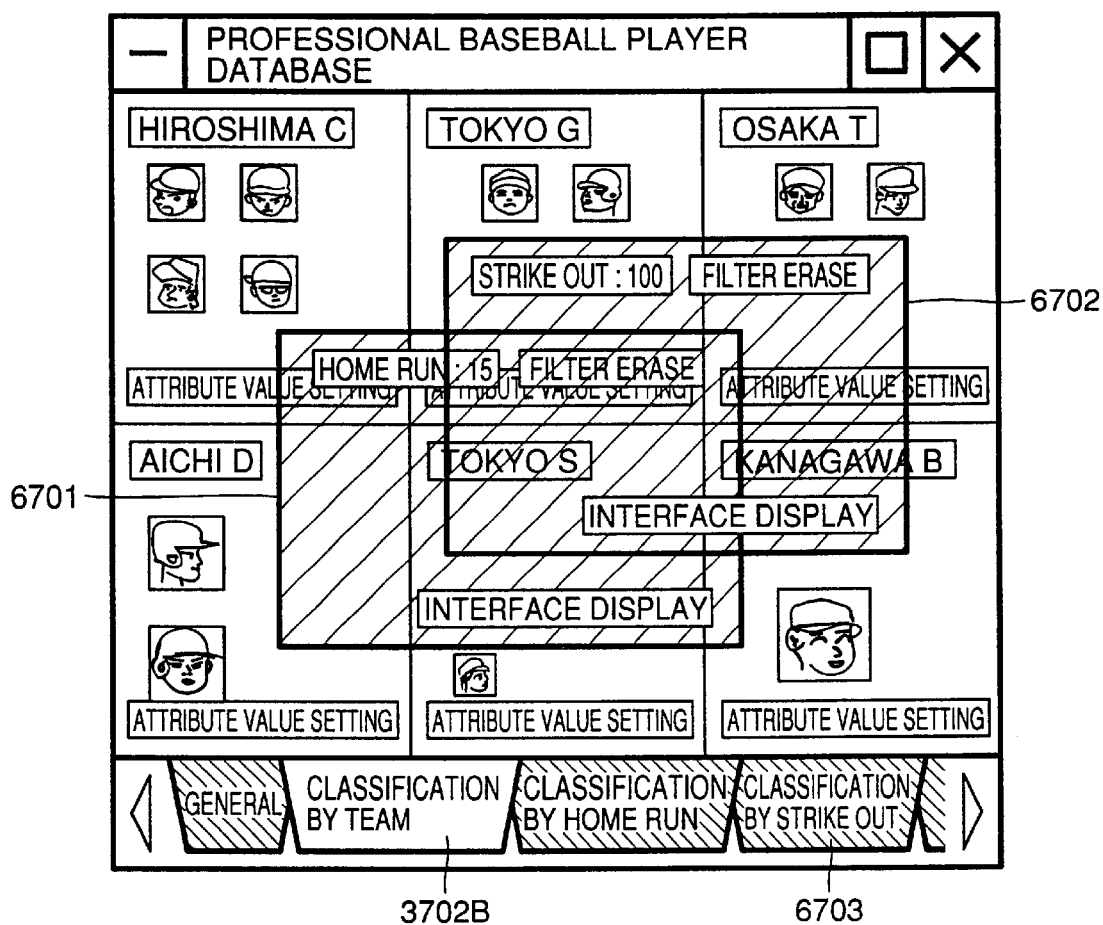
FIG. 67 shows a screen display providing classification of data using the attribute value for the attribute of "team" with two filters generated and overlapped in a data management application.

FIG. 67 shows the screen where the attribute of "strike out" taking the attribute value of an integer discrete value is newly added to each data and "classification by team" tab 3702B is selected after two filters 6701 and 6702 are generated using the method described with reference to FIGS. 54–57.

In adding the new attribute of "strike out", a "classification by strike out" tab 6703 is displayed since "classification by strike out" is set as the new group of classification. Filter 6701 has the attribute value of "15" associated to the attribute value of "home run". Filter 6702 has the attribute value of "100" associated to the attribute of "strike out".

It is assumed that "0–150" is set as the attribute value for the attribute of "strike out" for all the data.

FIG. 68 shows a data management table corresponding to the state of FIG. 67. The attribute of "strike out" is added to each data. Also, the attribute value of "0–150" is set for the attribute of "strike out" of each data.

Since there is no data in the database that has an attribute value matching the attribute values associated with filters 6701 and 6702 in the display state of FIG. 67, no icon is displayed in the section that overlaps with the filters.

Figure 69:
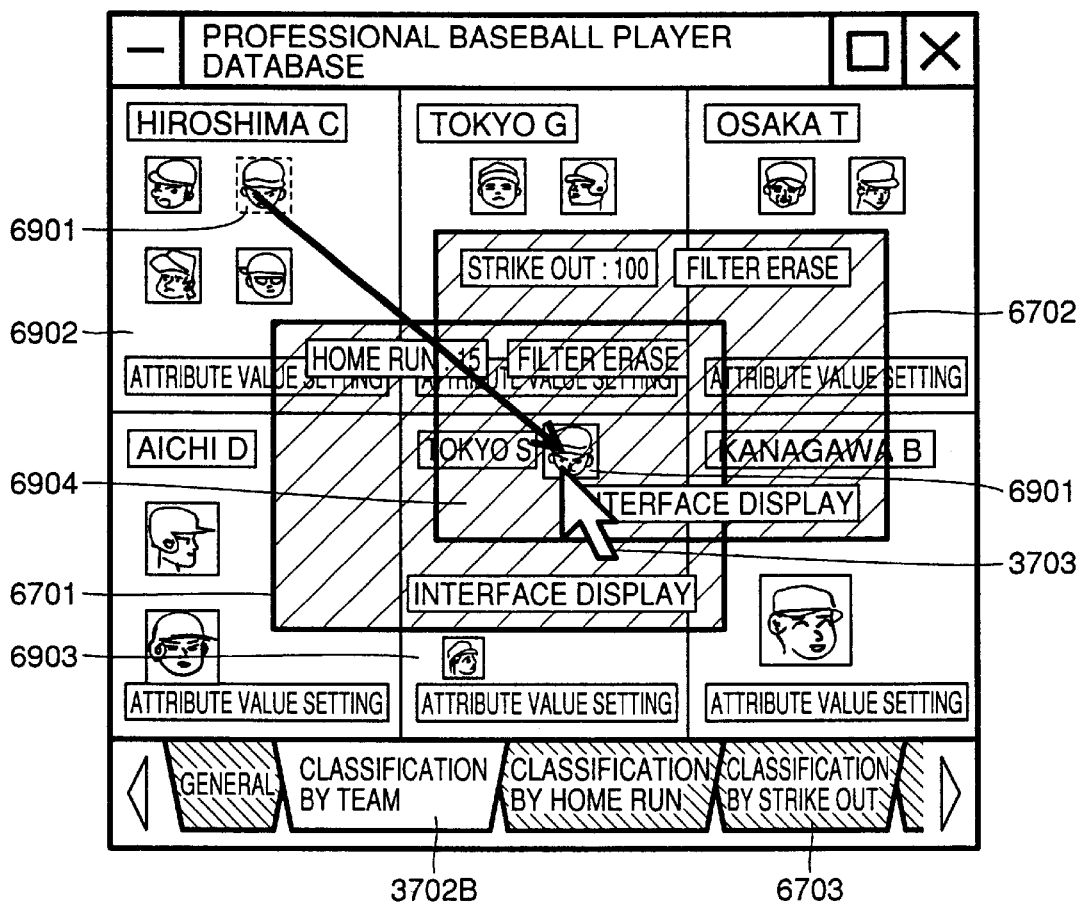
FIG. 69 shows a screen display for modifying the attribute value for a plurality of attributes at one time by moving data between tile regions and also from the outside of a filter to the inside by a drag-and-drop operation.

FIG. 69 shows the screen where icon 6901 is moved from the section in tile region 6902 not overlapping with a filter in FIG. 67 to a region 6904 in tile region 6903 where two filters overlap using the drag-and-drop operation.

By this operation, the attributes of "home run" and "strike out" of the data represented by icon 6901 are assigned the attribute values of "15" and "100" by filters 6701 and 6702. Also, the attribute value for the attribute of "team" is modified from "Hiroshima C" to "Tokyo 8" by the shift between the tile regions.

FIG. 70 shows a data management table corresponding to the state of FIG. 69. The attribute values for the attributes of "team", "home run" and "strike out" of the data corresponding to data ID 102 are respectively modified from "Hiroshima C", "21–30" and "0–150" in FIG. 68 to "Tokyo 5", "15" and "100", respectively, in FIG. 70.

Figure 71:
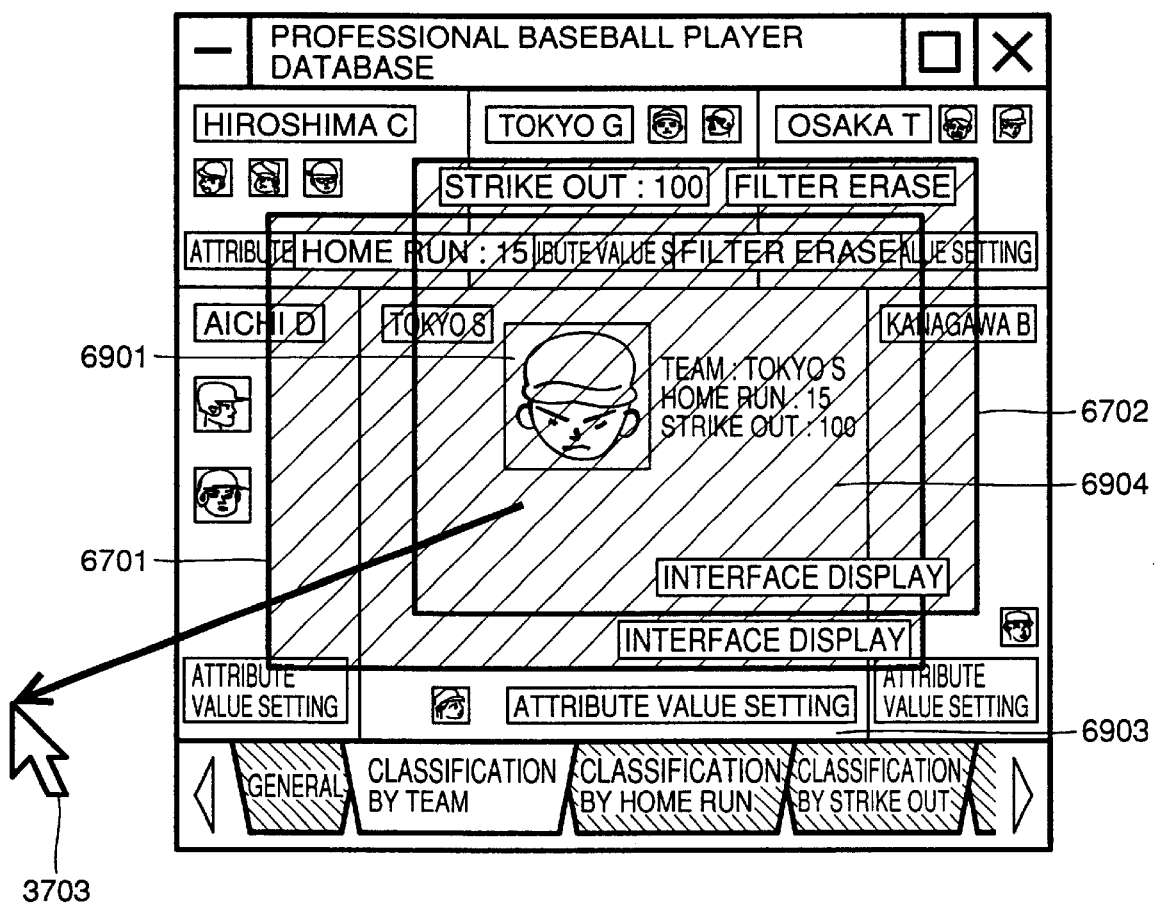
FIG. 71 shows a screen display for displaying the details of data located in a certain region by enlargement in a data management application.

FIG. 71 shows the display of an enlarged region 6904 where two filters 6701 and 6702 overlap on region 6903 as shown in FIG. 69 by depressing mouse pointer 3703 at a section where no icon is displayed and dragging the mouse pointer 3703.

Here, the attribute and attribute value of the data represented by icon 6901 located in enlarged region 6904 are displayed according to the area of the region and the number of icons displayed therein.

By the above operation, an attribute having a series of values as an attribute value can be added for each data. Addition and modification of an attribute value with respect to a newly added attribute can be carried out by a drag-and-drop operation between tile regions or a drag-and-drop operation from a tile region to a filter.

[Data addition]

The method of newly adding data to the database will be described with reference to FIGS. 72–74.

Figure 72:
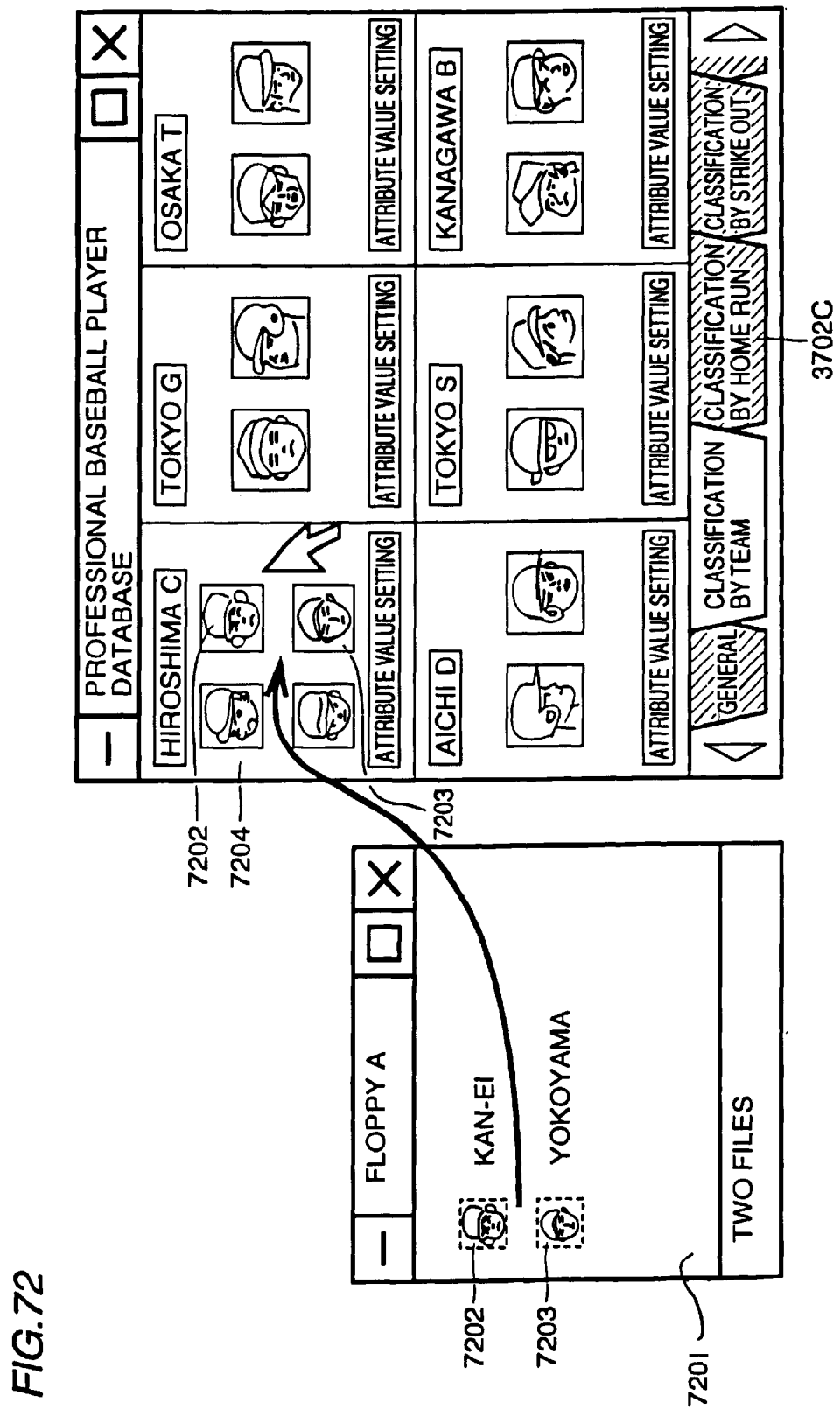
FIG. 72 shows a screen display for adding new data to the database in a data management application.

FIG. 72 shows the screen to add two data represented by icons 7202 and 7203 displayed in a window 7201 for data stored in a floppy disc as data constituting a professional baseball player database. The data to be added is not necessarily provided from a floppy disc.

In the screen of FIG. 72, icons 7202 and 7203 are shifted to a tile region 7204 including the attribute value of "Hiroshima C" for the attribute of "team" by the drag-and-drop method. By this operation, the attribute value for the attribute of "team" with respect to the data represented by icons 7202 and 7203 is applied as "Hiroshima C". The attribute value besides "Hiroshima C" is not yet specified.

FIG. 73 shows a data management table of FIG. 72. Data represented by data ID 113 and data ID 114 are added, and the attribute value of "Hiroshima C" is added for the attribute of "team". The attribute value for any other attribute is not yet specified.

Figure 74:
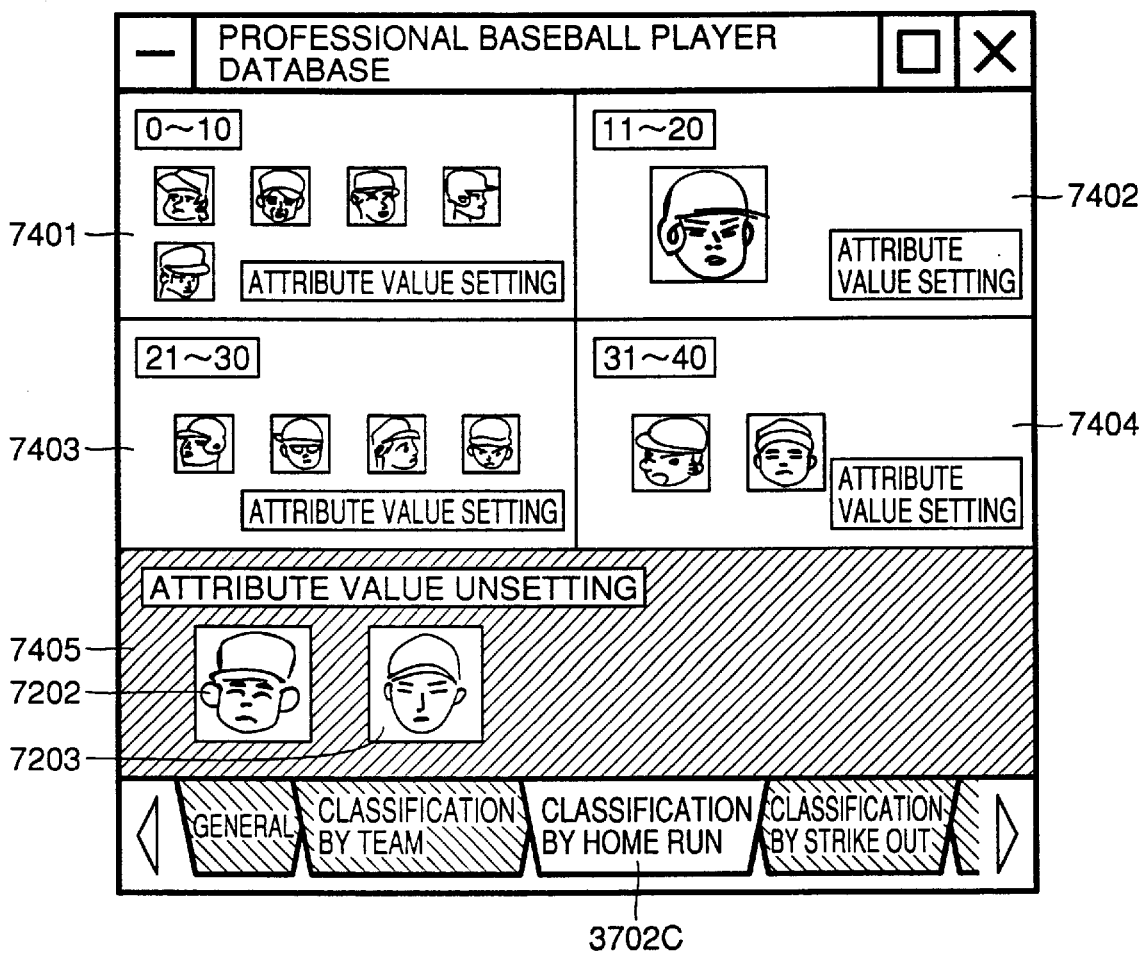
FIG. 74 shows a screen display for automatically generating a tile region to collect and display data that has an unassigned attribute value for a certain attribute in a data management application.

FIG. 74 shows the screen when "classification by home run" tab 3702C of FIG. 72 is selected. Since the data corresponding to icons 7202 and 7203 do not have the attribute value for the attribute of "home run" specified, they cannot be displayed in any of tile regions 7401, 7402, 7403 and 7404. In the case of such data, a tile region 7405 is automatically generated in which data with an unset attribute value is displayed.

The data displayed in tile region 7405 can have the attribute value for the attribute of "home run" set by the drag-and-drop operation between tile regions or towards a filter. When there is no more data displayed in tile region 7405, tile region 7405 will be automatically deleted.

By the above operation, new data can be added to each data item controlled in the database.

[Data retrieval and one time modification of attribute value of a plurality of data]

The method of retrieving data using a filter and modifying the attribute value of data obtained as a result of retrieval at one time will be described with reference to FIGS. 75–77. In the drawings, elements other than the filter are illustrated in a simplified manner.

Figure 75:
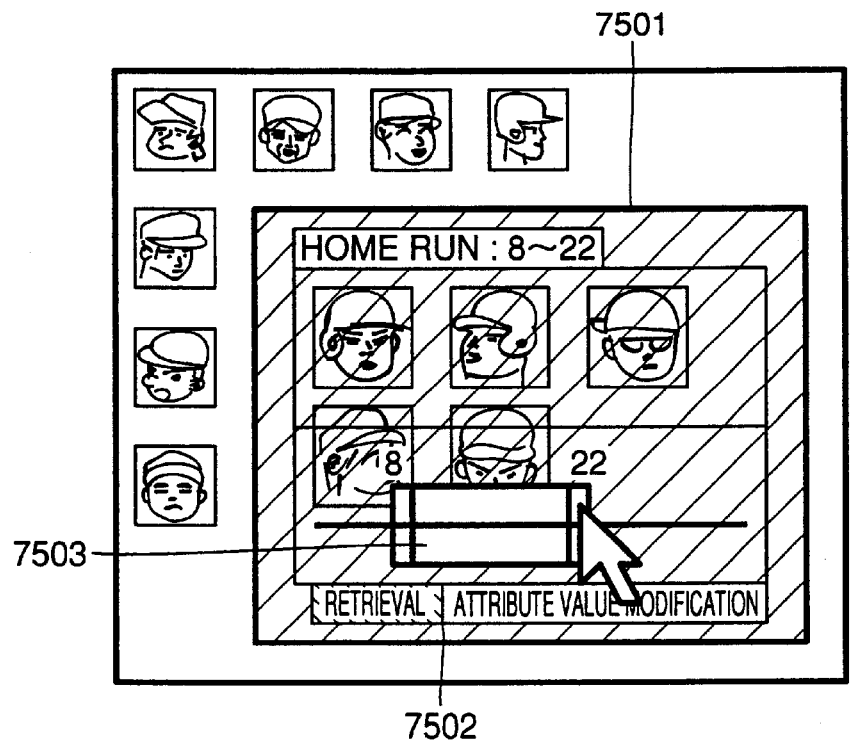
FIG. 75 shows a screen display for carrying out data retrieval using a filter in a data management application.

In filter 7501 displayed on the screen of FIG. 75, the attribute value range of "8–22" is set for the attribute of "home run". Data having an attribute value included in this range is displayed as the retrieval result in filter 7501.

Here, a radio button (a button that can select only either of the elements) 7502 with the label of "retrieval" and "attribute value modification" at the right lower corner of filter 7501 is displayed. Here, "retrieval" is selected.

Figure 76:
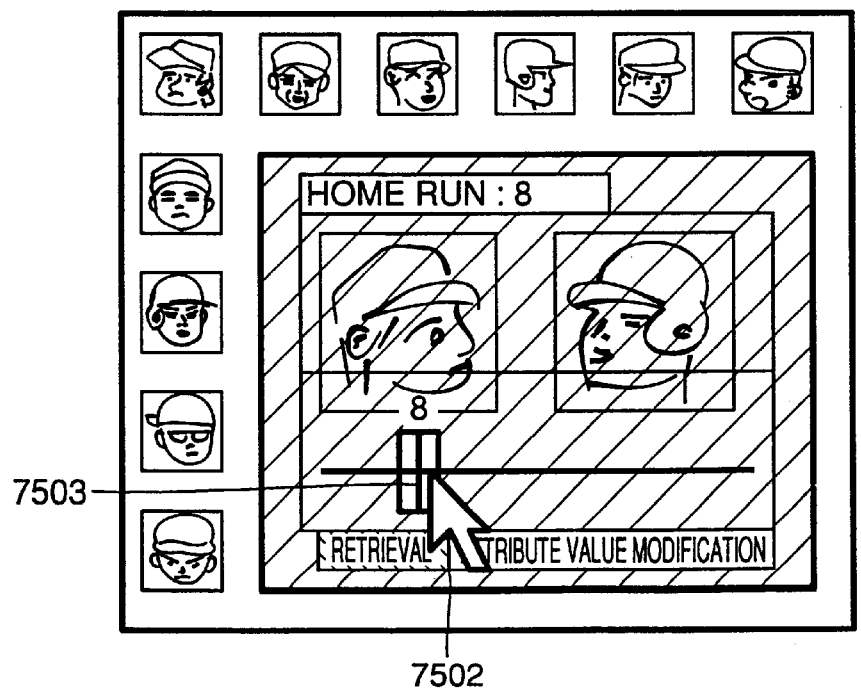
FIG. 76 shows a screen display for modifying a retrieval condition dynamically by an interface displayed on a filter in a data management application.

FIG. 76 shows the screen where the upper limit of slider 7503 is modified to "8" under the condition where "retrieval" of radio button 7502 in FIG. 75 is selected.

In this case, data having an attribute value of "8" for the attribute of "home run" is displayed within filter 7501.

Figure 77:
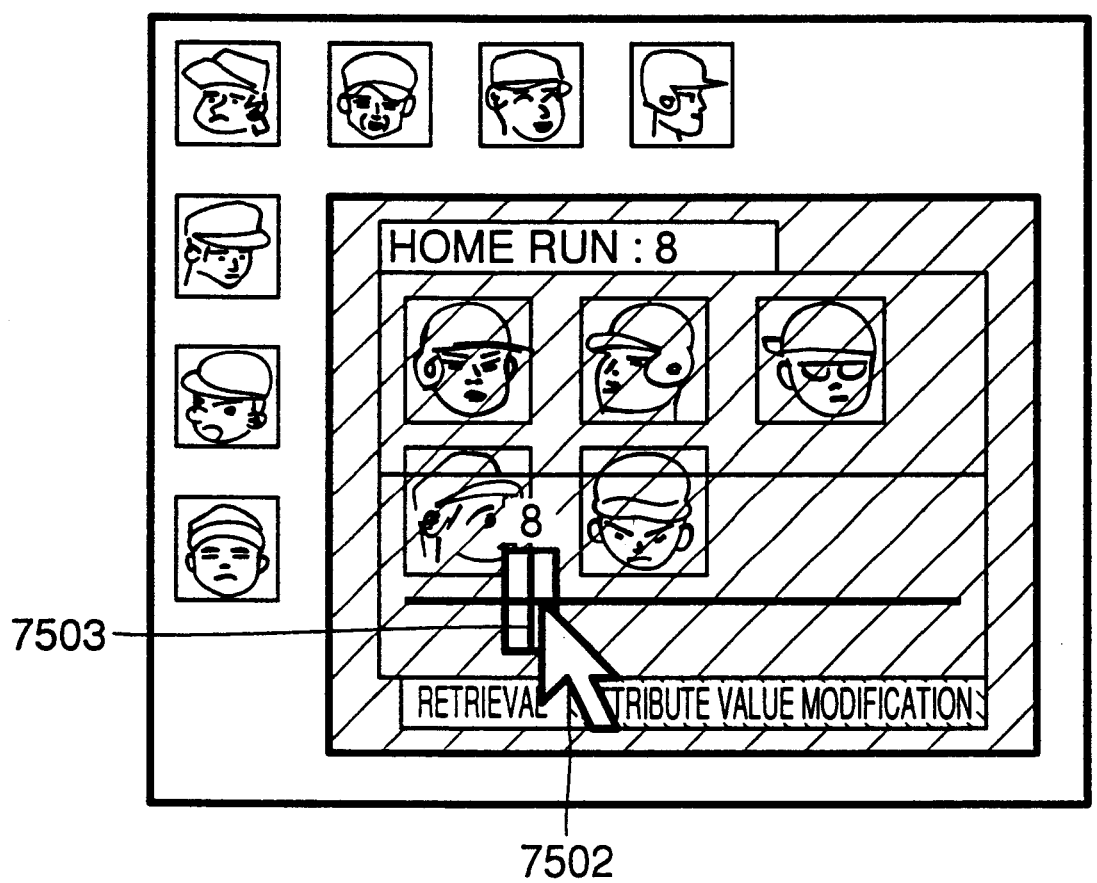
FIG. 77 shows a screen display for modifying attribute values of data displayed within a filter at one time in a data management application.

FIG. 77 shows the screen where the "attribute value modification" setting of radio button 7502 as shown in FIG. 75 is selected and the upper limit value of slider 7503 is modified to "8".

In this case, all the attribute values for the attribute of "home run" in all the data displayed in filter 7501 are modified to "8".

More specifically, the attribute values of the data located in filter 7501 are modified at one time.

In contrast to the above case where the attribute value for the attribute of "home run" is modified, consider the case where the attribute value for the attribute of "number of games" is modified from "130" to "135" for only the players of the team of, for example, "Hiroshima C".

In this case, data having an attribute value of "Hiroshima C" for the attribute of "team" is retrieved using a filter. Then, the filter is switched to the attribute value modification mode, and the attribute value for the attribute of "number of games" is set from "130" to "135". Thus, the operation of modifying the number of games for only the players of the team of "Hiroshima C" is implemented easily.

[Process carried out by data management apparatus]

FIGS. 78–81 are flow charts showing the procedure of the data management method according to the present invention. Each process will be described with respect to the flow charts.

Figure 78:
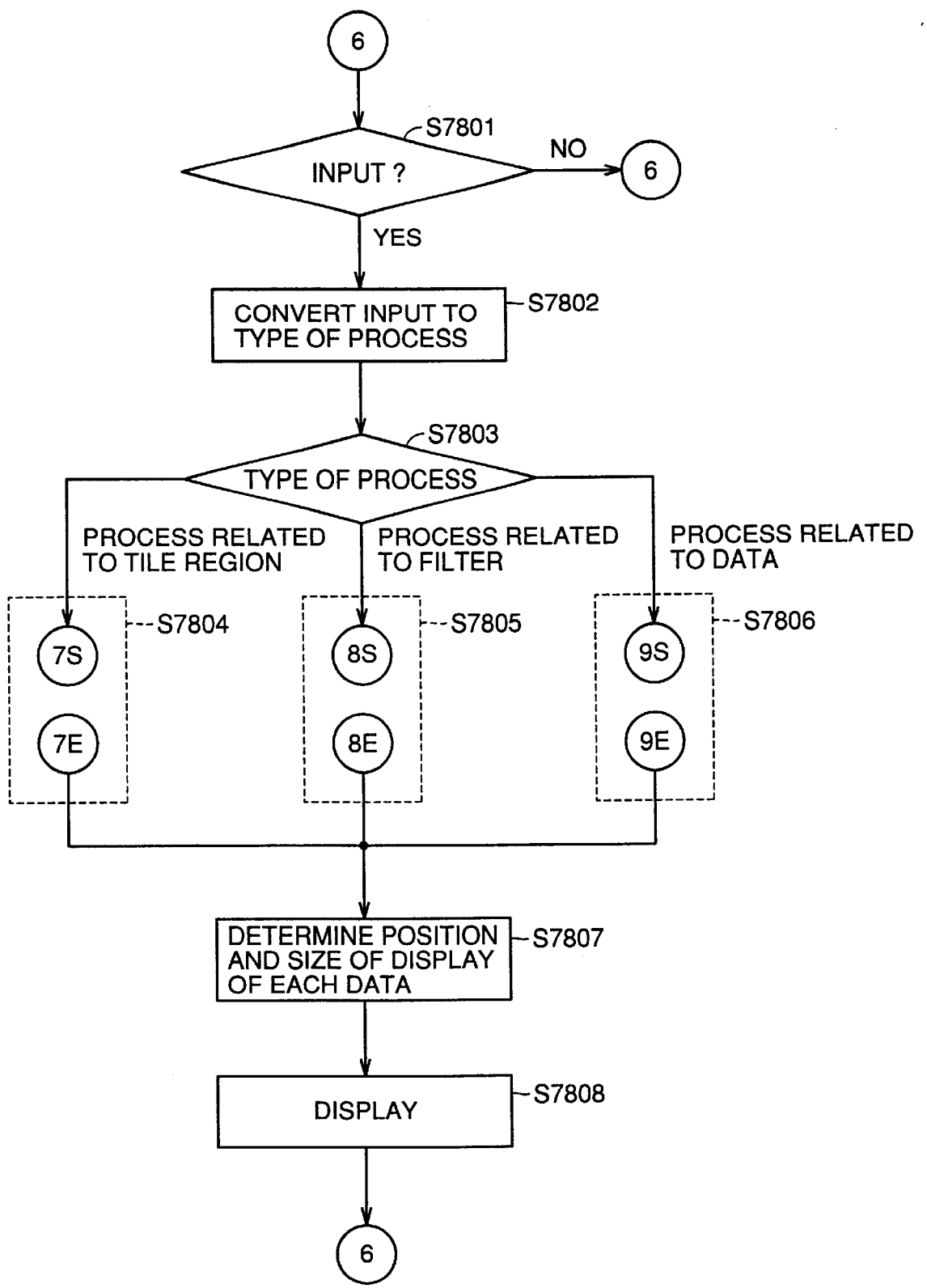
FIG. 78 is a flow chart showing a method of data management according to a second embodiment of the present invention.

Referring to FIG. 78, input processing unit 3627 determines whether an instruction has been input by a user through input device 3603 (87801). When there is no input of an instruction from a user (87801: NO), the process of 87801 is repeated.

When an instruction has been input by a user (S7801: YES) the meaning of the input instruction is interpreted (87802). For example, if the user is dragging one end of a filter displayed on display device 3602, the interpretation is made that an instruction of deforming a filter is input. Then, a corresponding process is executed.

Upon interpreting the instruction, branching is effected according to the type of the process (87803). When the type of the process responds to "process associated with tile region", the process of 87804 is executed. When the type of the process corresponds to "process associated with filter", the process of 87805 is executed. When the type of the process corresponds to "process associated with data", the process of S7806 is executed. The processes of S7804–S 7806 will be described below.

Following the completion of respective processes of 87804–87806, determination is made of where and of what size each icon corresponding to each data is to be provided on the screen (87807). This is carried out by comparing the attribute value of each data and the attribute value associated with each tile region and each filter.

The user interface, each tile region, and each filter are displayed on display device 3602. Each data is displayed at the position and with a size determined at 87807 (S7808). Then, control returns to the process of 87801 to wait for an input by the user.

Figure 79:
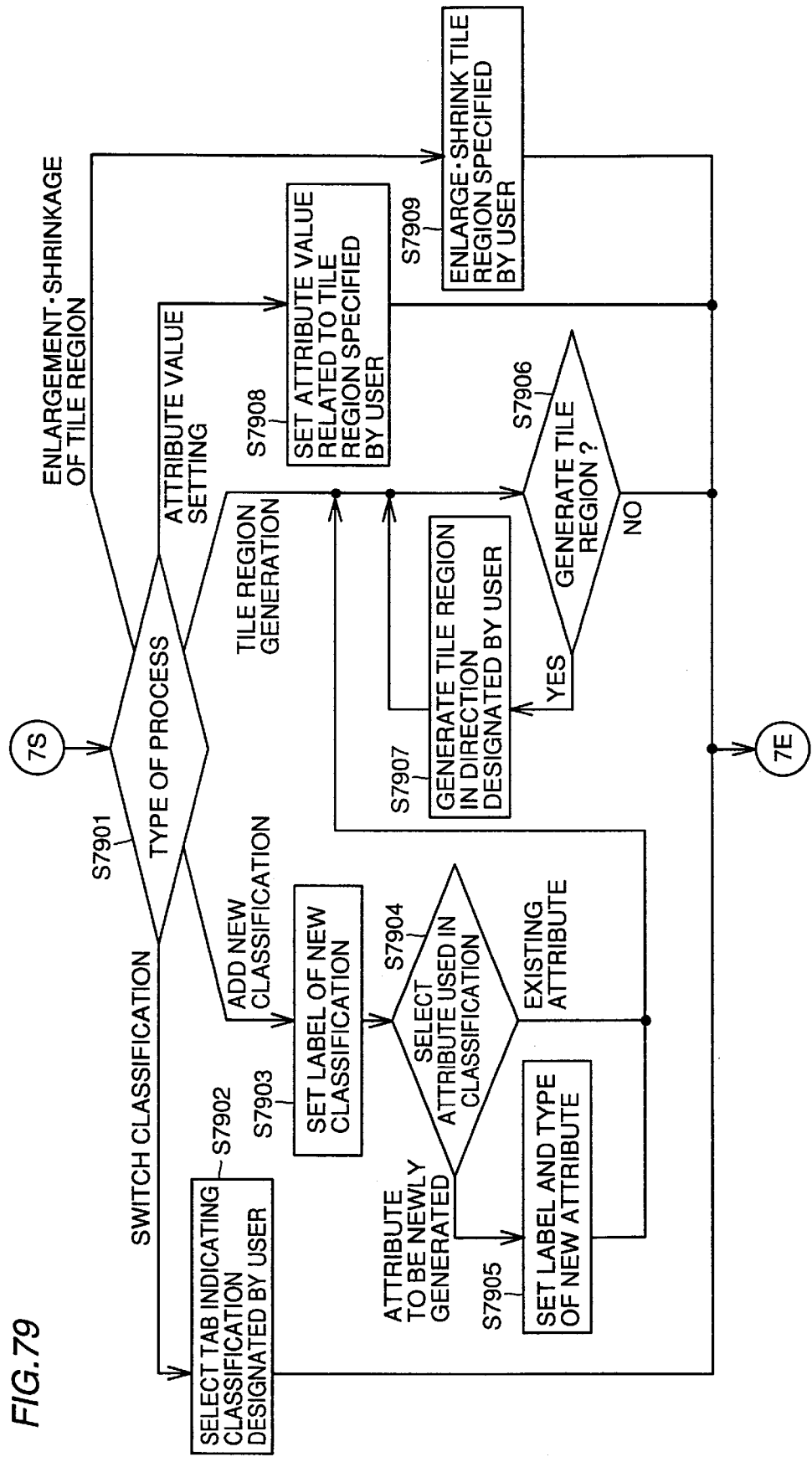
FIG. 79 is a flow chart showing a process related to a tile region.

The process of 87804 (FIG. 78) will be described with reference to FIG. 79. 87804 corresponds to the process associated with the tile region.

Branching is effected according to the type of the process associated with the tile region (S790 1). When the type of the process is "classification switching", "addition of new classification", "generation of tile region", "setting of attribute value" and "enlargement shrinkage of tile region", control proceeds to 87902, S7903, 87906, 87908, and S7909, respectively.

At S 7902, the tab indicating the classification specified by the user is selected. Upon completion of this process, control proceeds to the process of S7807 (FIG. 78).

At 87903, the label of the classification to be newly added is set. Then, branching is effected in response to the user selecting the attribute used in classification (87904). When classification is to be carried out using a newly generated attribute, the label and type of the new attribute are set (87905). Upon completion of the process of 87905, or when classification is to be carried out using an existing attribute, control proceeds to the process of 87906.

At 87906, determination is made whether a tile region is to be generated or not. When determination is made of generation of a tile region (87906: YES), a tile region is generated in the direction specified by the user (87907). Then, the process of 87906 is carried out. When determination is made that a tile region is not generated (87906: NO), the process of 87807 (FIG. 78) is carried out.

At 87908, an attribute value associated with the newly generated tile region is set. Then, control proceeds to 87807 (FIG. 78).

At 87909, the process of enlarging shrinking the specified tile region is carried out. Then, control proceeds to 87807 (FIG. 78).

Figure 80:
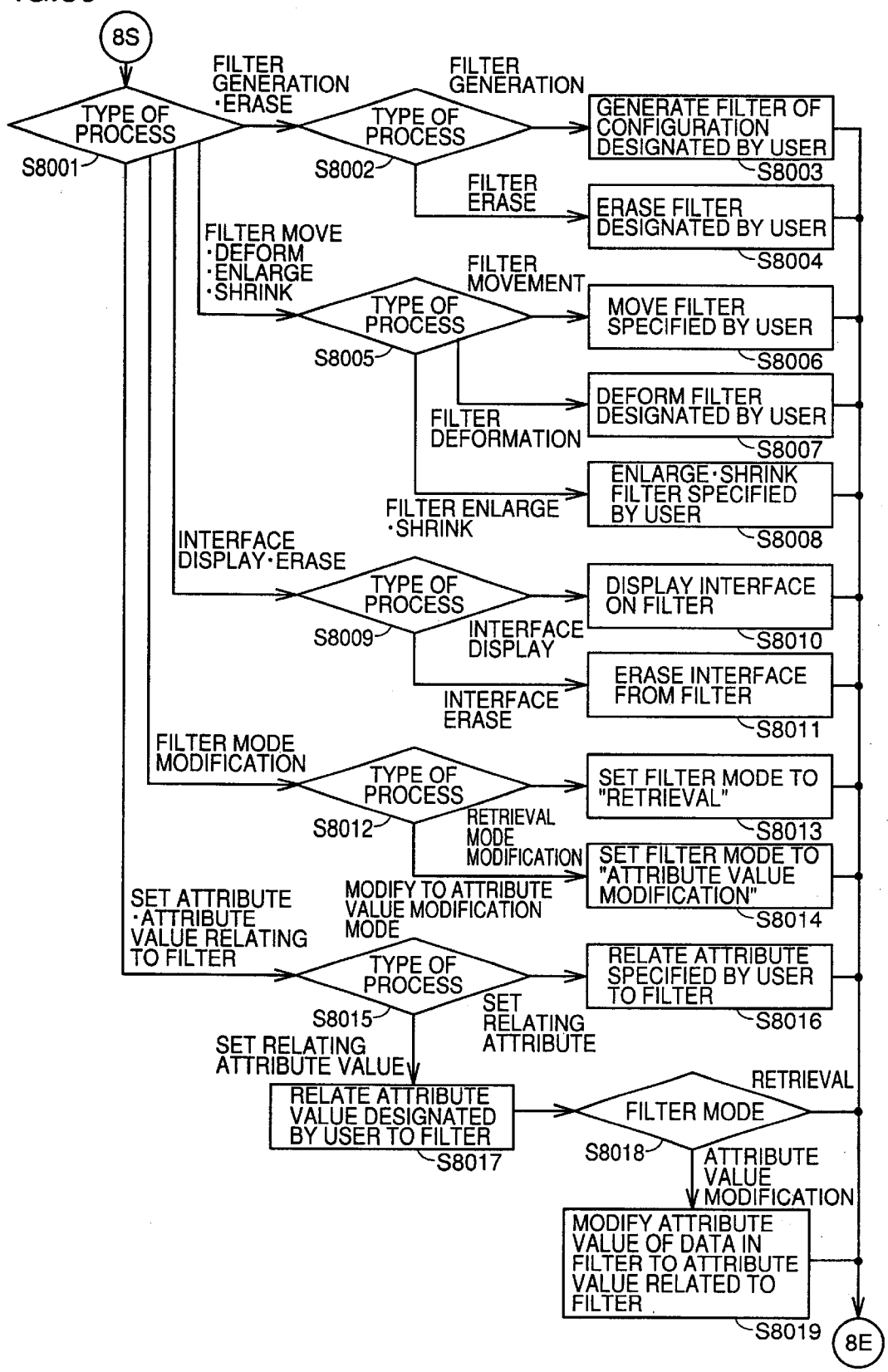
FIG. 80 is a flow chart showing a process related to a filter.

The process of 87805 (FIG. 78) will be described with reference to FIG. 80. 87805 corresponds to the process associated with a filter.

Branching is effected according to the type of the filter associated with the filter (88001). Control proceeds to 88002, 88005, 88009, 88012, and 88015 when the type of the process is "filter addition delete", "filter move deform enlarge/shrink", "interface display erase", "filter mode modification" and "setting of attribute value associated with filter", respectively.

At 88002, branching is carried out depending upon whether a filter is to be generated or deleted. When a filter is to be generated, a filter of a configuration designated by the user is generated (88003). When a filter is to be deleted, the filter designated by the user is deleted (88004). When the process of either 88003 or 88004 is completed, control proceeds to the process of S 7807 (FIG. 78).

At S8005, branching is effected depending upon whether a filter is to be moved, deformed, or enlarged/shrunk. When the filter is to be moved, the move process of the filter designated by the user is carried out (S8006). When the filter is to be deformed, the deformation process of the filter designated by the user is carried out (S8007). When the filter is to be enlarged/shrunk, the enlargement/shrinkage process of the filter designated by the user is carried out (S8008). When the process of any one of S8006–S8008 is completed, control proceeds to be process of S7807 (FIG. 78).

At S8009, branching is effected depending upon whether an interface is to be displayed or erased. When an interface is to be displayed, a relevant interface is displayed on a filter (S8010). When an interface is to be erased, a relevant interface on the filter is deleted (S8011). When any of the processes of S8010–S8011 is completed, control proceeds to the process of S7807 (FIG. 78).

At 88012, branching is effected depending upon whether the mode of the filter is to be altered to the retrieval mode or to the attribute value modification mode. When the mode is to be switched to the retrieval mode, the mode of the filter is set to "retrieval" (88013). When the mode is to be altered to the attribute value modification mode, the mode of the filter is set to "attribute value modification" (88014). When any of the processes of 88013–88014 is completed, control proceeds to the process of 87807 (FIG. 78).

At 88015, branching is carried out depending upon whether specification of an attribute or an attribute value associated with the filter is to be carried out. When an attribute is to be specified, an attribute designated by the user is associated with the filter (88016). When an attribute value is to be set, the attribute value designated by the user is associated with the filter (88017). Then, the mode of the filter is determined (88018). When the filter mode is "attribute value modification", the attribute value of the data located in the filter is modified to the attribute value associated with the filter (88019). When the process of 88016 or 88019 is completed, or when determination is made that the filter mode is "retrieval" in the process of 88018, control proceeds to the process of 87807 (FIG. 78).

Figure 81:
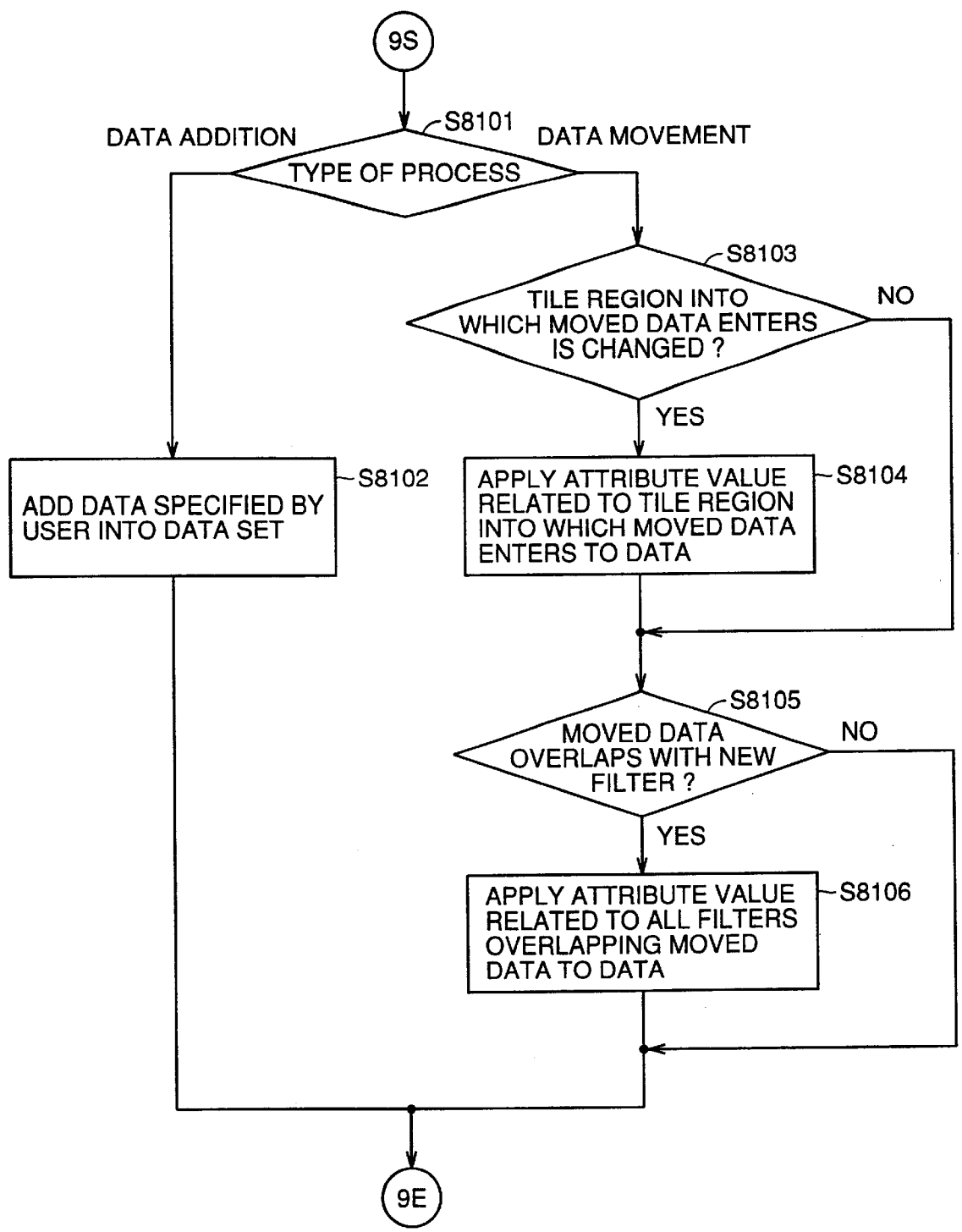
FIG. 81 is a flow chart showing a process related to data.

The process of 87806 (FIG. 78) will be described with reference to FIG. 81. 87806 corresponds to the process related to data.

Branching is effected depending upon the type of the process for the data (88101). Control proceeds to 88102 when the type of process is "data addition" and to 88103 when the type of the process is "data move At 88102, the data set by the user is added into the data set. Then, control proceeds to the process of 87807 (FIG. 78).

At 88103, branching is effected depending upon whether the tile region in which the moved data is to enter is modified or not. When the tile region is modified (88103: YES), the attribute value associated with the tile region into which the moved data enters is applied to the data (88104).

Following the process of 88104, or when the tile region does not change (88103: NO), branching is effected depending upon whether the moved data newly overlaps with the filter (88105). When the moved data overlaps with the filter (88105: YES), the attribute value associated with all the newly overlapped filters is applied to the data (88106). Upon completion of the process of 88106, or in this case where the moved data does not newly overlap the filter (88105: NO), control proceeds to the process of 87807 (FIG. 78).

According to the data management apparatus of the present embodiment described above, retrieval of the data in a database and management of an attribute and an attribute value for each data are combined using the same interface to allow data management with simple operations.

An unlimited number of new attributes can be added to each data item in a database with simple operations.

In modifying an attribute value of the data in a database, the attribute value for an unlimited number of attributes can be added or modified at one time with a simple operation.

When a new attribute is added for the data in a database, data retrieval according to an attribute value for the added attribute can be carried out by using a filter from the time point the new attribute is added.

Also, data that does not have an attribute value assigned for a certain attribute out of the data in the database of FIG. 74 can easily be recognized visually.

By carrying out data retrieval on the basis of an attribute value for an attribute of the data in a database and modification of an attribute value possessed by a plurality of data obtained as a result of retrieval using the same interface (filter), data retrieval and modification of an attribute value of data can be carried out by a simple operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data management method in a data management apparatus including storage means for storing a plurality of data of interest, and an attribute value respectively assigned to said plurality of data as to an arbitrary number of attributes, a display device, operation designation input means for receiving operation designation from a user through an operation by the user with respect to an object displayed on said display device, and data operation means for carrying out an operation on said plurality of data according to operation designation obtained by said operation designation input means, said data management method comprising the steps of:

displaying a plurality of icons representing said plurality of data respectively inside a certain region in a display screen of said display device;

having a new attribute defined by a user using said operation designation input means;

adding a new region differing from said certain region into the display screen of said display device using said operation designation input means to generate a plurality of regions;

having an attribute value defined to each of said plurality of regions by a user using said operation designation input means;

detecting movement of any of said plurality of icons between said plurality of regions by said operation designation input means;

determining which of said regions said moved icon is shifted to; and modifying the attribute value of the data corresponding to the moved icon to an attribute value defined to the region in which the moved icon is located; generating another new region when there is data that does not have an attribute value for a certain attribute; and displaying an icon representing said data that does not have an attribute value for a certain attribute within said new region.

2. A data management method in a data management apparatus including storage means for storing a plurality of data of interest, and an attribute value assigned respectively to said plurality of data as to an arbitrary number of attributes, a display device, operation designation input means for receiving operation designation from a user through an operation by the user for an object displayed on said display device, and data operation means for carrying out an operation on said plurality of data according to operation designation obtained by said operation designation input means, said data management method comprising the steps of:

preparing in said storage means a plurality of data to which an attribute values is respectively assigned as to first and second attributes;

prescribing a plurality of regions not overlapping each other on the display screen of said display device, prepared for every attribute value defined as to said first attribute;

prescribing a display position of a plurality of icons representing respective data having an attribute value corresponding to each said region with respect to said first attribute to display said plurality of icons within each said region;

displaying said plurality of regions and said plurality of icons at a prescribed display position within the display screen of said display device;

defining a first filter related to a desired attribute value with respect to said second attribute on said display screen using said operation designation input means;

classifying said displayed icon in said region partially overlapping with said first filter according to whether an assigned attribute value as to said second attribute for the data represented by said icon has a predetermined relationship with the attribute value to which said first filter is related, and moving said icon inside and outside said first filter;

generating a new region when there is data that does not have an attribute value for a certain attribute; and displaying an icon representing said data that does not have an attribute value for a certain attribute within in said new region.

3. The data management method according to claim 2, further comprising the steps of:

having an attribute value related to said first filter input by an user using said operation designation input means; and when an instruction of modifying an attribute value of data corresponding to an icon displayed within said first filter into an attribute value of said first filter is input by a user using said operation designation input means, modifying an attribute value of the data corresponding to the icon displayed in said first filter into an attribute value of said first filter.

4. The data management method according to claim 2, further comprising the step of, when an overlapping section of said region and said filter is selected by said operation designation input means and an enlarged display of said overlapping section is requested, displaying said overlapping section and the icon displayed in said overlapping section in an enlarged manner, and displaying an attribute and an attribute value of the data represented by said icon.

5. The data management method according to claim 2, further comprising the step of, when an overlapping section of said region and said filter is selected by said operation designation input means and another display of said overlapping section is requested, displaying the icon located in said overlapping section and the attribute and attribute value of data corresponding to said icon in respective different regions.

6. The data management method according to claim 2, further comprising the step of detecting movement of one of said plurality of icons to a section in said first filter and overlapping with one of said plurality of regions to modify an attribute value of said second attribute and an attribute value of said first attribute with respect to the data represented by said moved icon to an attribute value related to said first filter and to an attribute value related to the region in which said moved icon is newly located, respectively.

7. The data management method according to claim 2, further comprising the steps of:
assigning an attribute value as to a third attribute to said plurality of data;
defining a second filter associated with a desired attribute value with respect to said third attribute on said display screen using said operation designation input means; and
classifying said displayed icon depending upon whether the assigned attribute value as to said second and third attributes for the data represented by said icon has a predetermined relationship with the attribute value related to said first and second filters, respectively, and moving said icon to any of a region inside both said first and second filters, a region inside either said first or second filter, or region in neither said first nor second filter for display.

8. The data management method according to claim 7, further comprising the step of detecting movement of one of said plurality of icons to a section in a region inside both said first and second filters and overlapping one of said plurality of regions, and modifying an attribute value of said third attribute, an attribute value of said second attribute, and an attribute value of said first attribute with respect to data represented by said moved icon to an attribute value related to said second filter, an attribute value associated with said first filter, and an attribute value associated with the region in which said moved icon is newly located, respectively.

9. The data management method according to claim 7, further comprising the step of, when there is no region where said first and second filters overlap each other, and when a same icon is displayed in a region inside said fist filter and a region inside said second filter, displaying said same icon in an emphasized manner.

10. The data management method according to claim 7, further comprising the step of, when there is no region where said first and second filters overlap each other, and when a same icon is displayed in a region inside said first filter and a region inside said second filter, deforming said first and second filters respectively so as to produce a region where said first and second filters overlap each other, and moving said same icon to a region inside both said first and second filters for display.

11. The data management method according to claim 5, wherein said first and second filters are displayed in different colors, and a region inside both said first and second filters is displayed in a color differing from the colors of said first and second filters.

12. The data management method according to claim 5, wherein said first filter, said second filter, and a region inside both said first and second filters respectively have a height, and are displayed in a three dimensional manner.

13. A data management method in a data management apparatus including storage means for storing a plurality of data of interest, and an attribute value assigned respectively to said plurality of data as to an arbitrary number of attributes,
a display device,
operation designation input means for receiving operation designation from a user through an operation by the user for an object displayed on said display device, and
data operation means for carrying out an operation on said plurality of data according to operation designation obtained by said operation designation input means, said data management method comprising the steps of:
preparing in said storage means a plurality of data to which an attribute value is respectively assigned as to first and second attributes;
prescribing a plurality of regions not overlapping each other on the display screen of said display device, prepared for every attribute value defined as to said first attribute;
prescribing a display position of a plurality of icons representing respective data having an attribute value corresponding to each said region with respect to said first attribute to display said plurality of icons within each said region;
displaying said plurality of regions and said plurality of icons at a prescribed display position within the display screen of said display device;
defining a first filter related to a desired attribute value with respect to said second attribute on said display screen using said operation designation input means, and
detecting movement of one of said plurality of icons to a section in said first filter and overlapping with one of said plurality of regions, and modifying an attribute value of said second attribute and an attribute value of said first attribute of the data represented by said moved icon into an attribute value related to said first filter and an attribute value related to the region in which said moved icon is newly located, respectively;
generating a new region when there is data that does not have an attribute value for a certain attribute; and
displaying an icon representing said data that does not have an attribute value for a certain attribute within in said new region.

14. The data management method according to claim 13, further comprising the steps of:
assigning an attribute value as to a third attribute to said plurality of data;
defining a second filter associated with a desired attribute value of said third attribute on said display screen using said operation designation input means; and
detecting movement of one of said plurality of icons to a section inside both said first and second filters and overlapping one of said plurality of regions, and modifying an attribute value of said third attribute, an attribute value of said second attribute, and an attribute value of said first attribute with respect to data represented by said moved icon into an attribute value related to said second filter, an attribute value related to said first filter and an attribute value related to the region in which said moved icon is newly located, respectively.

15. A data management apparatus comprising:
storage means for storing a plurality of data, each data including a plurality of attributes and a plurality of attribute values associated with said plurality of attributes, respectively;
a display device;
means for providing control to display regions not overlapping each other and provided for every attribute value of a certain attribute on said display device, and to display a plurality of icons representing said plurality of data respectively on said region;
means for providing control to detect movement of said icon between said regions, and to modify an attribute value of data represented by said moved icon to an attribute value defined to the region in which said moved icon is newly located;
generating a new region when there is data that does not have an attribute value for a certain attribute; and
displaying an icon representing said data that does not have an attribute value for a certain attribute within in said new region.

16. The data management apparatus according to claim 15, further comprising:
means for defining a filter associated with a desired attribute and a attribute value for display on said display device; and
classifying said displayed icon inside said region partially overlapping said filter according to whether an assigned attribute as to an attribute associated with said filter with respect to data represented by said icon has a predetermined relationship with an attribute value related to said filter, and moving said icon inside and outside said filter for display.

17. The data management apparatus according to claim 16, further comprising means for detecting movement of one of said plurality of icons to a section in said filter and overlapping one of said plurality of regions, and modifying an attribute value of an attribute related to said filter with respect to data represented by said moved icon to an attribute value related to said filter.

18. A computer-readable recording medium in which is recorded a data management program for executing with a computer a data management method of displaying a plurality of icons corresponding to a plurality of data in a region provided for every attribute value of a certain attribute, not overlapping each other, each data including a plurality of attributes and a plurality of attribute values respectively associated with said plurality of attributes, said data management method comprising the steps of:
displaying said plurality of icons representing said plurality of data respectively within a certain region;
having a new attribute defined by an user;
adding a new region differing from said certain region to generate a plurality of regions;
having an attribute value defined for each of said plurality of regions by a user;
detecting movement of any of said plurality of icons between said plurality of regions;
determining which of the regions the moved icon is shifted to; and modifying an attribute value of data corresponding to said moved icon into an attribute value defined to the region in which said moved icon is newly located;
generating another new region when there is data that does not have an attribute value for a certain attribute; and
displaying an icon representing said data that does not have an attribute value for a certain attribute within in said new region.

19. A computer-readable recording medium in which is recorded a data management program for executing with a computer a data management method to display a plurality of icons corresponding to a plurality of data in a region provided for every attribute value of a certain attribute and not overlapping each other, each data including a plurality of attributes and a plurality of attribute values related to said plurality of attributes, said data management method comprising the steps of:
preparing said plurality of data to which an attribute value is assigned as to first and second attributes;
prescribing a plurality of regions not overlapping each other, prepared for every attribute value defined as to said first attribute;
prescribing a display position of said plurality of icons representing respective data having an attribute value corresponding to each said region with respect to said first attribute to display said plurality of icons in each said region;
displaying said plurality of regions and said plurality of icons at respective prescribed display positions;
defining a first filter associated with a desired attribute value of said second attribute on said plurality of regions;
classifying said displayed icon in said region partially overlapping with said first filter according to whether an assigned attribute value as to said second attribute for the data represented by said icon has a predetermined relationship with an attribute value related to said first filter, and shifting said icon inside and outside said first filter for display;
generating a new region when there is data that does not have an attribute value for a certain attribute; and
displaying an icon representing said data that does not have an attribute value for a certain attribute within in said new region.

20. The computer-readable recording medium in which a data management program is recorded according to claim 19, said data management method further comprising the steps of:
having an attribute value related to said first filter input by a user; and
when an instruction of modifying an attribute value of data corresponding to an icon displayed within said first filter into an attribute value of said first filter is input by a user, modifying an attribute value of the data corresponding to the icon displayed within said first filter into an attribute value of said first filter.

21. The computer-readable recording medium in which a data management program is recorded according to claim 19, said data management method further comprising the step of, when an overlapping section of said region and said filter is selected and an enlarged display of said overlapping section is requested, displaying said overlapping section and the icon displayed within said overlapping section in an enlarged manner, and displaying an attribute and an attribute value of the data represented by said icon.

22. The computer-readable recording medium in which a data management program is recorded according to claim 19, said data management method further comprising the step of, when an overlapping section of said region and said filter is selected and another display of said overlapping section is requested, displaying the icon located within said overlapping section and the attribute and attribute value of data corresponding to said icon in respective different regions.

23. The computer-readable recording medium in which a data management program is recorded according to claim 19, said data management method further comprising the step of detecting movement of one of said plurality of icons to a section in said first filter and overlapping one of said plurality of regions, and modifying an attribute value of said second attribute and an attribute value of said first attribute with respect to data represented by said moved icon into an attribute value related to said first filter and an attribute value related to the region in which said moved icon is newly located, respectively.

24. The computer-readable recording medium in which a data management program is recorded according to claim 19, said data management method further comprising the steps of:

assigning an attribute value as to a third attribute to said plurality of data;

defining a second filter associated with a desired attribute value of said third attribute on said plurality of regions; and classifying said displayed icon according to whether an assigned attribute value as to said second and third attributes for the data represented by said icon has a predetermined relationship with the attribute values associated with said first and second filters respectively, and moving said icon into any of a region inside both said first and second filters, a region inside either said first or second filter, and a region in neither the first nor second filter for display.

25. The computer-readable recording medium in which a data management program is recorded according to claim 24, said data management method further comprising the steps of:

detecting movement of one of said plurality of icons to a section inside both said first and second filters and overlapping one of said plurality of regions, and modifying an attribute value of said third attribute, an attribute value of said second attribute, and an attribute value of said first attribute with respect to the data represented by said moved icon into an attribute value related to said second filter, an attribute value related to said first filter, and an attribute value related to the region in which said moved icon is newly located, respectively.

26. The computer-readable recording medium in which a data management program is recorded according to claim 24, said data management method further comprising the steps of:

when there is no region where said first and second filters overlap each other, and when a same icon is displayed in a region inside said first filter and a region inside said second filter, displaying said same icon in an emphasized manner.

27. The computer-readable recording medium in which a data management program is recorded according to claim 24, said data management method further comprising the steps of:

when there is no region where said first and second filters overlap each other, and a same icon is displayed in a region inside said first filter and a region inside said second filter, deforming said first and second filters respectively so as to produce a region where said first and second filters overlap each other, and moving said same icon to a region inside both said first and second filters for display.

28. The computer-readable recording medium in which a data management program is recorded according to claim 24, wherein said first and second filter are displayed in different colors, and a region inside both said first and second filters is displayed in a color differing from the colors of said first and second filters.

29. The computer-readable recording medium in which a data management program is recorded according to claim 24, wherein said first filter, said second filter, and a region inside both said first and second filters respectively have a height, and are displayed in a three dimensional manner.

30. A computer-readable recording medium in which is recorded a data management program for executing with a computer a data management method to display a plurality of icons corresponding to a plurality of data in a region provided for every attribute value of a certain attribute, not overlapping each other, each data including a plurality of attributes and a plurality of attribute values related to said plurality of attributes, said data management method comprising the steps of:

preparing said plurality of data to which an attribute value is assigned as to first and second attributes;

prescribing a plurality of regions not overlapping each other, prepared for every attribute value defined as to said first attribute;

prescribing a display position of said plurality of icons representing respective data having an attribute value corresponding to each said region with respect to said first attribute to display said plurality of icons in each said region;

displaying said plurality of regions and said plurality of icons at respective prescribed display positions;

defining a first filter associated with a desired attribute value with respect to said second attribute on said plurality of regions, and detecting movement of one of said plurality of icons into a section in said first filter and overlapping one of said plurality of regions, and modifying an attribute value of said second attribute and an attribute value of said first attribute with respect to the data represented by said moved icon into an attribute value related to said first filter and an attribute value related to the region in which the moved icon is newly located, respectively;

generating a new region when there is data that does not have an attribute value for a certain attribute; and displaying an icon representing said data that does not have an attribute value for a certain attribute within in said new region.

31. The computer-readable recording medium in which a data management program is recorded according to claim 30, said data management method further comprising the steps of assigning an attribute value as to a third attribute to said plurality of data;

defining a second filter associated with a desired attribute value with respect to said third attribute on said plurality of regions; and detecting movement of one of said plurality of icons to a section in a region inside both said first and second filters and overlapping one of said plurality of regions, and modifying an attribute value of said third attribute and an attribute value of said second attribute with respect to the data represented by the moved icon into an attribute value related to said first filter and into an attribute value related to the region in which the moved icon is newly located, respectively.

* * * * *